United States Patent [19]

Eickmann

[11] Patent Number: 4,982,914

[45] Date of Patent: Jan. 8, 1991

[54] AIRCRAFT WITH A PLURALITY OF PROPELLERS, A PIPE STRUCTURE FOR THEREON HOLDABLE WINGS, FOR VERTICAL TAKE OFF AND LANDING

[76] Inventor: Karl Eickmann, 2420 Isshiki, Hayama-machi, Kanagawa-ken, Japan

[21] Appl. No.: 330,668

[22] Filed: Mar. 30, 1989

Related U.S. Application Data

[63] Continuation-in-part of Ser. No. 239,234, Sep. 1, 1988, and a continuation-in-part of Ser. No. 828,115, Feb. 10, 1986, Pat. No. 4,770,371, and a continuation-in-part of Ser. No. 5,065, Jan. 20, 1987, and a continuation-in-part of Ser. No. 5,535, Jan. 20, 1987, Pat. No. 4,784,351, and a continuation-in-part of Ser. No. 973,780, Dec. 27, 1978, abandoned, and a continuation-in-part of Ser. No. 760,006, Jan. 17, 1977, abandoned, which is a continuation-in-part of Ser. No. 487,272, Jul. 10, 1974, Pat. No. 4,009,849, which is a continuation-in-part of Ser. No. 104,676, Mar. 8, 1971, Pat. No. 3,823,898, which is a continuation-in-part of Ser. No. 782,349, Dec. 9, 1968, abandoned, which is a continuation-in-part of Ser. No. 551,023, May 18, 1966, abandoned, which is a continuation-in-part of Ser. No. 328,395, Dec. 5, 1963, Pat. No. 3,320,898.

[51] Int. Cl.$^5$ ............................................. B64C 27/28
[52] U.S. Cl. ...................... 244/56; 244/7 R; 244/54; 244/60
[58] Field of Search ................ 244/7 R, 7 C, 56, 66, 244/60, 55, 54

[56] References Cited

U.S. PATENT DOCUMENTS

| | | | |
|---|---|---|---|
| 1,726,062 | 8/1929 | Gilman | 244/55 |
| 1,846,992 | 2/1932 | Decker | 244/7 C |
| 2,514,639 | 7/1950 | Hoack | 244/56 |
| 3,136,499 | 6/1964 | Kessler | 244/7 C |
| 3,179,354 | 4/1965 | Alvarez-Calderon | 244/7 C |
| 3,823,898 | 7/1974 | Eickmann | 244/60 |

Primary Examiner—Galen Barefoot

[57] ABSTRACT

An aircraft has a pair of wing portions with propellers of a propeller pair which are driven and synchronized by a fluid transmission between the power plant and the propellers. A fluid line structure keeps most components of the craft together and consists preferredly of three pipes which are also utilized to carry the driving fluid to and from the motors, to hold the motors and to hold the wings. The take over of a plurality of functions by the interior pipe structure reduces weight and secures safe and economic operation of the craft. The pipe structure can be pivoted in respective bearings to effect the pivotal movement of the propellers and wing portions for either vertical take off and landing or for horizontal flight. The pipe structure is built by pipes without bends in order to make the cleaning of the interiors of the pipes from dirt and from remainders of welding possible. Ribs and holding portions are provided on the structure for assembly and/or disassembly of the wing portions of the pipe structure.

4 Claims, 18 Drawing Sheets

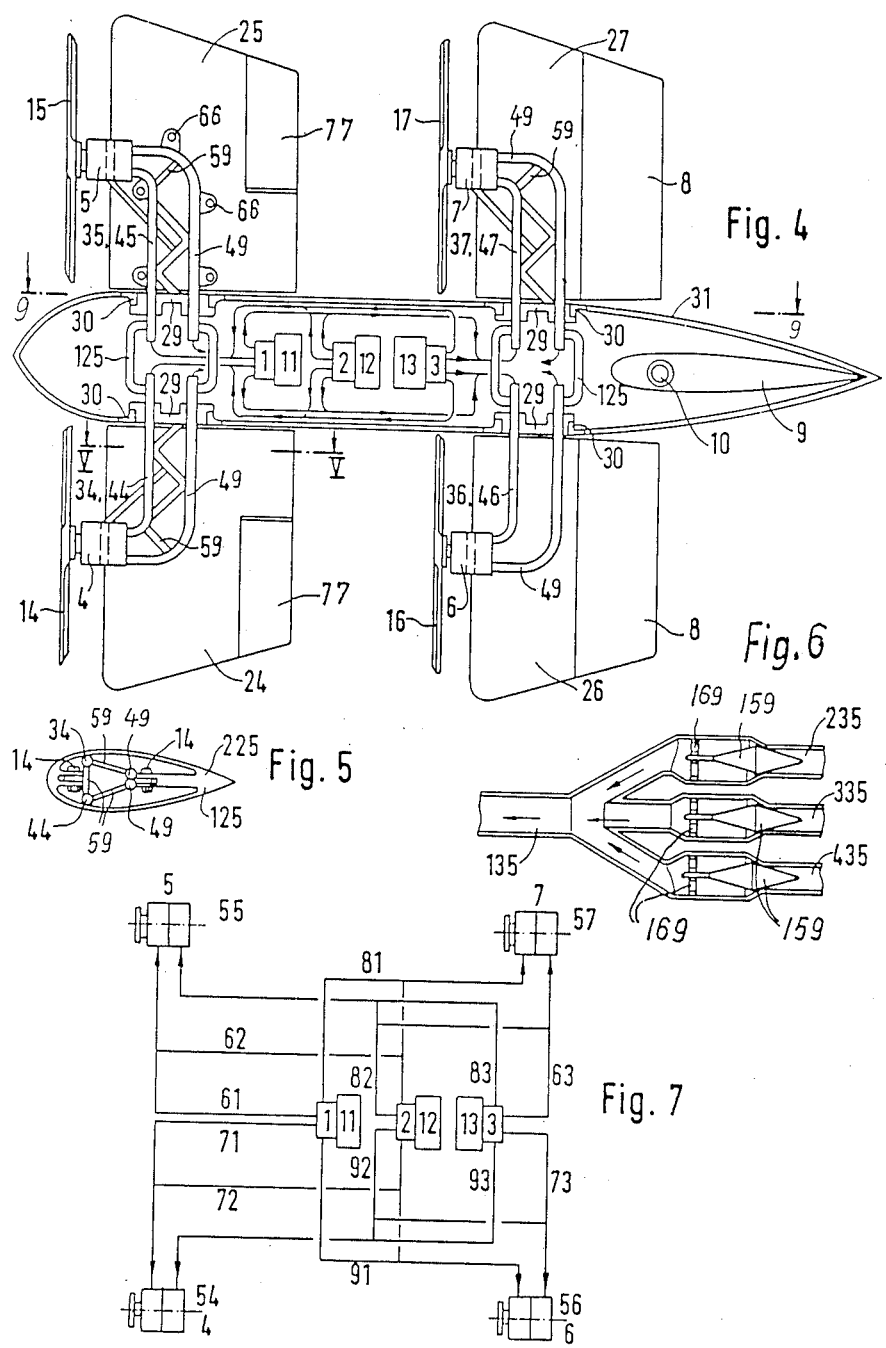

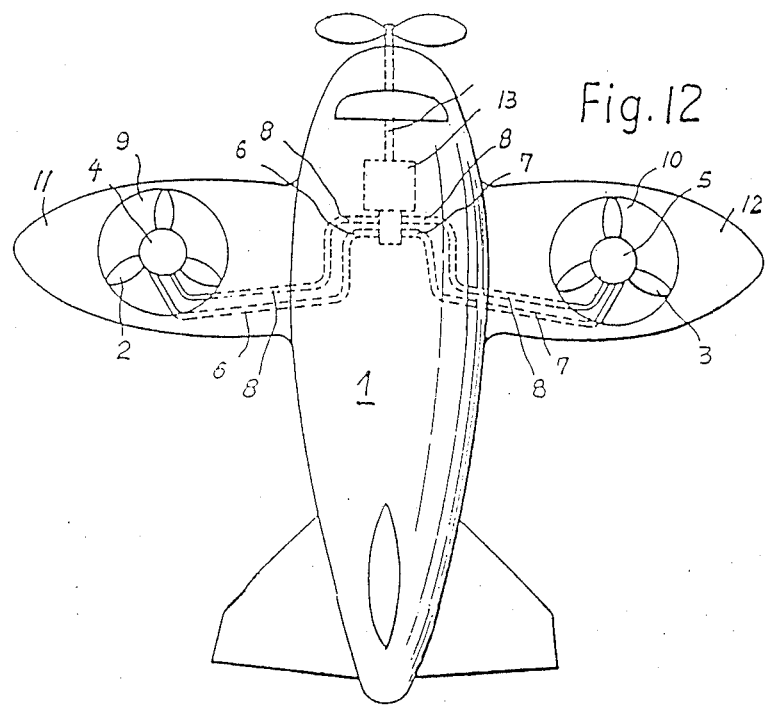
Fig. 12
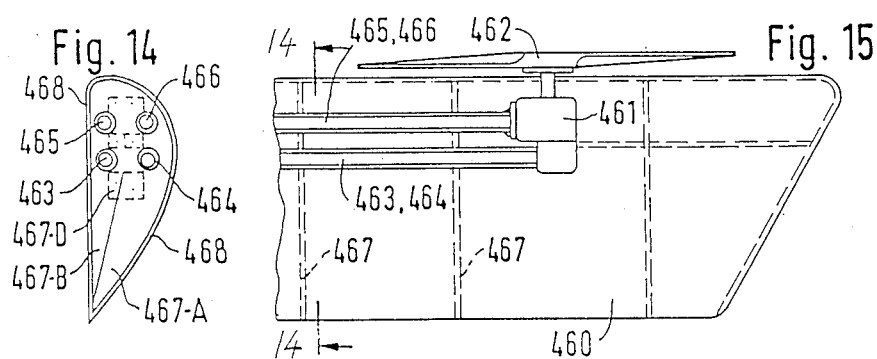
Fig. 14
Fig. 15
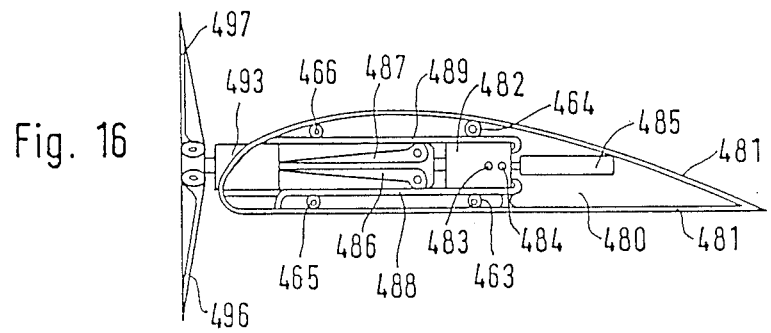
Fig. 16

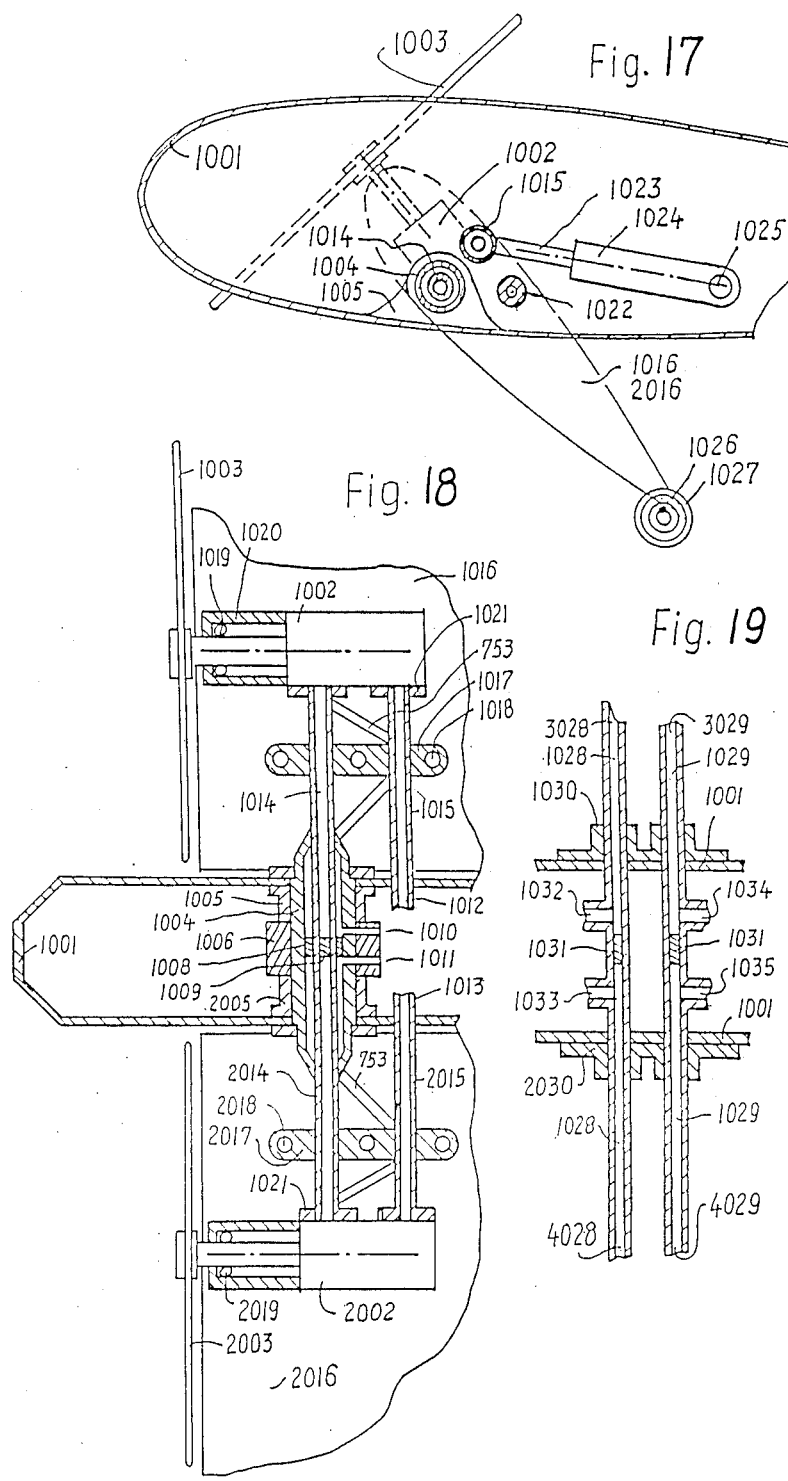

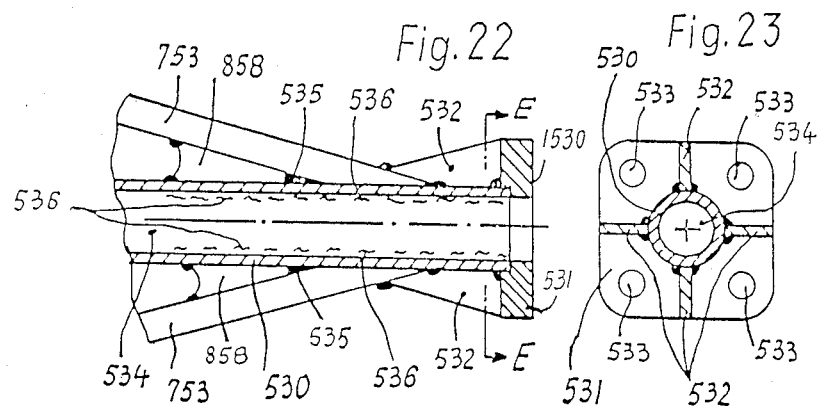
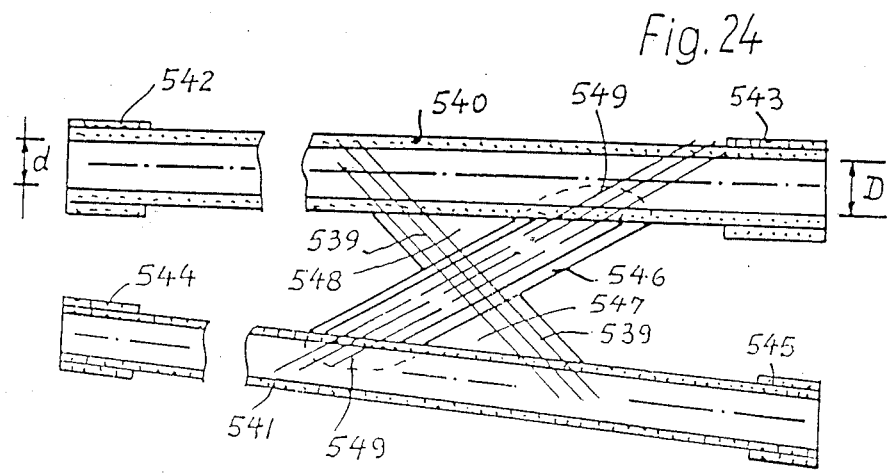

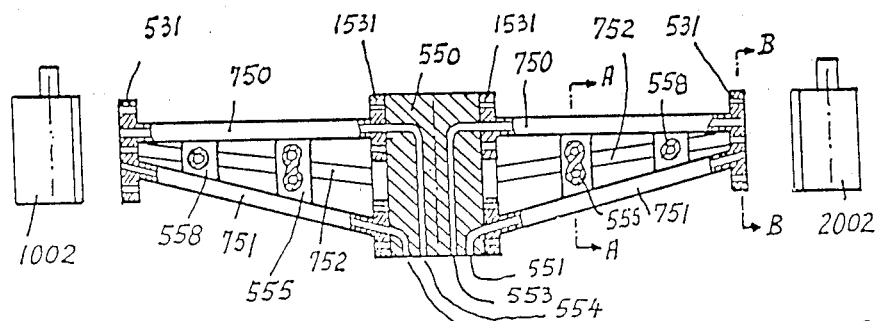
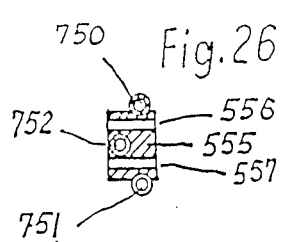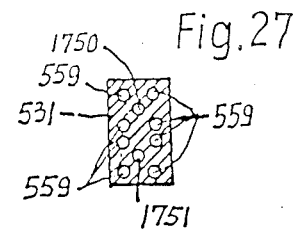
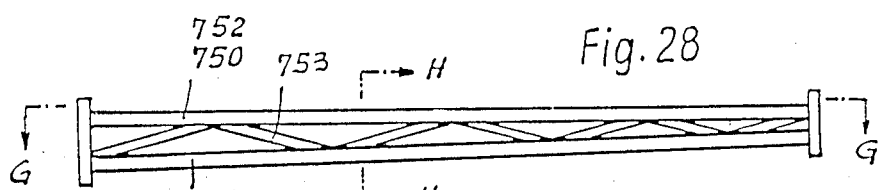
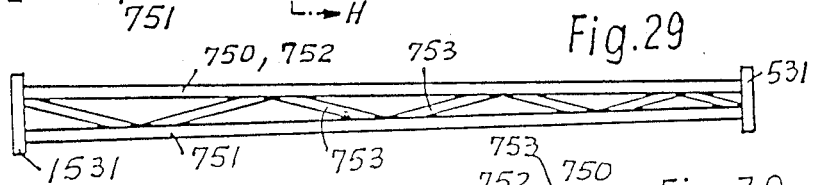
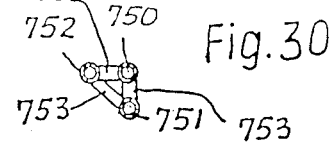

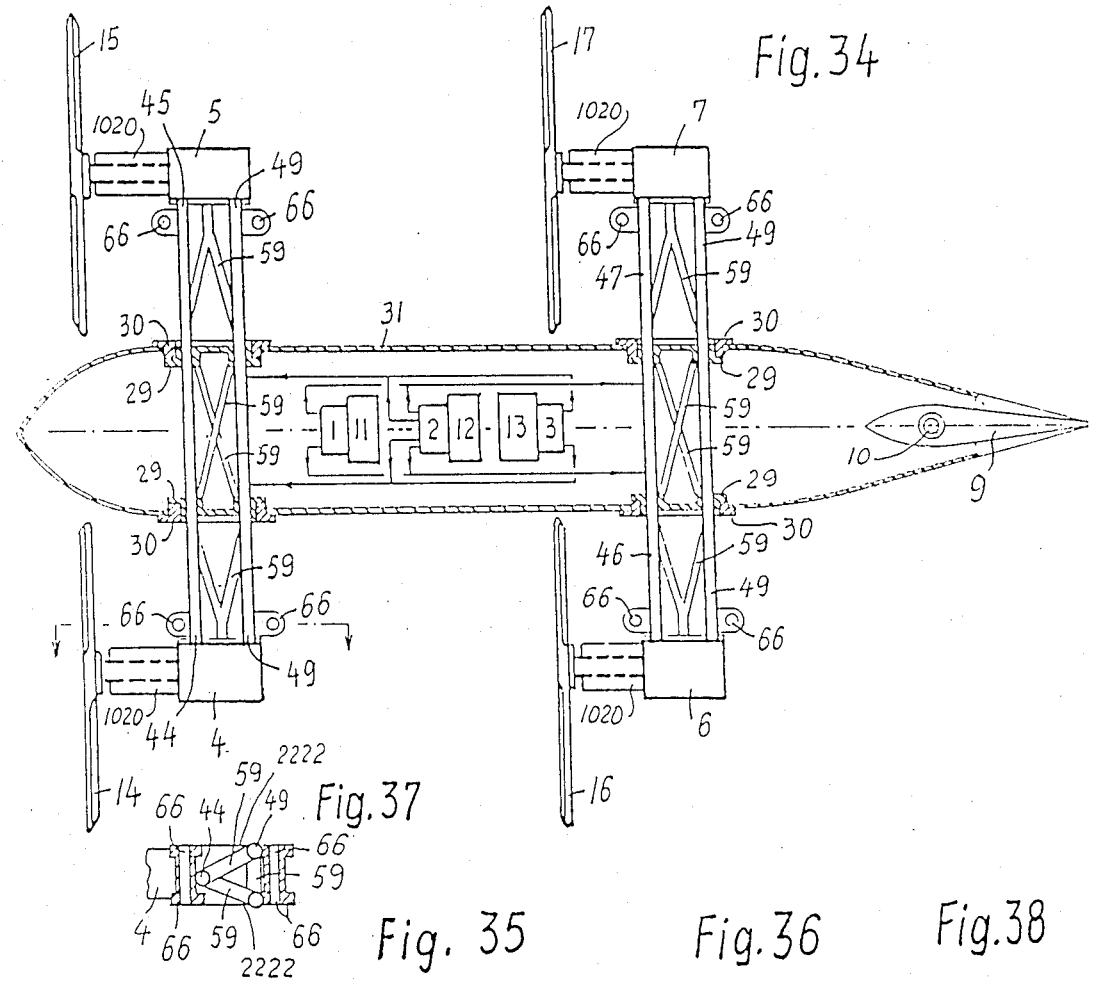
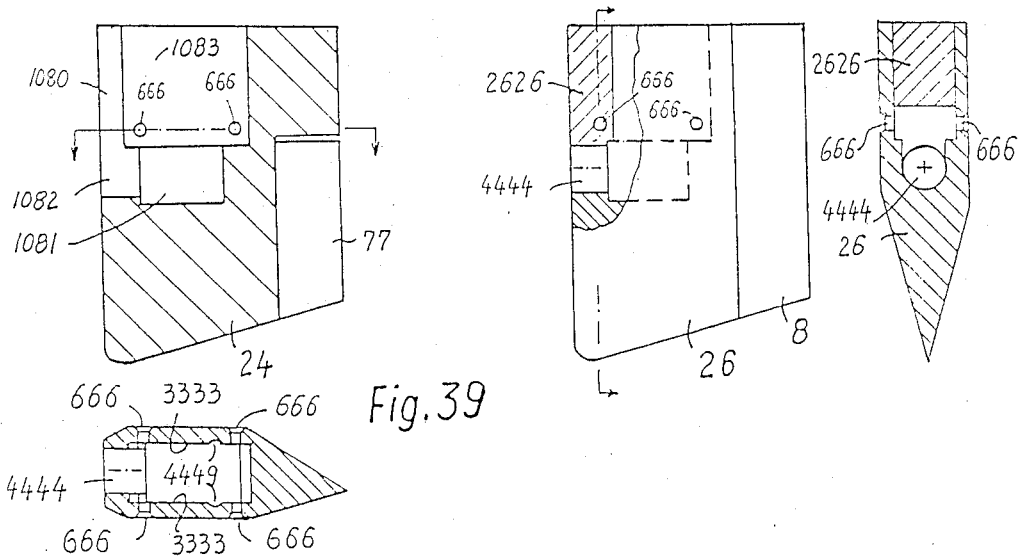
Fig. 34
Fig. 35
Fig. 36
Fig. 37
Fig. 38
Fig. 39

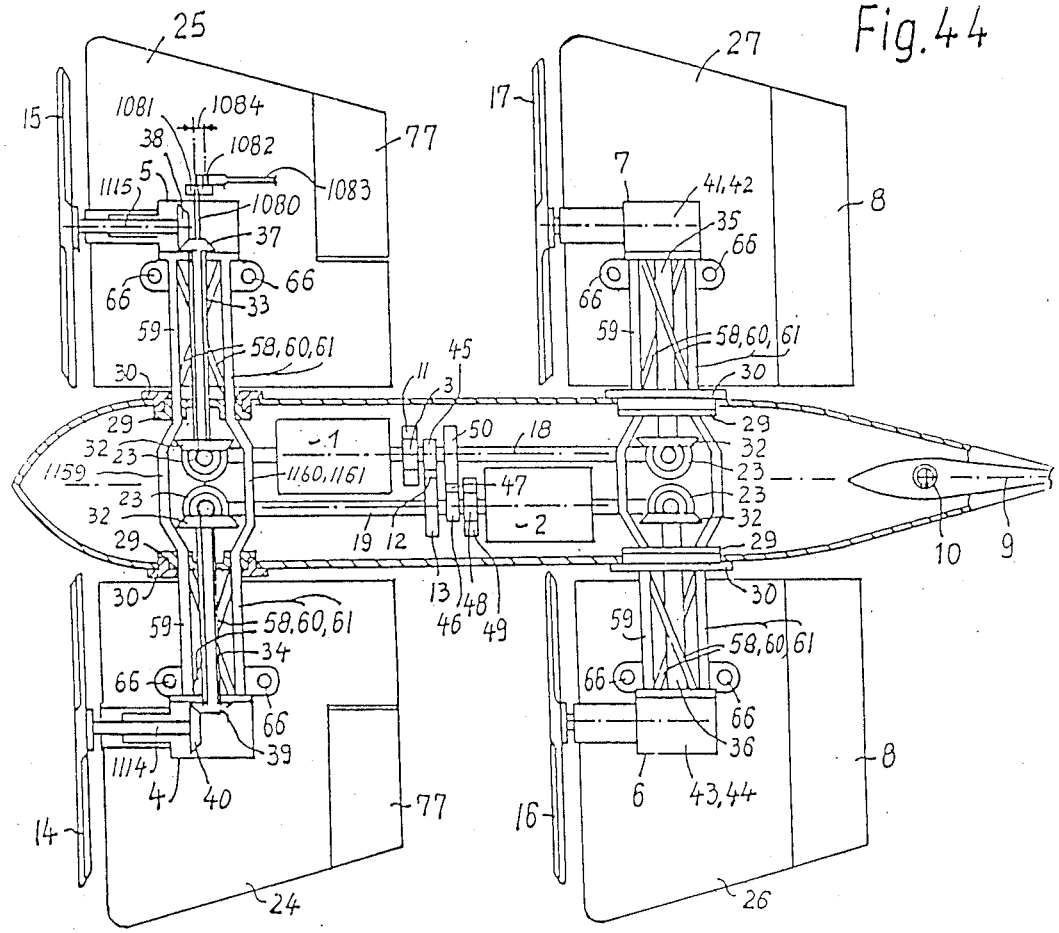

AIRCRAFT WITH A PLURALITY OF PROPELLERS, A PIPE STRUCTURE FOR THEREON HOLDABLE WINGS, FOR VERTICAL TAKE OFF AND LANDING

REFERENCE TO RELATED APPLICATIONS

This is a continuation in part application of my application Ser. No. 07-239,234, filed on Sept. 1, 1988 as a continuation in part of my application Ser. Nos. 06-005,535, filed on Feb. 10, 1986, 07-005,065, filed Jan. 20, 1987, and 07-005,535, filed Jan. 20, 1987 as a continuation in part of application No. 05-973,780, filed Dec. 27, 1978, now abandoned, as a continuation in part application of that time Ser. No. 760, 006, now abandoned and which was filed on Jan. 17th, 1977 as continuation in part application of my still earlier patent application Ser. No. 487,272, filed on July 10th. 1974 and resulted in U.S. Pat. No. 4,009,849 issued on Mar. 1st, 1977. The mentioned application Ser. No. 487,272 was a continuation in part application of my still earlier patent application Ser. No. 104,676, which was filed on Mar. 8, 1971 and which is no U.S. Pat. No. 3,823,898.

The mentioned application Ser. No. 104,676 was a continuation in part application of my still earlier application Ser. No. 05-782,349 which was filed on Dec. 9, 1968 and which is now abandoned while application Ser. No. 782,349 was a continuation in part application of my earlier application Ser. No. 05-551,023 which was filed on May 18, 1966 and which ise now also abandoned while the mentioned application Ser. No. 551,023 was a continuation in part application of my still earlier application Ser. No. 05-328,395 which was filed on Dec. 5, 1963 and issued as U.S. Pat. No. 3,320,898 on May 23rd, 1967. Benefits of the above mentioned applications are claimed for the present application.

This is also a continuation in part application of my application Ser. No. 07-005,065, which is mentioned above. Application Ser. No. 07-239,234 is also a continuation in part application of my application Ser. No. 06-828,115 which was filed on Feb. 10, 1986 and which has additional fore runners. Benefits of application Ser. No. 06-828,115 and of its parentals which are mentioned in said application, is also claimed for the present application.

Application 06-828,115 issued as U.S. Pat. No. 4,770,371 on Sept. 13, 1988 and application Ser. No. 07-005,535 issued on U.S. Pat. No. 4,784,351 on Nov. 15, 1988.

BACKGROUND OF THE INVENTION

(a) FIELD OF THE INVENTION

This application relates to aircraft or vertically and horizontally flying aircraft, which are droven by propellers, which in turn are driven by hydraulic or other fluid motors. The invention relates further to such aircraft which have at least two pairs of tiltable or pivotable wings. In such craft each pair of wings consists of a left side and a right side wing portion. Each wing-portions has at least one propeller which is pivoted together with the wing. In substantial vertical propeller axes and wing-position, the craft can vertically or almost vertically take off and land. At substantially horizontal propeller axes and wing-position the aircraft can fly on wings forwardly. The heretofore known fields of inventions did however never propose an aircraft of the present type.

(b) DESCRIPTION OF THE PRIOR ART

Horizontally moving propellerdriven vehicle or aircraft are derived partially from the applications whereof the present application is a respective continuation or divisional application. For example, they are shown in my U.S. Pat. Nos. 3,790,105; 3,823,898; 9,983,833 or 4,126,522. Other air-borne vehicles, for example those, where hydraulic fluid motors are driving propellers which may be fastened on pipes, are for example, my U.S. Pat. Nos. 3,211,399; 3,253,806, 3,345,016; 3,497,162 or 3,614,029. My newest aircraft U.S. Pat. No. 4,136,845 whereof the priority is claimed too, discloses rectractable propellers in the wings. All these heretofore mentioned patents have hydraulic drives for the propellers.

Differently therefrom there have been attempts to develop vertically take of and landing aircraft with pivotable wings, wherein the propellers are driven by engines directly or by mechanical transmissions which are extended from the engine(s) in the body through the respective wing portion to the propellers.

VTOL=vertically taking off and landing aircraft, as far as the engines to drive the propellers are fastened tot he respective wing or portion of the wing have been build and published reports about their capabilities exist. At least one type is build by a commercial aircraft company and the airforce has successfully build and let be published reports about heavy types of such propeller driven VTOL aircraft. The Jet-engine driven VTOL fighter planes are not related to the present invention, because they are not propeller-driven.

More closer related to the present invention, than the aircraft with engines mounted on the wings, are those, where one or more engine(s) is (are) mounted in the body of the aircraft and mechanic transmission means are extended from the respective engine in the body to the propeller(s) on the wings. The most closely related aircraft of the last mentioned types are for example shown in the following patents:

U.S. Pat. No. 3,181,810—OLSON, whereof also a Canadian patent exists, shows two pairs of wing portions which each have a propeller. Plural engines are mounted in the body and drive a transmission means in common, which is a mechanical transmission. The mechanic transmission extends from the engines through a portion of the body and through portions of the wings to the propellers to drive them. While the patent describes the arrangement in great detail, it also discloses, that a great number of parts are required, which together makes a very heavy weight. The wings are needing additional structures and bearings must be provided for the propellers to hold them. The patent fails to give an overall weight-lift balance of the craft. It can not be seen, how much the craft would be able to lift after it has to carry all the many heavy parts of the transmission, wing structure and propeller shaft bearings.

U.S. Pat. No. 2,708,081—DOBSON shows an aircraft with each one wing portion extending to the right and left of the body. The wings are however borne on on pipes which are inside of each other and the drive shaft is full and inside of the inner pipe. The pipes, which bear the wings are borne in separated bearings on each side of the body of the craft. The there disclosed pipes must be either of big diameter to be able to carry the load of the wings and the thrusts of the propellers, which would require heavy weight of the pipes. Or there would have to be additional structures of heavy weight to make the wings stable. In addition the bearing capacity of the single bearings for each side wardly extending wing-pipe set can be only limited. The craft in addition needs still too many heavy parts to become economical and the patent fails also, in the same way, as Olson, to disclose an overall lift-weight balance.

U.S. Pat. No. 1,726,062 of GILMAN shows an air ship which has accessory wings which carry engines which drive propellers. The four wing portions with the propellers are pivotable in the body of the air ship whereby the wing portions can help the ship to ascend almost vertically and to land vertically. A specific feature of this air ship is that the propellers can by pivoted so far that the propellers can tract the ship downwards for a landing whereby the towing of the ship by ropes, as was commonly required for handling of the ship on the air port, can become eliminated.

U.S. Pat. No. 3,166,271 of ZUCK shows propellers of a diameter which corresponds to the length of the wing whereby the propeller forces a stream of air over almost the entire wing to eliminate stalling or to reduce the danger of stalling of the wing.

U.S. Pat. No. 2,514,822 of WOLFE teaches a helicopter which has three propellers which are driven by hydraulic motors. A single flow pump sends a flow of hydraulic fluid to a controller which has a handle to be operated by the pilot. The handle opens and closes partially an orifice arrangements which controls the rate of portion of flow to the respective propeller. Since there are no plural flows of equal rate of flow produced by the pump, the craft can not hold itself stabile in the air and has to be controlled by the pilot every moment.

U.S. Pat. No. 1,351,821 of WILKINSON shows a helicopter with four rotors mounted on an upper structure which can be inclined relative to the bottom portion of the craft.

U.S. Pat. No. 1,974,961 of JOHNSON shows a low pressure pump of low efficiency with big losses on a control face portion of big diameter, however, the pump can deliver four flows of low pressure hydraulic fluid and with equal rate of flow in all four flows.

U.S. Pat. No. 2,514,639 of HAAK teaches an aircraft with titable wings, wherein fluid lines are located in the wing and can be fastened to the wing. The fluid lines are together with the respective portions of the wings pivotable in bearings in the body of the craft. While this patent on first glimps makes a good impression, a deeper study, however, brings to light that the patent teaches a false conception. Because it flaps vanes in response to air pulses which are produced in a compressor which runs with a sin function similar to that of a connecting rod of a crankshaft. The rear- and fore-directed portions of the swings of the vanes then nullify each other to zero. The vanes do not supply lift or thrust to the craft. Further, the fluid lines are much too heavy because the alternating compressed air currents require big wall thicknesses of the fluid lines and the long fluid lines and big swing motor cylinders make the alternating compressed air drive uneffective.

Other former art exists in several patents, which show specific details, but which do not appear to be closely related to the present invention.

Those are, for example;

U.S. Pat. No. 1,858,011, ZERBI discloses double-coaxial propeller drive means which are of mechanical nature.

U.S. Pat. No. 3,797,783—KISOVEC discloses propellers on the wing tips, which are mechanically driven and which can be pivoted from vertical to horizontal.

U.S. Pat. No. 3,514,052—McKEOWN discloses pivotable propellers on fixed wings, namely on the tips of the wing portions.

U.S. Pat. No. 3,165,280—SHAO-TANG LEE discloses horizontally-vertically collapsible wing portions.

U.S. Pat. No. 2,988,152—KATZENBERGER discloses pipes in wings, which are exclusively laterally of each other and which lead compressed air or gases to the ports on the wings on the ends of the wings. There the ports are bend in a rearward direction to supply a forward thrust to the aircraft by the rearwards directed outflows of the air or gases.

GERMAN Patent No. 1,299,535—HILLER also discloses pivotable wings, which carry propeller-driving engines.

U.S. Pat. No. 3,861,623—FRUECHTE discloses two propellers which are synchronized for their rotary speeds by a hydrostatic transmission means or synchronization means.

GERMAN Patent No. 1,275,874—YOUNG again discloses propeller driving engines on the tips of pivotable wings.

HOWEVER; all of the mentioned patents of the former art are failing to give an exactly examinable overall lift-weight balance.

They all, as far as they are for pivotable wings, are however demonstrarting the direction of the affords of the former art. They were exclusively directed to mechanical transmission means or to propeller-driving engines on the wings.

It is applicant's discovery by the present invention, that the devices of the former art are uneconomic for vertical take off aircraft for the average citizen with an average income and budget. The craft of the former art are too expensive in operation. Because their too heavy weight requires too expensive, strong engines of little weight. Because the required parts in the craft are too many and the sum of their weights is too heavy to permit an inexpensive engine of only limited horsepower with small fuel consumption.

SUMMARY OF THE INVENTION

The invention aims, to overcome the limitations and difficulties of the former are and to provide a very safe vertically taking off and landing, but horizontally flying aircraft for the average person or for economic use in industrial or higher capacity applications.

The invention discloses in great detail a preferred embodiments of the invention and in it the invention does away the many heavy parts of the former art. It applies only very reliable and simple means of little weight. In its aim to spare the heavy operation costs of the fuel consuming heavy weight machines of the former are, the invention starts off with a clear analysis of what is important for the vertical take off and landing and what applies at the later forward flight on the wings.

At common aircraft-technology it was assumed, that it would be the most economic way to drive a propeller by mounting the propeller directly onto a flange of a crankshaft of the aircraft engine. By setting the propeller directly onto the crankshaft of the engine losses of transmission should be prevented. Because, when a transmission is used between an engine and a means driven by the engine, there will be losses in the transmission.

This assumption of the common aircraft technology, which makes at the first glimpse the impression of being absolutely true—simply because it is true that a transmission has losses—is however, as the inventor of this application found, under certain circumstances a disastrous error, which has considerably prevented the advancement of flight-technology.

This will be visible at hand of FIG. 1 of this specification.

It is generally known from Newtons law of force, that the force equals the mass multiplied by the accelleration, according to equation: (1)

$$\text{Force} = \text{Mass} \times \text{accelleration; or: } F_k = m \cdot a \quad (1)$$

The mass of air, which flows through the propeller circle of FIG. 1 is:

$$M = \rho \cdot F \cdot V_1 \quad (2)$$

And, since it is required to accellerate the mass of air, when it flows through the propeller circle from the velocity "Vo"=zero to the final velocity "V2", the accelleration of the mass of air, when it flows through the propeller-circle is:

$$a = V_2/\text{second} \quad (3)$$

Consequently, the force obtained by Newton's $$F_k = \rho F V_1 V_2 / s \quad (4)$$

And, since it is known from the theorem of Freude, that the velocity through the propeller circle is the mean value of the velocities before and after the propeller circle, namely:

$$V_1 = (V_0 + V_2)/2 \quad (5)$$

the force, which is required to keep an airborne craft with vertical propeller axis (axes) in hovering without ascend and descent is:

$$F_k = \rho F V_1 V_2 = \rho F V_1 2 V_1 = \rho F 2 V_1^2 \quad (6)$$

Or, with I=impulse:

$$I = m2V_1 = 2\rho F V_1^2 = H = S \quad (7)$$

The kinetical energy in the air-stream behind the propeller is:

$$E_k = \frac{m}{2}(2V_1)^2 = 2\rho F V_1^3 = N. \quad (8)$$

Equation (2) can be transformed to V1, to be:

$$V_1 = \sqrt[3]{N/2\rho F} \quad (9)$$

and the "V1" of equation (3) can be used to be inserted into equation (1), whereby the followings are obtained:

$$H = S = 2\rho F \left[ \sqrt[3]{N/2\rho F} \right]^2 \quad (10)$$

or:

$$H = S = 2\rho F \sqrt[3]{N/2\rho F} \sqrt[3]{N/2\rho F}$$

or:

$$H^3 = S^3 = 8\rho^3 F^3 \frac{N}{2\rho F} \frac{N}{2\rho F}$$

or:

$$H^3 = S^3 = \frac{8}{4} \rho F N^2$$

or:

$$H = S = \sqrt[3]{2\rho F N^2} \quad (11)$$

or:

$$N = \sqrt{S^3/2\rho F} \quad (12)$$

In the above equations the following values may be used:

$\rho$ = density of air (for example: in kg s²/m⁴)
N = Power (for example in kgm/s)
S = H = lift of thrust (for example; in Kg.)
I = Impuls (for example in Kg.)
V1 = velocity of the air in the propeller-circle (f.e. in m/s)
m = mass of air in the flow (for example Kgmass=Kg/9,81)
F = are of propeller-circle (for example in m².).

As a first step to explain my invention, I introduce "M" which shall define the number of propellers, which will be used in my craft. For comparison with conventional helicopters it should be understood, that equal diameters of propellers are considered. Also the forms, pitches, configurations and like shall be the same, when propellers are compared.

As second step I introduce the efficiency of a transmission and call it "$\eta$". The transmission may also be my hydraulic transmission of a plurality of separated flows of fluid of equal rate of flow in the flows.

I now introduce "$\eta$" and "M" into equation (11) whereby equation (11) transforms to:

$$H = S = M \sqrt[3]{2\rho F \left(\frac{\eta N}{M}\right)^2} . \quad (13)$$

This equation (13) now shows already some very interesting surprises, which will be fund to be important means of the present invention.

For example:

The equation explains, that the lift is as greater as the number "M" of the propellers is.

And, the equation has the further surprise, that the lift will not be reduced parallel to the losses in the transmission, but only with the third root of the second power of the efficiency-losses.

These features, which my equation explaines, are obtained at the given power. Or, in other words, my equation shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of the propellers, an increase of lifting capacity or of carrying power, can be obtained.

As a next step to explain my invention, I assume, that in equation (13) equal values will be used for a comparison of a conventional helicopter with a plural propeller craft of my invention. Equal values in equation (13) mean, equal power "N", equal values "2"; equal values of density "ρ" and equal values of propeller-dimensions, including equal values of cross-sectional areas "F" through the propeller-circles. For a comparison of flight-technology-systems the equal values can simply be left out of equation (13) and I so obtain my comparison equation (14) which shows my comparison-factor "Ftl"; namely:

$$F_{TL} = M \sqrt[3]{\frac{\eta^2}{M^2}} \quad \text{or:} \quad F_{TL} = \sqrt[3]{M\eta^2} \quad (14)$$

with this equation it is possible to calculate a comparison diagram, wherefrom the comparison factor "Ftl" can immediately be seen and which shows, how many times lift a machine with a certain number of propellers and a certain transmission efficiency will give, compared to other or conventional craft. This diagram will be shown in FIG. 17.

The common helicopter has the Ftl value 1 minus the mechanic transmission losses and minus the power which is required to drive the tail rotor. In short, the common helicopter may have a Ftl value of 0.75 to 0.85.

Herebefore the thrusts, lift-forces, thrust-forces and power for the obtainment of certain forces have been calculated for the condition, that the propeller(s) does(do) not move in the direction of the axis(axes). In other words, the equations above are valid for propeller(s) in stand, but not for propeller(s) in movement in the direction of the axes of the propellers.

At the later to be discussed range of flight the craft moves substantially forward in levelled hight speed flight, where the resistance of the craft in air at the respective speed is in balance with the traction of the propeller(s). I call this range the "flight-range". Contrary thereto, the range where the propeller does not move, where the propeller is at stand or where the craft is hovering, in short, where the above discussed equations apply, we have an other range, which I call the "stand-range" or the "howering-range".

But, according to my "Handbook of my Flight-Technology" there is another range, a range between the stand-range and the flight-range. This range therebetween is called the "inter-thrust-range" in my handbook.

At this Inter-Thrust-Range the craft may permanently change its speed, for example, accelerate. The inter-Thrust-Range can thereby also be assumed to be an acceleration-range.

At this said "Inter-Thrust-Range" the thrust of the propeller(s) is gradually decreasing when the velocity of the craft increases. The details of this situation and condition are exactly defined by my following equations for thrust of a propeller or of propellers in the inter-thrust-range:

$$Si = 2N_{in} \times \eta_G / \left( V_0 + \sqrt{V_0^2 + \left[ \sqrt[3]{16\rho MFN^2/\rho MF} \right]} \right) = kg_i \quad (15)$$

or:

$$Si = 2N_{in} \times \eta_G / (V_0 + \sqrt{V_0 + 2S_{ibin}/\rho MF}) = kg. \quad (16)$$

The development of the above equations for the Inter-Thrust-Range can be seen in my "Handbook of my Flight-Technology". The first equation of the two equations, namely equation (15) is more simple equation in actual calculation. The latter equation (16) is the more accurate equation, but it is more difficult and more time consuming in actual calculation procedure.

At the later "Flight-range" when the craft is flying substantially horizontally in levelled flight parallel to the surface of the earth, and, when the resistance of the aircraft during move in air is in balance with the traction force(s) of its propeller(s); or, in other words, when thrusts of the propellers equals resistance of the craft, but thrusts and resistance are oppositionally directed, the following equation is valid:

$$W = (\rho/2) C w A V_0^2 \quad (17)$$

and further, also the following equation will be applicable:

$$N = W \times V_0 \quad (18)$$

I now insert equation (11) into equation (12) and obtain:
$$N = (\rho/2) C w A V_0^2 V_0 \quad (19);$$

which I transform to:

$$V_0 = \sqrt[3]{2N_{OUT}/\rho C_w A} \quad (20)$$

whereby I have a possibility to immediately calculate the expected velocity of an airborne craft or aircraft in its flight-range.

In the above flight-range equations, the following values may be used:
W = Resistance of craft in Kg.
ρ = Density of air, for example: 0.125 kgs²/m⁴ close to oceanlevel;
A = Projection of wings (airfoil) in m²
Cw = Coefficient of resistance; dimensionless;
N = Power in Kgm/sec;
Vo = Velocity of craft relative to air in m/sec.

Equation (14) can also be written in the following form:

$$V_0 = \sqrt[3]{\frac{1}{A}} \times \sqrt[3]{2N_{OUT}/\rho C_w} \quad (21)$$

The latter equation shows directly the influence of wing-area's vertical projection and also the influence of power and of the permanent values for the range of flight. For further defining the influence of power and the influence of the permanent values, the equation (21) may also be written as:

$$V_0 = \sqrt[3]{\frac{1}{A}} \times \sqrt[3]{2N_{OUT}} \times \sqrt[3]{\frac{1}{\rho C_w}} \qquad (22)$$

and thereby all important influences for the speed which can be obtained in the flight range are directly visible.

With the above equations all conditions for vertical take off, for vertical landing, for the accellerations at the Inter-thrust-range and for actual horizontal levelled flight can be pre-determined and be exactly calculated in advance. The substantial correctness of the equations has been proven in actual testing in my research laboratory.

With these equations diagrams can be developed which show in detail and in advance which kind of craft are the most economical for take off and for flight.

From said equations and diagramms it can be found, that even, when hydrostatic transmissions of my hydraulic systems are arranged between a power plant, like an engine or a gas-turbine and a plurality of propellers, a substantially higher lifting capacity can be obtained than would be obtainable at the same power installation from a single propeller, if flanged onto the crank-shaft of the power plant. This is at least true for the vertical start or take off, for the substantially vertical landing and for flight with moderate forward speed. Only at a high forward speed will the single propeller per engine be of higher economy.

Consequently, it is more economical, according to this invention, to use a power plant to drive or create a plurality of separated fluid flows of substantially proportionate or equal rate of flow and drive thereby a plurality of propellers over fluid motors which are arranged at suitable locations on the craft. These theories are further condition to the fact, that at comparisons equal total power is installed and that the compared propellers have equal dimensions like equal diameters, sizes and pitches. The comparison can not e valid, if in the common craft other dimensions of propellers of power would be used, compared to those of the invention.

Therefore, according to the invention, an airborne craft is driven by a plurality of propellers which are driven by hydraulic fluid motors, wherein the fluid motors are driven by separated fluid flows of equal rate of flow which are created in multi-flow pumps or hydrofluid conveying engines and wherein the pump(s) are driven or prime moved by a respective power plant or engine(s).

Accordingly, the invention provides substantially two kind of major airborne craft, namely:

a vertically lifting and landing multi-propeller-craft; and a horizontally starting and landing multi-propeller-craft; wherein at both cases the ability to varify the location or direction of the propellers influence the ability, attitudes and actions of the craft positively and may help to safe fuel and economisize flying.

In the first case, the first preferred embodiment of the invention, the plurality of propellers are utilized, to be set separately on wings and thereby to obtain a higher sum of lift by the plurality of the propellers at a given power installation and thereby to obtain an economic vertical take off and landing at a small space.

The propellers are thereby preferredly fastened on shafts of hydraulic motors. The hydraulic motors are preferred to be fastened on fluid-pipe structures, which are pivotably borne in respective bearing means in the body of the craft. Thereby it is possible to pivot or tilt the plurality of propellers in unison between a vertical take off and landing position and a position for substantially forward levelled flight.

According to the invention it is also possible to fasten wings on the mentioned fluid-pipe structure. This safes weight, because the wings do not need any more to have their own bones for the provision of strength and stability. Further, when the fluid-pipe structure pivotes the fluid motors and the propellers, the wings, which are fastened on and borne by the fluid pipe structure are pivoting with it in unison.

A specific feature of this arrangement is, that the wings can be very small, because they do not need to carry the craft up into the air from a runway. The big size wings, which aircraft of common style need, to be able to lift up from the runway at a moderate speed are spared by this present invention, because the craft of the invention can lift off vertically, gradually pivot or tilt its wings to levelled flight condition and thereby obtain forward speed in the Inter-Thrust -range until finally the craft will have obtained a forward velocity high enough to continue to fly on on small wings.

While I have pointed out heretofore, that the equations show, that the craft of the invention is more economic at vertical lift or descent and moderate speed, it will now be understood, that the aircraft of the invention can also be more economical in operation at high speed, because it needs smaller wings than the common aircraft. The feature of the smaller wing or of the size "A" of equation (15) will now directly demonstrate, that due to the smaller wing, the craft of the invention may even in levelled flight obtain a higher velocity at the same installation of power and thereby become even more economic in substantially horizontal forward flight.

Consequently, since my aircraft take vertically off, because the big size wings are replaced by the vertically acting take-off propellers, the craft of the invention can at moderate speed also fly with less gasoline consumption than the common aircraft.

This embodiment of the invention spares fuel at the vertical take off and landing compared to the conventional helicopter; and it can, if economically used even spare fuel at flight. It is further easily to be build, inexpensive and safe in operation and its components are reliable. A further specific feature is, that in the following horizontal flight this embodiment of the invention will consume less fuel than a helicopter of equal carrying capacity would. A helicopter uses at horizontal flight about 50 to 70 percent of the howering or take off fuel. But the craft of this invention may use in horizontal flight with moderate speed only one fourth or less than at take off or landing or at hovering in air. At a moderate velocity of 100 to 150 Km/h speed the craft of the invention may use even less fuel than a common car would use at equal speed. A higher or a considerably higher fuel-consumption is required only at higher speed of 150 to 700 Km/h. This increase in fuel consumption is natural and also apparent from equation (21), which shows, that the velocity increases with the third power of the used power or fuel. In short, a doubling of speed requires an eight times increase of fuel if no other factors reduce this ratio.

Further detailed mathematics, technologies and economic details as well as complete outlays and designs beside of other embodiments of the Flight-Technology of the inventor, which also includes hundreds of fotographs and calculation tables and formulas can be studied in "Handbook of my Flight-Technology" by Karl Eickmann, which can be obtained commercially from:

Rotary Engine Kenkyusho

2420 Isshiki, Hayama-machi;

Kanagawa-ken, Japan

The said Handbook also includes samples of engines and of pumps and motors. The weights of radial piston pumps and motors have been reduced about to one hundredth of equal power at the fifties. The Handbook is a compact short-cut on 600 pages of the 50 million words etc. in test records, scientific literature and other literatures of the inventor, as far as flying or the development of little weight, but powerful and economic components like structures, hydraulic pumps, motors, engines or engine-hydraulic power plants are concerned.

When the mentioned Handbook is sold out, or for those who cannot afford its expense, the shorter book "Mini instruction to a new technology" is recommended.

As will be seen from the description of the preferred embodiment, one major object of the invention is, to set a pipe structure with pipes into at least two directions of planes which are vertically relatively to each other, to set ribs between the pipes to strengthen their bearing capacity, to set holding means onto the pipe structure for fastening of the skin of the wings and to apply a plurality of functions and actions to the so obtained pipe structure of the wings. Namely, to lead the fluid to and from the propeller driving motors, to hold the propeller driving motors with the propellers thereon and in addition to form the bone-structure of the wings and to pivot the respective wing portions. The combination of these plural functions in a single and simple means of a structure obtains the aim of the invention of an economically taking off, starting and landing aircraft which flies forwards on wings. The heavy weight of the craft of the former art are thereby spared and the aircraft itself has been strengthened and made very reliable and strong.

In an additional object of the invention, the propeller axes are set in a suitable and preferred angle to the zero plane of the body of the craft in order to simplify and ease the transition stage of flight with angularly pivoted wing portions between vertical flight and horizontal flight.

The main solutions of the invention, may therefore be also described as follows:

BRIEF DESCRIPTION OF THE DRAWINGS

FIG. 4 shows a simplified horizontal sectional view through an example of a vertically taking off and landing, but horizontally flying aircraft of the invention, whereat hatching lines are spared in order to make the Figure not to small and confusing;

FIG. 5 is a cross-sectional view through FIG. 4 along V—V;

FIG. 6 shows a longitudinal sectional view through a flow-combination valve set whereby a multiple of flows from different power sources are combined to a single continuing combined flow;

FIG. 7 shows a schematic of a sceleton for driving four double-motors of a craft of the invention;

FIG. 12 shows my eldest aircraft seen from top.

FIG. 14 is a cross sectional view through FIG. 15 along its arrowed line.

FIG. 15 shows a portioon of a wing of the invention.

FIG. 16 shows another embodiment of the invention in sectional view.

FIG. 17 shows another embodiment of the invention in an aircraft.

FIG. 18 illustrates another modification of the invention.

FIG. 19 shows a modification to FIG. 18.

FIG. 26 is a cross sectional view through FIG. 20 along its arrowed line.

FIG. 22 illustrates an end of a structure.

FIG. 23 is a section through FIG. 22 along the arrowed line therein.

FIG. 24 illustrates a pipe structure built of FRP.

FIG. 25 shows another embodiment of a pipe structure of the invention.

FIG. 26 is a sectional view through FIG. 25 along the arrowed line A—A

FIG. 27 shows a sectional view through FIG. 25 along the arrowed line B—B.

FIG. 34 shows a pipe structure seen from the side.

FIG. 29 shows FIG. 28 seen from top.

FIG. 30 shows a sectional view through FIG. 28 along its arrowed line.

FIG. 34 shows the aircraft of FIG. 33 before the assembly of the wings.

FIGS. 35 and 36 shows portions of the wings in separated longitudinal sections.

FIGS. 38 and 39 are sectional views through FIGS. 36 and 35 along the arrowed lines therein.

FIG. 44 shows an embodiment of an aircraft of the invention.

FIGS. 45 to 49 shows parts of FIG. 44 separate illustrated.

FIGS. 50 to 55 give also separately illustrated views or sections of parts or portions of FIG. 44, wherein FIG. 51 is taken along the arrowed line in FIG. 50, FIG. 52 along the arrowed lines AA and BB of FIG. 50, FIG. 53 along the arrowed line in FIG. 51 and FIGS. 54 and 55 show sections relative to each other taken along the arrowed line of the respective other Figure of these Figures.

DEFINITIONS

In this patent application appear a number of words which have, according to Websters Dictionary two or more meanings. In the present application the following words have the following meaning:

INVENTION means a technological sound and useful device. It does not mean a false conception, which the other meaning of this word is.

SYNCRHONIZATION and the respective other forms of this word means, that a plurality of members act in unison with equal rate of movement, force or other action. These words within this specification exclude the other meaning of the words, namely that they act only at the same time but not with equal rate.

PUMPS AND MOTORS in this application are exclusively such which are capable of high pressures in excess of 2000 psi and which are capable to run and seal effectively at rotary speeds which exceed 1000 rpm as motors and which axceed 2000 rpm as pumps. Such pumps and motors are characterized thereby that they have control faces with control ports on the radial inner portions on the rotor and which have outer diameters which are smaller than the diameters of the rotors are, or they have stationary bodies with cylinders with therein reciprocating pistons, while the pistons are driven over piston shoes between the pistons and an eccentric but cylindrical piston stroke guide face of a cam. Or they are high pressure gear, trochoid or vane pumps with an efficicenty of more than 85 percent at more than the mentioned rpm and at pressures which exceed 2000 psi.

Figure 1:
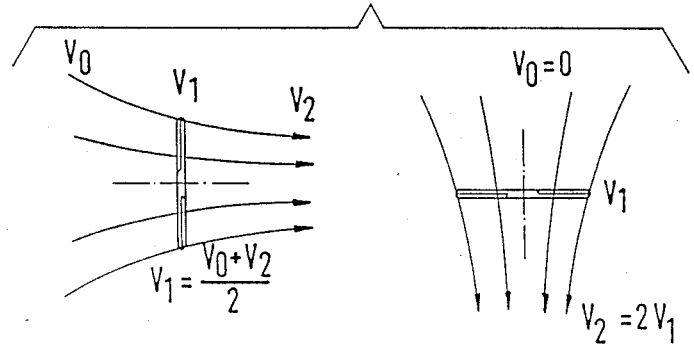
FIG. 1 shows the air-stream through a propeller-circle as it is known from the conventional air-stream theory; namely in one schematic at vertical hovering in the air and in the other diagram at forward flight with the velocity Vo as forward-speed of the craft.

DESCRIPTION OF THE PREFERRED EMBODIMENTS:

In FIG. 1 the air-stream through a propeller circle is shown, as known from the conventional air-stream theory. In one portion of the Figure for a vertical axis of the propeller for a vertical air-stream at hovering of the craft. In the other portion of the Figure for a propeller with horizontal axis and horizontal air-stream through the propeller circle as in forward flight. In the one portion of the Figure the forward velocity "Vo" of the craft and thereby of the propeller is "zero" namely in the right portion of the Figure. But in the left portion of the Figure the forward velocity "Vo" of the craft and thereby of the propeller is "Vo".

Consequently, as known from the literature, the velocity through the propeller-circle is in the right part of the Figure = "V1" which corresponds to "V2/2" when "V2" is the velocity of the air after the propeller. And in the left part of FIG. 1 the velocity of the air through the propeller circle is also "V1" but this "V1" corresponds now to: "V1=(Vo=V2)/2". Since these facts are generally known from the air-stream literatures, the FIG. 1 contains nothing new. It is however contained in this application in order to explain, that these facts are the bases of the mathematics and of the formulas. For example, the right part of FIG. 1 is the basis for equations (1) to (8) while the left part of FIG. 1 is specifically the basis for equations (9) and (10). Equations (7) to (10) are known from the literature. These and other equations can be found in their development again in the "Handbook of my Flight-Technology". Therein many explanations and details are found.

Figure 2:
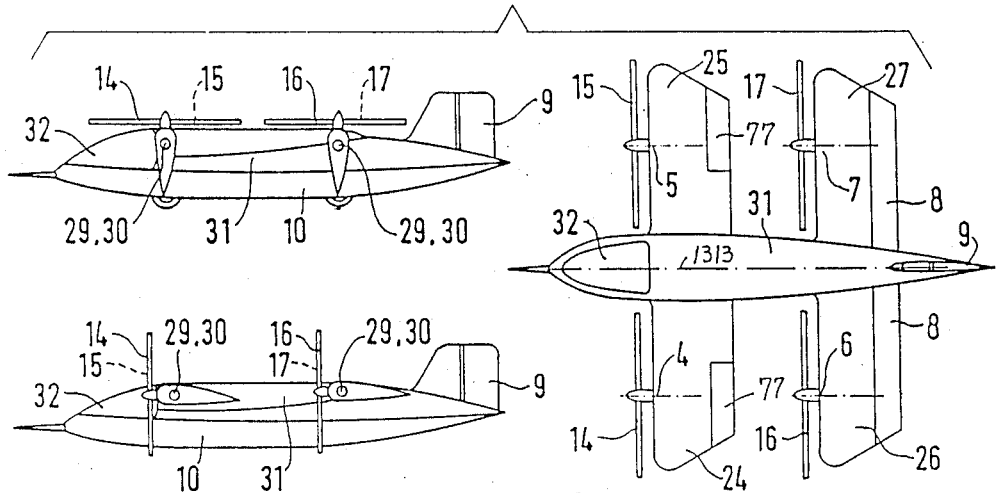
FIG. 2 shows an example of a vertical take off aircrfat of the invention in a scale of approximately 1:100 for one to three persons, wherein the craft is one shown with vertically set wings and propellers and in the other part the craft is shown with horizontally directed wings and propellers for flight and wherein the craft is also shown in the other part of the Figure in horizontal flight, seen from above.

FIG. 2 demonstrates a preferred embodiment of a vertically taking off and landing craft of the invention, which can horizontally fly on wings. In the upper part of the Figure the craft is shown in vertical flight condition. In the bottom portion of the Figure the craft is shown in horizontal flight situation and in the right part of the Figure the craft is shown in horizontal flight, but seen from above. In this part the craft may be in forward flight.

In body 31 of the craft the power station 10 is provided and preferred to be located in the medial or in the bottom portion of the craft. It may also be a plurality of single power plants, disposed along the bottom portion of the body. Together with other weights, for example, tanks, fuel, oil, pumps, acessory devices and like they are supposed to form a gravity center in the lower portion of the craft to stabilize the location of the craft in the air by a forces play with an upwards acting lifting center formed by the upwards tracting propellers of the craft.

On the body 31 of the craft are also the pivot-bearing holders 29 and 30 provided. In them the fluid pipe structure is pivotably borne. The fluid pipe structure is however not visible in FIG. 2. In bearings 29, 30 the fluid pipe structure which forms the borne-structure for holding the fluid motors and thereby the propellers and also the wings can be pivoted, for example, from a vertical position to a horizontal position but in preferred embodiments it may also be pivotable into a braking position for braking the speed of flight when suddenly another object nears towards the craft. The wings 24 and 27 are fastened or may be fastened on the fluid pipe structure. The craft can also fly without wings. But then the propellers are kept in an inclined position relatively to the surface of the ground. Therefore it is said, that the winds may be fastened to the fluid pipe structure. But the fastening or application of the wings is not for every craft of the invention a must. The craft may have a side rudder 9 and ailerons 77. Some of the wings may be provided with elevators 8 as shown in FIG. 4 or some of the wings may act as elevators 8. The term "pivotion" means a "pivotal movement".

In the following I will define what actions an airborne craft may do. This will be in accordance with the "Handbook of my Flight-Technology" as follows:

Vertical rest or flight is "hovering".

Forward movement is "flight", and; movement with inclined propeller axes is "move". Consequently in the left upper part of the FIG. 2 the craft is shown in "hovering"; at the left bottom portion the craft is shown in "flight" and in the right part of the FIG. 2 the craft is also demonstrated "flight". The craft is not demonstrated in "move", but a "move" of a craft is demonstrated in FIGS. 10 and 11.

At "hovering" the propellers form together a lifting-center. This is located above the earlier mentioned gravity-cent The forces-play between lift center and gravity center keeps the craft in stable position at hovering, while vertical ascent and descent are vertical flight and at such vertical flight the said center also continue by their forces-play toe maintain the stable location of the craft relative to the surrounding air. The bottom of the craft thereby remains at all times of hovering and at vertical flight like ascent and descent substantially parallel to the ground and the craft remains upright at all those actions or hovering at rest.

By the fluid line structure or bone-structure of the craft the fluid motors 4 to 7 are borne. The fluid motors may be hydraulic motors in this and the other Figures. It could, however, also be gas or air-motors. These fluid motors are driven by fluid streams. They are driven with equal rotary velocities while motors of diametric locations relatively to the body form motor-pairs of counter directional rotation. Similarily the propellers form propeller-pairs. For example Propellers 14 and 15 form one propeller-pair while propellers 16 and 17 form a second propeller-pair. Naturally, each propeller of the same propeller pair revolves in the opposite direction relative to the other propeller of the same propeller-pair, but both propellers of the same propeller-pair have the same or equal rotary velocity which means, equal revolutions per time, for example, an equal number of revolutions per minute.

An example of the inner structure of the craft of FIG. 2 is given in FIG. 4.

Figure 3:
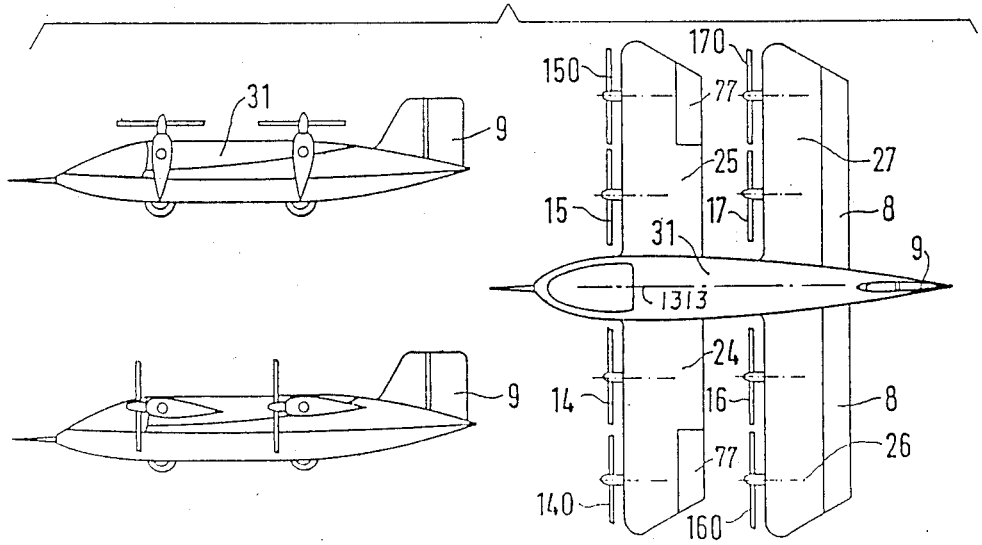
FIG. 3 shows another example, similar to that of FIG. 2, however with eight propellers, instead of four propellers.

Also, the design, capability, size, cost and like are functions of time and of the technology of the respective time and of availabilities of the respective time for FIG. 2 as well as for other craft of the invention, especially depending of the technology of the respective power plants and at the respective fluid handling devices of the respective time. The FIGS. 2 and 3 are shown in a scale of about 1:100 in order to give a first idea in which size the craft of the invention can be build. Thus, the figures show first examples of small-size craft which can be materialized with the presently available technology, when the power plants, hydraulic devices and fluid-line structures of the inventor are used. They can not in all cases be realized, when wrong power plants, hydraulic devices or wrongly designed fluid line structures are used. At present time the craft of the invention require the highest standard of technology which is in this specific field presently available only from the inventor's laboartory or from his licensed manufacturing companies.

According to the invention, the craft of the Figures can not only be build in the small size for 1 to 3 persons, but also in larger sizes for many persons or as transport aircraft. The scale in the figures shall therefore by no means define, that the invention is limited to the small size of the scale of the figures. Greater sizes, larger sizes, higher capable craft are designed and partially build and can be commercially obtained from myself or from my licensed firms.

Otherwise the FIGS. 2 and 3 shown those craft which at present time can be obtained with smallest expense for 1 to 3 persons or the respective transportation weight. The craft of these figures has enough space in a bigger garage of a car and it can also be build in such bigger garage of a car. The building expenses are less than the costs of nowadays luxury cars. The components for building the craft can be obtained from me. And so can be the drawings together with the "Handbook of my Flight-Technology".

FIG. 3 is also demonstrated in a scale of 1:100. The scale is not in all details absolutely exact. FIG. 3 shows the more elegant and the more desireable solution for the vertically taking off craft compared to FIG. 2. However, FIG. 2 is the more easily build able and less expensive in building presently than the craft of FIG. 3. The craft of FIG. 3 is presently considerably more expensive than the craft of FIG. 2. The craft of FIG. 2 is more easily to be materialized because of the bigger diameters of its four propellers. The propellers of bigger diameter carry more and lift more than the propellers of small diameter at the same sum of installation of power. Consequently, it is more easy to take off with the craft of FIG. 2 because with the bigger diameter propellers of FIG. 2 the craft needs less power for the vertical take off and is therefor lighter in weight, because it needs a smaller number of engines or an engine of less power. The propellers of the sizes for the craft of FIGS. 2 and 3 are nowadays available and can be obtained commercially also from the inventor. The disadventage of the craft of FIG. 2 is, that the propellers require such big diameters, that the tips of the propellers at horizontal flight are revolving below the bottom of the craft. That can bring difficulties at emergency landings in horizontal flight with horizontal landine on wings, because the tips of the propellers would then meet the ground and the propellers would break. The craft of FIG. 2 therefore requires for emergency landing on wings an arresting means for the arresting of the propellers in a horizontal position. FIG. 3 on contrary thereto has so small propellers, that the tips of the propellers remain in the air also when the craft lands on wings in horizontal flight and sets onto the ground on the wheels. The craft of FIG. 3 has at least 6 or in the FIG. 8 propellers. This is required to obtain enough lift with the propellers of such little diameter.

A common feature of both craft, that of FIGS. 2 and 3 is, that the wheels do not need a retraction into the body. Thus, the craft can operate without retractable wheels and simple wheels, which extend only a little from the body downward are enough for horizontal landing on wings. For vertical landing and take off no wheels at all are required. However, since the craft has the ability to take off and land, either vertically or horizontally, the little cost and weight of simple non-retractable wheels adds much value to the craft, because it makes the horizontal starting and landing easily possible in addition to the vertical take off and landing. To add retractable wheels or undercarriages is however possible, if so desired.

At non-windy weather the crafts of FIGS. 2 and 3 can take off and land from and into a place of about 10 meter by 10 meter. At windy weather however to land into such a small space, a certain skill of the pilot is required. Another common feature of the crafts of FIGS. 2 and 3 is, that they can fly with high speed as aircraft can do, that the propellers do not need the elastic helicopter blades or not the variation of pitch during a revoltuion as the helicopter needs and in addition, that the craft can land at any country place in bad weather, when the bad weather reaches the flying craft remote from an airport. Still another common feature of both craft is, that they can convert to vertical flight, howering or to rest in air or even to brake in the air and to reverse the direction flight, when another obstacle comes into the flight path of the craft. Accidents are thereby prevented and should not occur without pilot error.

Also the following design details are no matter of the potent claims, they are described here in order to give an idea what sizes are today available in such craft. The propellers of FIG. 3 are, for example, HOCO Propellers of Hoffman propeller works Germany, namely type HO-V-62 of 1, 6 to and 2, 4 meter diameter. The power plants are two or three four cycle or two cycle engines of Rotary Engine Kenkyusho and the propeller fluid motors and the pumps are also motors and pumps commercially availably from the said Rotary Engine Research institute of 2420 Isshiki, Hayama-machi, Kanagawa-Ken, Japan. The pumps and motors are preferred to be corresponding to my U.S. Pat. Nos. 3,850,201; 4,037,523; 3,977,302 and others of my patents. The power plants may be those of FIG. 8 and supply a take off power of 100 to 180 HP, each, according to type. Their weights are less than 100 Kg each. Spare parts for the power plants are available from stocks in all smaller cities around the world. The power plants are operating economically as four cycle engines do. For higher speed and for more than 2 persons, the craft of FIGS. 2 and 3 may have one or more gas-turbines of the roughly 300 HP range. For the 1 to 2 person version with four cycle power plants, the following datas, also they may change with time, will roughly apply today:

| Velocity = speed of the craft | fuel consuption per 100 Km flight | range without landing |
| --- | --- | --- |
| 280 Km/h | 29,2 ltr | 421 Km. |
| 260 Km/h | 23 ltr | 520 Km. |
| 220 Km/h | 18 ltr | 670 Km. |
| 150 Km/h | below 10 ltr | 1100 Km. |

The above values are a first information only and are subject to change without notice. The prices of the crafts of FIGS. 2 and 3 without gas turbines might by 90,000,—to 140,000,—German Marks or foreign currency equivalent. The present prices of prototypes are understandingly higher. For those who desire to get the respective craft for less money, the parts thereof can be obtained from my research institute for home-building of the craft. Thus, the utilization of the craft for actual flying is presently possible for example under the rules of USA as experimental aircraft.

Since the vertical take off and landing crafts of FIGS. 2 and 3 can at bad weather land everywhere, even in the country side and the pilot and passengers can stay over the bad weather or over the night at the available hotel, motels, inns and resthouses, an expensive navigation-instrumentation can be spared, if so desired. The most important feature of such vertically flyable aircraft is anyhow, that a bad weather must not lead to an accident, just because there is not airport available for a quick landing. When an instrumentation is desired and the expenses for it are not feared, then it is recommendable to use a radar device of my U.S. Pat. No. 3,801,046 for the automatic prevention of collusions with other craft or obstacles in the air.

In FIGS. 4 to 7 some examples of preferred details of the vertically and horizontally flighable craft are illustrated. However, sectional views through the hydraulik engine, hydraulic pumps and motors are not given in this application, because those are described in detail in about 500 patents of the inventor in many countries, about 150 patents in the United States alone, and they are given in details in the mentioned "Handbook of my Flight-Technology" or in my respective "Handbooks on Hydraulics and Engines". The mentioned Handbooks also contain details of performance, test data, testing methods, sizes, powers, efficiencies-mechanic and volumetric, connection means, assembly rules and like, so, that FIG. 4 and the other respective figures in this application can be restricted to schemactic illustration.

In FIG. 4, the power plant, for example engine 11, drives a four-flow pump means or fluid flow creation means for the supply of four separated flows of propartionate or equal rates of flow in the separated flows, shown by number 1. Accordingly the power plants 12 and 13 drive respective four flows pump means 2 and 3. In each case, the power of the respective power plant is divided substantially into plural equal power portions in the said pumps. From each of the fluid-flow-creation means for multiple separated flows of equal rate of flow-in the following shortnamed "pump" or "pumps" four from each other separated and not with each other communicating fluid lines are extended to the respective fluid motors 4 to 7. Each one fluid line from the respective power plant's pump to a respective one of the motors 4 to 7. These fluid lines are shown by referential numbers 44 to 47 in FIG. 4. An improved alternative thereof is, however, illustrated in principle in FIG. 7. The fluid flow return lines 49 are also shown, in principle, in FIG. 4.

The other details of the return fluid line and numbers of fluid lines are spared in FIG. 4, in order to prevent an overloading and difficulty of reading of FIG. 4. Details of fluid lines are shown by way of example in FIG. 7, so that such details are not required in FIG. 4. The arrows on the respective lines shown clearly how the flows are flowing from the respective pumps to the respective motors and that is what counts in this figure.

It should however also be recognized that flows from different power-plant pumps which lead to the same fluid motor, may be combined to a combined flow. To do so, it is recommended to use one-way check valves in the fluid lines to prevent return flow from one fluid line into the other. How that is done in detail is shown by way of example, in FIG. 6.

FIG. 6 demonstrates by way of example such combination of a plurality of flows from different power sources to a single fluid motor. Fluid lines 235, 335, 435 may come from different pumps of different power plants 1, 11 and 2, 12 and 3, 13. One way check-valves 159 may be provided in said fluid lines. Each one in a respective one of the fluid lines. The valves 159 may be streamlined and may be guided in guide means 160. After the valves 159—see the arrows to understand the meaning of "after",—the fluid lines combine to a single combined fluid line 135. This fluid line 135 goes therefrom to one of the motors 4, 5, 6 or 7. The pressure in the fluid line 135 presses the valves 159 to close towards the respective fluid line 235, 335 or 435. When fluid flows in the fluid lines 235, 335 or 435, the respective valve 159 is opened to let the flow flow from line 235 or 335 or 435 into the common combined fluid line 135.

But flow in the opposite direction, or back-flow, or flow contary to the direction of the arrows is prevented by the automatic closing of the respective valves 159.

When there are three power plants, each with a four-flow pump in the craft and when four propeller motors shall be driven by four such combined flows, there will be four such valve-sets as in FIG. 6. Thereby each of four combined fluid lines 135 will receive about one fourth of the power of each of the three power plants. The number of flows and of pumps and engines is by way of example. Any other desired number may be materialized in such one way check valve sets as in FIG. 6. Thus, each 4, 5, 6 and 7 will receive one combined flow 135 and thereby each of said motors will receive one fourth of the fluid supplied by the pumps and one fourth of the powers of each of the engines or power plants. The combination of several specific fluid lines from different engine-pump sets will not disturb the equalness of the rates of flow in the separated combined fluid lines 135, because the separated fluid lines 135 are not combined with each other. Care must however be taken, to connect the correct fluid lines. If wrong fluid lines are combined, the desired effect can not be obtained.

While such combinations, as described in FIG. 6 may be done, it is not in all cases required to use them. That will be apparent from FIGS. 4 and 5. Because, the to be described fluid-pipe structure requires at least three fluid lines or at least two fluid lines plus a third stabilizing bar or pipe for the purpose of obtaining a self bearing rigid fluid pipe structure capable of bearing and holding the respective motor(s) propeller(s) and/or wing-portion(s).

Figure 9:
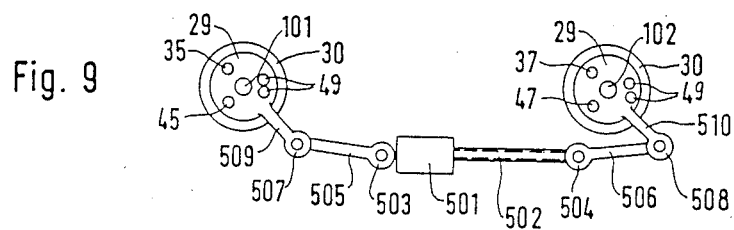
FIG. 9 shows a sample of an embodiment of a tilting or pivot-arrangement of the invention for the pivoting or tilting of the fluid pipe structure of the invention.

Returning now to FIG. 4, it will be seen, that the body 31 of the craft has bearings 29, which are pivotably borne in bearing sleeves 30. The bearing-bodies 29 are borne in bearing sleeves or bearing houses 30 and are able to pivot or to 44 to 47 and the return fluid lines 49 are extended through the bearing bodies 29 and are fastened therein. As seen in the Figure, there are four bearing housings 30 and four bearing bodies 29 are pivotably borne therein. A cross-sectional view is seen in FIG. 9. The upper left bearing set 29-30 carries fluid delivery lines 35 and 45 and one or two return lines 49. The upper right bearing set 29-30 carries fluid delivery lines 37 and 47 and one or two return lines 49. The lower left bearing set 29-30 carries fluid delivery lines 34, 44 and one or two return fluid lines 49. The lower right bearing set 29-30 carries fluid delivery lines 36 and 46 and one or two return fluid lines 49.

The fluid lines, which extend through the bearing sets as described are preferred to be fluid pipes. For example steel pipes or light-metal pipes. If steel pipes are used, they may have walls of 1.2 to 2.5 mm thickness. Steelpipes have the feature to be easily weldable. At the innermost ends of the fluid pipes the pipes are open towards the interior of the body 31 of the craft, but they are at these ends provided with connection means for the pivotable connection to other fluid pipe poritons or they have connection means for the connection of flexible pressure hoses. On the other ends, which constitute the outer ends, the respective fluid lines are fastened to a respective entrance- or exit-port of the respective fluid-motor 4, 5, 6 or 7. Instead of fastening them directly to the said motors, also here additional connection means or flexible hoses might be interposed. However, it is preterred not to do so, but fasten the other, the outer, ends of the fluid pipes directly to the said fluid motors 4, 5, 6 or 7. On the inner ends however flexible connections to the fluid lines from the pumps are a must in order to maintain the seal of the separated fluid lines, when the bearing bodies 29 swing or pivot in the bearing housings or sleeves 30.

An important specificty of the invention is, that the fluid pipes, which were here described are utilized to form or to form together with additional means, the fluid-pipe structure for rigidly bearing the motors, propellers and-or wing poritons at vertical and at horizontal flight and also in the Inter-Thrust range, when the fluid pipe structure is swung or pivoted in the bearing sets 29-30. For this purpose the combining connecter portions 125 are provided to connect a respective right side structure with the leftside structure of the craft. The simplified term "structure" is used here and sometimes in the later part of the specification to indicate, that the said "fluid-pipe-structure" is considered by this single word. The connectors 125 are preferred to have rounded ends, which are connected to the ends of the respective fluid pipes of the left and right structure. It is preferred to weld the ends of the connecters 125 at a certain short distance before the inner ends of the fluid pipes to the fluid pipes. Rib-plates may be added. The feature of such arrangement is, that the fluid lines 34 and 37 and 44 to 47 as well as the return pipes 49 can then consist either of straight pipes or of pipes with only one bow and two straight ends. Such fluid pipes have the feature, that the interior of them can be cleaned easily from the straight ends. Such cleaning is important for every operation of a hydraulic or fluid circuit. For example, the welding of the connectors 125 to the structures will result in disturbation of the cleanliness of the inner face of the respective pipe and so will the welding of holding members for fastening of the fluid motors or of the wing-portions. Consequentely, after such welding and before the final assembly or filling of the fluid lines, the fluid pipes should be cleaned inside. For that purpose the straight ends of the pipes and the application of the connecters 125 with bows on their ends, are convenient and important. Fasteners 65 are either connected to the pipes or welded onto the respective fluid pipes 34 to 37 and 44 to 47. They have the purpose of easily fastening wing portions 24 to 27 or each one thereof thereon. The fasteners 66 may also serve to form and hold the airfoil-configuration of the respective wing portions 24 to 27.

FIG. 5 shows, how the fluid pipes are located by way of example and where the holders or fasteners 66 may be located relatively on the respective fluid pipes. Holders 14, which may be rivets or bolts or other means, are set through the fasteners 66 to hold the respective wing portions 24 to 27, whereof the upper and bottom portions 125 and 225 meet in plane 2056. The wing 125, 225 may then consist of two or several parts, which are hold by means 14 on fasteners 66 or the wing portions may even consists of a single form-piece of a cross-section as shown in FIG. 6. Such one piece wing portion could then from the ends be just moved over the fluid pipe structure and then fastend by bolts or like 14 on the fasteners 66. Between the separated fluid pipes of the structure ribs 59 may be set or welded.

Thus, the fluid pipes 34, 44, 35 and 45 together with the internal connectors 125 and the ribs 59 between the pipes and connecters are forming one rigig fluid-pipe-structure which carries two fluid motors 4 and 5 and two propellers 14 and 15 and which may in addition carry the wing portions 24 and 25. This single structure is pivotably borne in in the left and right front bearing sets 29-30 of the craft.

The fluid pipes 36, 46 37 and 47 together with the respective internal connecters 125 and the ribs 59 between the fluid pipes and the connecters 125 form an other rigid fluid-pipe-structure which carries two fluid motors 6 and 7 and two propellers 16 and 17 and which may in addition carry the two wing portions 26 and 37. This other single structure is pivotably borne in the rear left and right bearing set 29-30 of body 31 of the craft. How the described fluid-line structures are pivoted in the mentioned bearing sets 29-30 is by way of example described in detail in FIG. 9.

The described fluid-line structures are an important part of the invention. Mechanically operated vertically and horizontally flying craft with four propeller and two wing sets have already been proposed, for example in U.S. Pat. No. 3,181,810 to N. C. Olson and in U.S. Pat. No. 3,184,181 to S. J. Kaplan. Those mechanically operated craft however are very heavy because they need bone-structures for the wings to carry the wings and they need mechanical transmission means with many gears for turns and angles and holders for the transmission means from the engines to the propellers. The transmission shafts must be able to transfer the high torques. These number of parts required summarized a too heavy weight. It is therefore very doubtful if such mechanically operated convertible aircraft can ever obtain an efficient operation or even an operation at all. They are not seen in flight presently. And, if they would fly, they would require strong power plants of extremely little weight, for example like gas-turbines. That makes them expensive in purchasing costs and expensive in flight because of a high fuel consumption. In those patents of the former art of mechanically operated convertible aircraft there has also never been a satisfactory mathematical analysis of the features or troubles and drawbacks of single- or multiple-propeller arrangements.

On contrary to those devices of the former art, the present invention brings a very detailed and very accurate mathematical analysis of the powers and lifting capacities involved. The mathematics of the invention teach the higher carry- and lift-capacity of the multiple propellers at a given power supply.

The benefit of higher lifting and carrying capacity by the multiple propellers would however been lost again, when the mechanism to carrying and drive the multiple propeller sets would be heavier than the benefit of carrying capacity obtained thereby. It is here, where the weight of the fluid-pipe-structures and of the fluid motors, the fluid pumps, the engines and the quantity of hydraulic fluid to be carried are an important part of the invention.

For example, the four propeller craft of FIG. 2 will carry at 80 percent hydraulic efficiency about two times of what a conventional helicopter of equal power and equal propeller diameter would carry on gross weight. The 8 propeller craft of FIG. 3 would even have a still better carrying capacity of propellers if equal sizes would be used for equal total power installation.

From the gross lifting capacity however, the weighs of the wings, fluid-line-structures, fluid motors and propellers are to be subtracted. The weights of them are therefore of high interest. They are presently in the prototype of FIG. 2 as follows: Weight of each fluid motor is 8.6 Kg. Weight of each variable propeller is 11 Kg. Weight of each double fluid-line structure for a left and right fluid motor and propeller is 14.5 Kg each. The pipes in said prototype are of 16 mm outside diameter and of 1.5 mm thickness of the walls. Thus, the weight of the sum of the fluid motors, propellers and fluidline structures in FIG. 2 is less than 120 Kilogramm. That is a little weight, compared to the benefit of lifting capacity obtained by the arrangement. In comparison only the difference between said 120 Kg and the weight of the rotors and tail-structure of the common helicopter is the amount of weight by which the craft of the invention is heavyer than a conventional helicopter.

Quite naturally, at design and building of fluid line structures the laws of strength and rigidity must be obeyed. When my design, respectively, are used, there is no risk of break or unreliability and there is no risk of deformation. Also, it is important to use proper fluid motors. They are available from my respective patents and design with single or double rotors, with releasable couplings, with automatic free-wheeling and with propeller-pitch adjustment devices, according to the situation of actual application. The user is however be caused, that at present time there are no other fluid motors than those of the inventor available which fulfill these conditions. The world is governed by conventional achsial piston motors, which are very good for ground applications and also for the drive of assessories in aircraft, but which are not of the required nature and capacity for driving and holding propellers as such in the invention.

The fluid-drive separated flows of equal rate of flow system of the invention in combination with the little weight but strong fluid-pipe-structure of the invention are therefore an important means to reduce the weight of convertible aircraft and to increase their reliability and economy. In fact, the craft of the invention may be the first and until now sole convertible craft which can actually fly and do so with simple four cycle combustion engines.

On the wing portions 24 and 25 the ailerons 77 may be provided. The body 31 has mostly a side-rudder 9 and the rear wing portions 26 and 27 may be adjustable in its angle of attack in order to act as elevators in horizontal flight. As an alternative the wing portions 26 and 27 may also be pivoted in unison with the front wing portions and the rear wing portions 26 and 27 may then be provided with elevators 8. The rudder, ailerons and elevators may be operated mechanically, hydraulically, pneumatically or also electrically depending on the actual requirement and design. These details are not written in the Figure, because they do not bring principially new systems. The known systems are just differently set in the aircraft of FIG. 4. New are however the fluid pipe structures, the bearings of them, the extension of them through the bearing sets and other details thereof.

FIG. 5 which shows a sectional view along V—V of FIG. 4 demonstrates also, that the return fluid lines 49 may be set closely together in order to form a resistant triangular structure by the fluid lines for example 33,44 and 49,49. The return fluid lines 49 can also be combined to be a single fluid line. The triangular location on the corners of the triangle of the fluid-lines are part of the provision of rigidity and of strength of the fluid-pipe-structure. Together with the ribs 59 between the fluid pipes the fluid-pipe-structure is rigid enough to carry the fluid motors, propellers and wing portions without major deformation and without undesired vibrations. The fluid motors run smooth and without vibration anyhow and plural propellers of less diameter than a single big helicopter rotor run anyhow with much less vibration and unequal loads during a revolution than a big helicopter rotor does. Instead of using one-body or two body wings it is also possible to use wing-airfoil structure ribs and set thin covers over them. Instead of triangular location of the fluid lines rectangular placement, or placement of multiple forms like multiples are possible, if so required or desired.

In FIG. 5 a symmetric profile is demonstrated for the respective wing-portions. It is however also possible to use unsymmetric airfoils as in common aircraft. If those are applied, the airfoils should not be set absolutely vertically at take off or landing because they would supply a backwards directed movement. They would have to be tilted slightly forward for an actually vertical take off or landing. That will be described at hand of the later discussed FIG. 10.

Attention is further directed to the fact, that the wings in the FIGS. 2 and 3 are so dimensioned, that the propeller-streams flow over the major portion of the wings. Thereby the propeller-air-streams are providing an effect onto the wings so, as if the wing would fly through air. That provides lift, when the airfoil section is used or when the propellers are inclined relatively to the wing. The so obtained lift-action of the wings must be taken in consideration. It prevents to a great extend the possibility of stall of the aircraft; it prevents the break down of the undisturbed airflow over the wings and it allows high angles of attack relatively to the ground at time of Inter-Thrust-Range "move" of the craft. That is a feature, which was seldom or even never to such extend obtained in any craft of the past.

There exists even the posibility to lift the aircraft in horizontal location just by flow of the propeller-streams over the wings. That however is a specifity which again is discussed in "Handbook of my Flight-Technology". The dotted lines in the fluid motors of FIG. 4 demonstrate, that these motors may either be single rotor motors or double rotor motors, for example of my U.S. Pat. No. 3,977,302. When those double-rotor-motors of said patent are used, the number of fluid lines are as in FIG. 4 or they may even be doubled for application in FIG. 3.

FIG. 9 shows a schematic cross-sectional view along the line IX—IX of FIG. 4 and demonstrates a sample of a pivoting device to pivot the front structure and the rear structure in unison. It may also be used in the craft of FIG. 3 or in others. In the bearing-bodies 29 are the therethrough extending fluid lines—fluid pipes—35,45 or 37,47 etc. and also the return lines 49 provided and fastened. Control-fluid lines 101 and 102 may also extend through the bearing bodies 29 to be led from there to places to control propeller-pitches, propeller and fluid-motor retrcations, ailerons or elevators. Instead of control fluid lines mechanic, electric or other control means may also extend through the bearing bodies 29. The control means 101 may also extend to other controllers or rudders which are not mentioned here.

In body 31 of the craft the drive-motor 501 is provided and in the example of FIG. 9 the self-locking spindle 502 is extended through motor 501. Motor 501 drives the spindle 502 forward or backward to the left or right in the Figure. Motor 501 is remote controlled from the cockpit by the pilot, when the craft is flown by a pilot or otherwise it may be remote controlled from the ground. The control of the motor 501 is the control of the pivot-action of the wings, motors and propellers and thereby a mojor piloting action. It controls the varyation from vertical flight through the Inter-Thrust-Range to horizontal flight and vice versa. The speed of vertical flight like landing and taking off may be controlled by the engine accell, the adjustment of rate of flow of variable pumps or by the propeller-pitch.

A self-locking spindle and motor 501 and 502 is here preferred in order that probable vibrations will not move the spindle when not desired. The self-locking effect also serves to maintain the angle of pivotion or the angle of attack relatively to the ground at times when no pivotal movement is desired. The bearing bodies 29 have in the igure arms 509 on the front bearing body and 510 on the rear bearing body 29. Intermediate arms 505 and 506 are placed between the arms 509 and 510 and the spindle 502 and connected to them in swingable connections 507, 503, 504 and 508. Thereby the for- or back-movement of the spindle 502 actuated by motor 501 pivotes the bearing portions 29 of the front structure and of the rear structure in unison. The rearward location of spindle 502 is for the horizontal flight and the leftmost location of spindle 502 is for the vertical flight, brake or backward flight of the craft. The locations between those locations of extremes define the angle of attack or the pivot angle of the propellers, motors and wings relatively to the ground and thereby the move in the Inter-Thrust-Range. The extension of the move of the spindle 502 into an extreme frontward position is suitable to obtain an effective braking effect or backflight in the air at times when an obstacle nears the flight path of the craft. A fast-speed motor 501 is suitable and often desired for fast action of vonversion from horizontal to vertical flight and vice versa. In common transport aircraft the pivotal action may be suitable when it is slow, but in aircraft for sports and for acrobatics as well as for police or military craft the high speed motor 501 may be more desired.

The arrangement to control the pivotal action or said action in unison as shown in FIG. 9 is an example only. Any other reliable and suitable control mechanism may be applied if so desired.

It may also be mentioned, that one should not assume, that when the air-space would be overfilled with aircraft of this invention, that that would result in many accidents. Accidents are actually not required. Accidents are an appearance of high-speed aircraft, which lack the ability to rest in the air and which lack the ability to land at places which are no airports. The craft of the invention can fly in series or lines as cars are doing on the road and the already mentioned automatic radar control devices can automatically prevent collusions in the air. The devices of my U.S. Pat. No. 3,801,046 can also automatically force craft of the invention to fly behind each other with any given slow or high speed. It can also brake them automatically down to low speed, rest or back-movement. These means are as accurately possible as in cars on the road but even more better because of the automatic control by U.S. Pat. No. 3,801,046 which is not yet routine on cars on highways. In fact, the further possibility to pass another craft on a higher or lower flight level adds further safety and the fact that a craft in air has less resistance than a car on the road would even save fuel, when an equal number of equal fast aircraft would fly in the air instead of cars running on the road. Those possibilities have been highly desired, but they were never obtained because the proposals of the past lacked the manoverability of the convertible craft and they failed to become airborne because of their too heavy weight or they were too uneconomic because of the need of high power gas-turbines which can not be afforded by the average budget of average citizen.

In FIG. 7 one of those schematic plans is demonstrated, which the inventor prefers in the craft of FIGS. 2 to 4. Two power plants would be enough for the vertical take off and landing, but in this schematic three powers plants 1,2,3 are provided. The third of them is there for the remote possibility, that one of the power plants would fail just during a vertical take off or landing. In horizontal flight a single power plant would be enough to be kept air-borne. In the Figure the return fluid lines are not shown in order to keep the Figure free from an overload of lines and in order to keep it by simplicity in a form for easier understanding.

One reason for the use of three engine-hydraulic power plants or two of them also is, that they are available in a suitable power range of 80 to 180 HP each in my research institute. Of these sizes two engines would be anough to operate a vertical start or landing; one engine set would be nough to remain airborne and the third set will be available at an engine failure at vertical flight. In practice all two sets or there sets are running together but with lower rates of power when lower power is required or satisfactory.

An automatic power control may be provided for overriding the pilot's control or for overriding by the control of the pilot, depending on the rate of perfectness and extent of installation of the craft. Overriding automatic controls can therefore be spared, when not desired or when they are too expensive for the user of the craft. An overriding automatic control may for example hold three power plants at ⅔ or ¾ of maximum power during operation, but when one of the engines fails automatically and immediately bring the two other power plants to full gas or power. The pilot may then feel, that his craft now ascends a little bit slower and thereby feel, that one of the engines has failed. He may continue his ascend to override an obstacle, like a tree, a house or like or may continue his flight, when he desires only a short distance flight, or he may start his landing maneuver for repair or replacement of the third engine. Details thereof are again obtainable from "Handbook of my Flight-Technology".

At bigger size craft of the invention, for example, in long-distance craft or intercontinental craft of the principles of FIGS. 2,3,4,13 etc., the failure of one engine is no reason to stop the flight. At such bigger or longer distance craft such a number of power plants is applied, that the failure of one or two engines still allows the continuance of the flight. At Intercontinental or long distance craft the engines can even be repaired in flight or replaced in flight, because the engines and pumps are located in the body of the craft and they can be reached for repair by the mechanic. Engine-hydraulic power plants as in the invention can be shut off from the fluid lines and the other sets of hydroengines can then continue to drive the craft. After repair of an hydraulicengine set it can be connected to the respective fluid lines again. The case of engine failure of an intercontinental craft of the invention over the ocean will even, when there are no means for repair, not prevent the aircraft from reaching its destination. It may just force the aircraft of the invention to continue the flight with slower speed and thereby to save fuel—see equation (16)—which then would just result therein, that, when an engine failed over Paris, the New York bound craft would just-because of the engine failure-become able to fly not only to New York, but even to Chicago, just because it was forced to safe fuel because it has one engine less in operation. The only discomfort would be, that the flight would last a longer time.

The possibility of continuing travel even at engine failure and the possibility of repair of engines or transmissions at travel are nowadays not yet common even not in road traffic.

The four from each other separated pressure fluid flows of equal rate of flow which are produced in four separated working chamber groups with four separated outlets in the pumps 1,2,3—which may for example b pumps of my U.S. patents, as mentioned eariler—extend as flows 61,71,81 and 91 from pump means 1 of power plant 11 to the upper rotors 4,5,6 and 7 of the four double rotor motors of, for example, my U.S. Pat. No. 3,977,302 and help to drive them.

Similar four fluid flows extend from pump means 3 of power plant 13 as flows 63, 73, 83 and 93 to the lower rotors 54, 55, 56 and 57 of the said fluid motors and help to drive them.

When—which should not happen—foreign particles, like dust or shavings enter one of the rotors and block the rotation of one of the rotors, the power plant will be stopped because of overloading. The other rotors will then continue to drive the shafts to the propellers. The communicated set of rotors in the motors, whereof one is blocked, are then overrun by the revolving shafts by one-way or free wheeling means thereof. Thus, even a blocking of a rotor of a propeller motor will not prevent the craft from flying.

The similar flows 62,72,82 and 92 are extending from the pump means 2 of power plant 12 over one way check valves as in FIG. 6 or over similar one way flow means to fluid lines of the other pump and engine sets. So, for example,

--- fluid flow 62 enters over the valve into fluid line 61 and/or 81;
fluid flow 72 enters over the valve into fluid line 71 and/or 91;
fluid flow 82 enters over the valve into fluid line 63 and/or 83;
and
fluid flow 92 enters over the valve into fluid line 73 and/or 93.

---

In case of blocking of one of the motor rotors the full power of the drive-set 2,12 will then flow in the rate of ¼ of the full power of set 2,12 into the other rotors of the four fluid motors and drive them accordingly in addition to the flow from the other still operating drive set 1,11 or 3,13. In case, all rotors are healthy each of the rotors of the four motors will then obtain one eighth of the power of the drive-set 2,12.

It would also be possible to apply four, five or more drive sets, so, that the specific communication of drive set 2,12 can be spared. Instead of double rotor-motors it is also possible to apply single rotor propeller motors. At small craft as shown in FIGS. 2 and 3 it is however desired to limit the number of power plant sets in order to keep the total weight low for a smooth vertical take off and landing of the craft.

In this connection it should also be mentioned, that the world today is led by axial piston pumps and motors. While those are suitable for ground application, it is not necessary, that they are also suitable for main propeller drives of vertically taking off aircraft, where the life of the pivot and of the passengers depends on the reliability of the pumps and motors. Under the decades long application of axial piston motors the impression has arisen worldwide that only achsial piston pumps and motors are reliable and useful. Radial piston devices and radial chamber devices have for the medial and high pressure ranges almost disappeared from the markets during the fifties and sixties.

This historical development is however not entirely directional for application in aircraft. Because the axial piston devices have connections between the pistons and the shoes or the drive flanges for the conrods to the pistons and of them to the pistons. Thus, when in such axial piston device a dust partical of too big size and of too strong material would enter the clearance between the piston and the cylinder, the drive mechanism of the piston or for the piston would break. Axial piston motors are further single rotor motors. If in such motor such fatal break would happen, such motor-break would be fatal in a multi-propeller aircraft at least at vertical flight, like vertical take off or landing. This shows, that the reliability on ground and the almost force-governing of the hydraulic market by axial piston devices can not give any absolute guarantee for safety in an aircraft of ability for vertical flight. It is rather highly riscful to use such axial piston pumps and motors in vertically taking off and landing aircraft, because of the fatalness of sticking of a piston in a cylinder.

In the radial piston pumps and motors, which I apply in vertical take off and landing aircraft, there are no connections between pistons, shoes and drive means, like piston stroke actuators or guides. My U.S. Pat. Nos. 4,037,523 and 3,949,648 clearly show, that the pistons, piston shoes and actuator or guide members are completely unconnected. The pistons and shoes float freely in a bordered space. When one of the pistons of them would stick in the cylinder because of an equally disastrous dust particle, that would not lead to a stopping or breaking of the pump or motor. The sticked piston would just rest in the innermost location in the respective cylinder and the other pistons of the same rotor would continue to work. A respective pump or motor would just lose a seventh or nineth of power and its running and torque would become at little ununiform, but the sticking of the piston would not be fatal.

It may again be noted, that two power plants and pump sets would also be satisfactory, if correctly designed and build. In such case however, an engine failure during vertical flight might lead to a ceratain descend of the aircraft when no other emergency devices like auto-rotation of the propellers or the like would take an immediate action. Many fluid motors of the inventor include such automatic auto-rotation of the propellers in vertical flight like landing or taking off. It may be mentioned also, that in many countries the use of a single power plant is allowed by law to drive and operate a helicopter. Thus, even a single power plant may be operated in the craft of the invention, when a certified aircraft engine or like is used. The pump means may then be a four-flow, six-flow, eight-flow device, according to the actual situation. Instead of setting two wing-portion pairs onto the body of the craft it may also be possible to set one wing portion pair or three, four or more wing-portion pairs and propeller-pairs. The multiple arrangement is especially suitable when the aircraft shall serve as a weight carrying transporter.

The mentioning of an intercontinental aircraft of the invention shows, that there are presently not many limits as to the increase of the size of the aircraft. For the individual or for the family however a simple and inexpensive craft is the first desire. The sizes of the aircraft of the invention can even be reduced to smaller scales and be minimized in size. That however requires an increase of power of the power plants. The smaller the size as higher is the fuel consumption for a given carrying capacity. As larger the size of the aircraft is for a given carrying capacity as lower will mostly be the fuel consumption. That shows, that the economy of operation may increase with the outer dimension of the craft. The bigger sizes are otherwise tending however to more float in the air and beeing of slow motion and delicate to turbulence in the surrounding air, while the smaller dimensioned craft are less delicate at turbulent air, faster maneuverable and speedier, but as the technological consequence also more expensive in operation and more fuel consuming. In small dimensioned craft, the four cycle engine may not be strong anough and small shaft-gasturbines may be required. They are adapted to drive the multi-separated flow pumps of the inventor. Such gas-turbines are extremely powerful at a very little weight. For example 300 or more horsepower at a weight of around 65 Kilograms. Details thereof are again visible in "Handbook of my Flight-Technology". However, such gas turbines have a certain fuel consumption. I therefore attempted to utilize four cycle engines. It is not required to use common aircraft engines. The common aircraft engines have until now not proven to be specifically suitable for the aircraft of the invention. They are too heavy, because they are designed to revolve with such revolutions which are suitable to flange the propeller onto the crankshaft of the engine. They also fail to have flanges, whereonto the pump sets could be fastened. In addition many of them fail to have the cooling fans for aircooling of the engine at vertical flight when there is no cooling airflow over the engine. Consequently straneous affords have been necessary over three decades to develop suitable hydrofluid conveying engines. They are now available in aircooled and also in watercooled versions, they are of little weight relatively, and they are also reliable in operation.

The weight-lift balance of the craft of FIG. 2 is presently, when 2.4 meter diameter propellers of Hoffmann composite light weight types are applied, as follows:

| Weights: | | |
|---|---|---|
| Fluid motors 8 kg each (4 pieces) | | = 32 Kg. |
| Propellers = 6 Kg each (4 pieces) | | = 24 Kg. |
| Fluid pipe structure without bearings | | = 18 Kg. |
| Fluid pipe structure bearings | | = 10 Kg. |
| Wing skins (four sets) | | = 52 Kg. |
| Light weight body | | = 58 Kg. |
| one EHP power plant including pumps | | = 99 Kg. |
| two 150 HP gas turbine EHP sets incl. pumps | | = 102 Kg. |
| Pivoting control arrangement | | = 10 Kg. |
| Flexible fluid hoses etc. | | = 10 Kg. |
| Total; excluded personal and fuel and tanks: | | = 415 Kg. |

Lifting Capability

Installed power = 410 HP max.
Available to the propellers = 308 HP.
Lift = fl = 12.3 × fn = 47 × fp = 1.8 = Lift  Max. = 1040 KG., which gives enough reservation for the pilot and fuel. When one of the main engines fails at start or landing procedures with vertical wings and propellers, the power reduces maximally to 260 HP, giving into the propeller = 195 HP, whereby fp reduces to 34. Thereby the maximum of lifting capacity reduces to 1040 × 34/47 = 752 Kg. To prevent the remote possibility of engine failure at vertical flight with difficulty of continuing to fly and to prevent accidents, that craft should not be loaded higher than to a total weight of 750 Kilograms. Thereby the craft obtains the ability to continue its move or hovering in the air, even, when one of the main engines fails during the critical period of vertical start or landing. The gas turbine EHP's fivefold the price.

The weight-lift capacity balance of the example for the 2.4 meter propeller craft shows, how relatively low the weight of the structure of the invention is. The fluid motors are specifically designed to fit directly to the structure of the pipes of the invention. They can be fastened each by 14 M-8 inside hexagon bolts, also called cap screws. The propellers in this ample are non-variable pitch propellers. These have the feature, that they are extremely reliable. They are made practible in the invention by using variable DAV pumps of my products, patents or applications. At vertical lift the propellers require high torque to become revolved. The pumps then run with smaller piston strokes for delivery of a lower quantity of highest pressure fluid. At later horizontal flight the propeller pitches which are non-variable are, however, then working at small angles of attack because of the higher speed flight through the air. Thereby they are requiring less torque and can therefore revolve with higher rotary velocity to still beat in the air.

Figure 8:
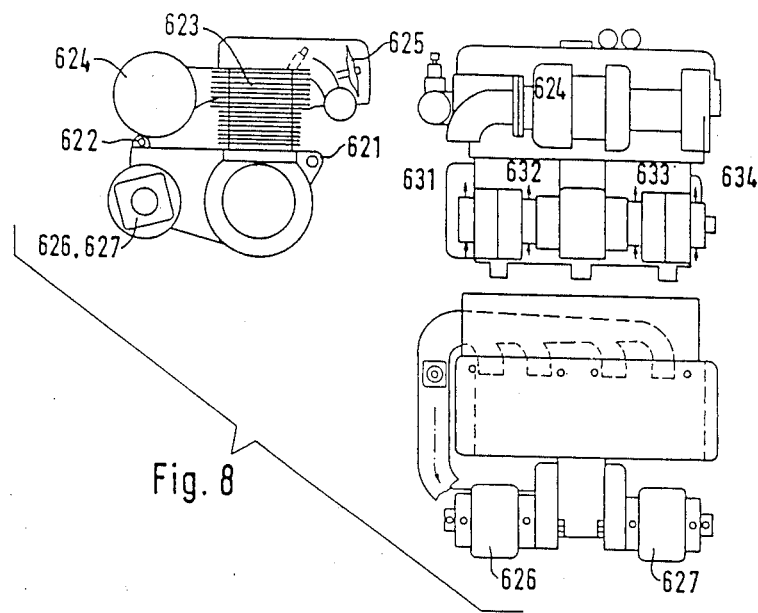
FIG. 8 shows an embodiment of a sample of the engine-hydraulic power plant, which can be used in the invention and which is now commercially available from my research institut.

At the forwards flight speed of medial forward velocity of the craft, the two gasturbine EHP sets can be shut off and the aircraft can then fly solely on the more fuel-saving EHP power plant of FIG. 8.

In this explained sample, the aircraft is an extremely safe craft. Because the constant pitch propellers are reliable and do not break. No variable pitch arm fittings are there and they can not break. At engine failure at only limited height above the ground, the common helicopter may not have enough time to change to autorotation and may then crash. But the craft of the above example will not crash at an engine failure, because the remaining two engine hydraulic power plants will be enough to continue to carry the craft at hovering, flight or even slight ascent to overcome an obstacle in the flight-path. This is a feature, seldom obtained by a helicopter or any other VTOL craft. These features are obtained by the structure of the pipes of the invention in combination with the holding of the motors, wings and driving of the propellers by the fluid through them. Because the savings obtained in weight by the invention are enough to employ the third power plant, the gasturbine-pump EHP set of 51 Kg of weight and 150 HP max, which are the space engine for the safety at vertical take off and landing. Obviously no former art concept has made a craft with enough reduction of weight to make the carrying of a safety providing plus-power engine possible in a VTOL aircraft which carries at vertical lift or descent the wings in addition to the propeller rotors. In each discussed EHP set the pumps are incorporated to the engine set and made to fit to the pipe structure of the invention. The fluid motors are made to fit also to the pipe structure of the invention and they are made to hold and drive the propeller as well as including the bearings for the holding of the propeller shaft, which in this case is the motor shaft. The thrust taking bearings are also in the fluid motors. All holdings, bearings and like of the former art have thereby been spared. Weight of the craft is reduced.

The sample of a hydraulic-engine power plant of FIG. 8 may be utilized as one of several possibilities to serve as drive set 1, 11, 2, 12, 3, 13 of FIGS. 2 and 3 or 4 or as drive sets in other Figures of this application. It consists of a combustion engine portion 623, a cooling means 625 which is commonly an air-cooling but may sometimes also be a water-cooling, a fastening means 621, 622, a turbo-charger 624 and double-flow or multi-flow hydraulic pumps 626 and 627 with delivery ports 631 to 634 for the delivery of four separated flows of fluid of equal rate of flow. One of the features of the sample of FIG. 8 is, that the power may be taken of from the crankshaft in the middle between a plurality of cylinders. So far that is generally known and exercised and has the feature, that the crankshaft can be of little weight. A specific feature of the invention however is, that two double flow pumps can be mounted head to head into a single drive-wheel. The drive wheel may be driven from the crankshaft-middle by gears or a chain (or chains). the thrust forces or traction forces exercised onto the drive wheel by the chain or gear can at this arrangement be counter-acted by the forces of fluid in the cylinders of the pumps onto the rotors of the pumps. By this arrangement the resultant of load on the drive-wheel between the pumps can be reduced relatively to other arrangements or the wheel can even float between those opposing forces, whereby friction in the bearings of the drive wheel can be reduced.

In a practically applied sample of such powerplants, build by the inventor, the engine portion including the turbocharger weighs about 75 Kg including electric starter motor and can make about 100 to 120 HP depending on charge-pressure and fuel. As two-cycle engine according to an U.S. patent application of the inventor it can make 150 to 180 HP at reduced weight of only about 70 Kg. The pump sets used in this power plant set are standard products of the inventor, can be obtained from the inventor and weigh according to respective type about 5.6 to 9.0 Kg. Each pump takes about one half of the power of the engine and delivers about a fourth of the power of the engine to each of the separated four flows. The power is however reduced by the efficiency losses in the pumps. These are however small.

The power plant for the delivery of separated flows of hydraulic fluid of FIG. 8 is, however, only one sample of the drive sets which are now available through the research institute of the invention. For long-time or long-distance travel, watercooled engine sets with or without turbochargers are occasionally applied for the long distance flight, while gasturbines or engine sets as that of FIG. 8 are added and operated only at the short times of vertical flight.

Figure 10:
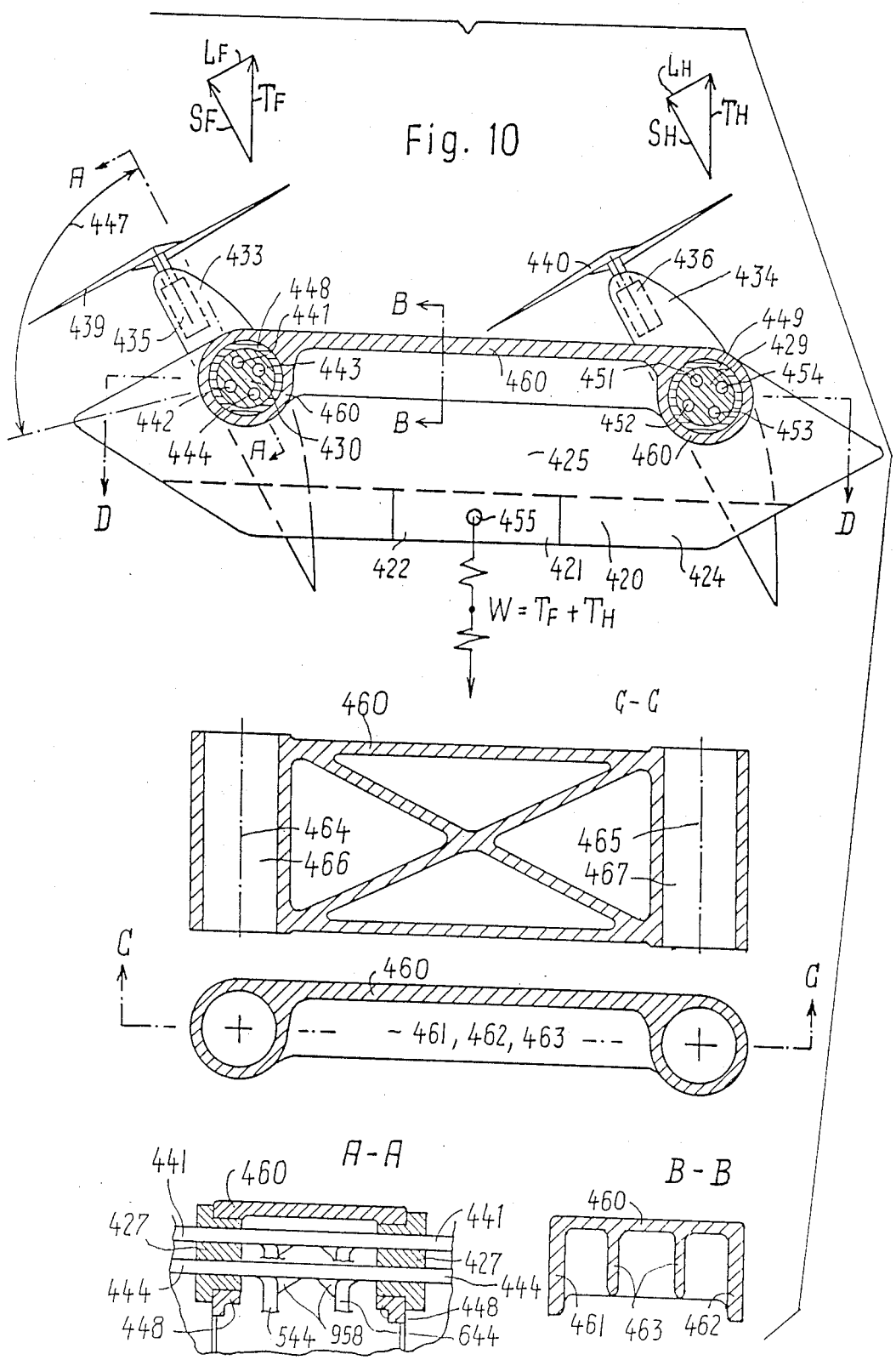
FIG. 10 is a longitudinal sectional view through another embodiment.
Figure 11:
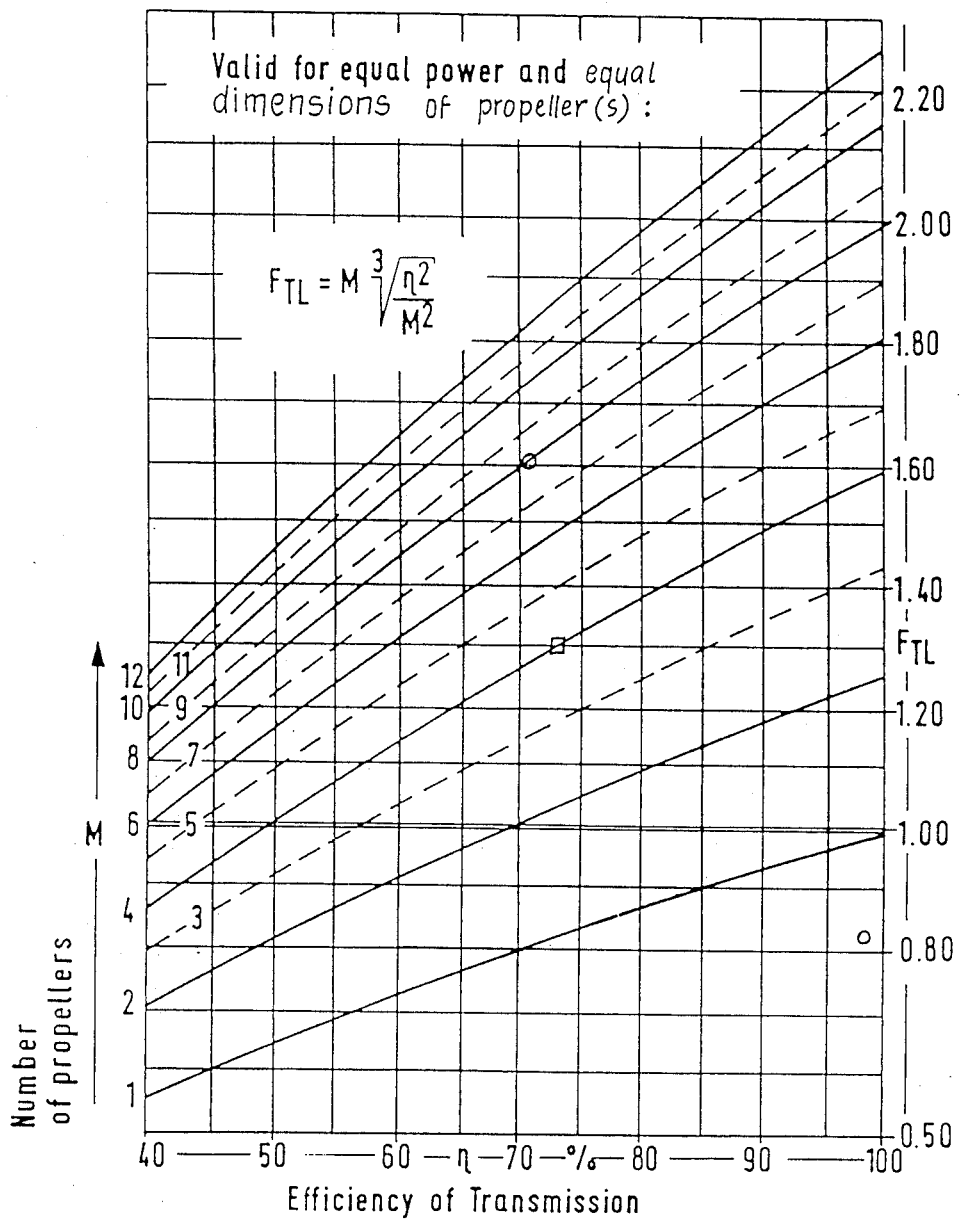
FIG. 11 is a schematic diagram which shows accurately the comparison factor "Ftl" of the invention.

In FIG. 10 a double winged aircraft is shown, having a body 420 with a heavy weight compartment 424 and a freight or passenger cabine 425. The heavy weight compartment preferably contains the power plants, engines, pumps, 421 and 422 and other heavy material to form the weight center in the middle, but low in the body 420 of the aircraft. The body 420 is also provided with two or more wing bearings 448 and 449 wherein the main bone-structures 430, 429 of the wings 433, 433 can be pivoted with said wings at an angular interval 447. The main bar or main bone of the wings may contain fluid lines 442, 443, 444, 441, 451, 452, 453, 454 to fluid motors 435, 436 for driving the said motors and thereby the propellers 439, 440 which are associated to said fluid motors. Said fluid lines communicate respective chamber-groups of respective pump means with respective fluid motors.

The propellers 439, 440 force air with high velocity over the wings 433, 434. The profile of said wings then provides a wing-lift L which is named LF for the front wing and LH for the rear wing. The direction of said wing lifts LF and LH is however not upwards, but upwards to the rear as shown in the component arrow diagram of the Figure when the wings have the angular private-position as shown in the Figure. At same time the propellers 435,440 provide a traction S in the direction of the axis of propeller and fluid motor. Front traction is cited by SF and rear traction of propeller is cited by SH. The component of forces diagram show, that these forces SF plus LF summarize to the upward directed front force TF and at the rear of the craft the forces SH and LH summarize to the upward force TH. Both forces TF and TH are upwards directed, parallel to each other and equally distanced from the center of the craft. The weight W is downward directed from center 455. Forces TF plus TH and contrary directed force W keep the aircraft in straight position. Increasing the sum TF plus TH over W brings vertical upwards move of the aircraft. Equalizing gives hovering and decreasing of the sum TF+TH below W gives vertical sinking of the aircraft of the Figure.

For forward flight both wings 433 and 434 are downward forwardly inclined within the range of angle interval 447 depending on the desired flight path of the craft relative to the horizon.

It might be of interest, that the setting of the best angle of the wings relatively to the body and ground will increase the overall lifting capacity in vertical direction. In the craft of FIG. 2 for example, when it has 2.4 meter diameter propellers and 2.4 meter wing portions of 2 squaremeter projection area, the best angle between SF and TF or SH and TH is about 12.5 degrees which is an inclination relatively to the body and the ground of about 77.5 degrees. The overall vertical lift is then 2.4 percent higher, than the vertical lift of the propellers without wings would be at vertical axes of the propellers.

The lift-weight balance becomes less favorable, when no gasturbines are applied and only the fourcycle power plants of FIG. 8 are used. The better lift-weight balance is thereby more expensive.

A further feature of the invention is, that practically unbreakable propellers can be utilized at certain embodiments. For example, propellers, which have a constant pitch, but which are made of a single piece of material. For example of wood, compound, plastic, metal. Integral arms are then extending oppositely from the medial portion or flange portion. The fluid motors include the bearings to bear the rotor, whereby the rotor of the motor acts as propellershaft and every propeller bearings of the former art are spared and not necessary. A good angle of attack for such fixed pitch one piece propellers is between 8 and 20 degrees at $\frac{3}{4}$ of arms. It should be understood however, that such propellers are not suitable for the known mechanically driven VTOL craft with pivotable wings. Because to make the application of fixed pitch propellers, which do not break and which are of little weight only and which are inexpensive and reduce the weight and cost of the craft of the invention, it is necessary to apply a high torque to the propellers at vertical lift with slower propeller revolutions and to apply a higher rotary velocity with lesser torque to the propellers in the forward flight. Because in the forward flight the "Cw" value of the propeller goes down, because of the then smaller relative angle of attack to the air. But at hovering for example, the relative angle of attack in the air and to the air is higher, which gives a higher "Cw" value and therefore requires a higher torque. This problem is managed at a given power of the power plant(s) according to the invention thereby, that the delivery quantity of the pumps becomes made variable. The pumps 1, 2, 3 or 626, 627 are then variable pumps. They then supply high pressure fluid at a lower rate of flow at vertical propeller axes, but higher rate of flow with medial pressure at the forward flight of the aircraft. The pipes of the structure must be of small diameters and their axes must be distanced from each other by multiples of their diameters in order to obtain the rigid structure, capable of carrying a load in two normal to each other planes.

The embodiments shown in the Figures are examples only. When the rules of the invention are obeyed, many modifications, departing from the Figures are possible without leaving the scope of the invention. Several embodiments of the application may be applied not only in vertical take off capable aircraft but also in horizontally flying, starting and landing craft. For example, the retractable propellers and fluid motors of the invention as well as the fluid-pipe-structures of the invention, which carry the wings, whereby the wings carry the craft.

The application shall further serve to give a first impression about the many possibilities which arise by the utilization of the drive and control-systems of the invention. For an understanding of all technological details and calculations the study of the "Handbook of my Flight-Technology" is recommended because for designing and building of aircraft more knowledge is required than just the teaching of a patent application. The mentioned handbook is a compact short-cut on 600 pages (about) of the 50 million words and testrecords, which have over 30 years of intensive work led to the less weight, compact and powerful devices like power plants and hydraulic devices, bone structures and other details of the invention.

Of the many possibilities this short patent application can bring only a few examples and embodiments. The sizes which are shown in the specification bring also only a few of many different sizes and powers. The mentioning of sizes and powers in the application shall therefore not give the impression that the invention is materialized in practical building and testing only for the specific sizes given. The "Handbook of my Flight-Technology" contains on its end the numbers and titles of my about 470 patents and also numbers and titles of about an equal number of scientific reports and test-reports, development reports and like.

The factors "fl", "fp", and "fn", which were used in the Lift to weight balance of the example, are taken from the mentioned book "Mini Introduction to a new technology" and they are the lift factor "fl" defined by the number of the propellers, the propellerfactor "fp" defined by the diameter of the propeller(s) and the power factor "fn" defined by the HP which are supplied into the respective propeller(s).

In summary, the embodiment of the invention consists at least of:
(1.) In an aircraft in combination; a novel arrangement, which comprises: a body 31, at least one power plant 10, at least four propellers, 14 to 17 at least two pairs of wing-portions 24 to 27, a fluid transmission, comprising fluid motors 4 to 7 between said power plant 10 and said propellers 14 to 17 to revolve said propellers by said motors with equal speed, means 501 etc, to vary the angle of said wings and propellers relatively to ground, means 7.2, 34, 35, 44, 45, 4 to 7 etc., to synchronize the rotary velocity of said propellers 14 to 17 to equal speed and a novel structure;

wherein said novel structure includes at least three pipes, i.e.: 34, 44, 49 etc., whereof at least one pipe 40 is laterally located of the at least two other pipes 34 and 44 and the distances of the axes of the pipes are multiples of the diameters of the pipes, wherein at least two of said pipes i.e.: 34 and 49 or 44 and 49 or 34, 44, 49 etc. are utilized as fluid lines to carry in one line fluid to a motor and in the other line; i.e.: 4, or 5,67, fluid away from said motor, wherein said structure includes ribs 59 between said at least three pipes 34, 44, 49 to prevent deformation and dislocation of said pipes relatively to each other;

wherein said pipes and said ribs form a rigid structure, i.e. 34, 44, 49, 59 of capability to carry a load, wherein the outer ends of at least two of said pipes are connected to ports of one of said motors; i.e. 4, 5, 6, 7 wherein said structure carries and holds on said outer ends of said pipes i.e. 34, 44, 49 at least one of said motors; i.e. 4, 5, 6, 7 wherein holding means 66 are provided on said structure, i.e. 34, 44, 49, 59 wherein said holding means are utilized to hold and carry at least one of said wing-portions; i.e.; 24; or 26, 27, 25;

wherein said structure includes a pivotable bearing means; 29, wherein said bearing means is carried in a bearing housing 30 provided on said body, 31, wherein the inner ends of at least two of said pipes are flexibly connected to ports of a pump means 7.2 or 3 in said transmission to carry fluid from said pump to said pipes and vice versa;

whereby said structure provides in combination: the holding of said motor, the holding of said wing, the temporary variance of the relative angles of said propellers and of said wings relatively to the ground, the transfer of motor-driving pressure fluid to said motors to drive said propellers and the carrying of said body by said wings and said propellers during operation of said aircraft in the air.

or, in addition;

(9.) The aircraft of 1,
wherein said propellers 14 to 17 are fixed pitch propellers of single body configurations with arms extending radially from a medial flange portion, said arms are integral with said flange portion, and the angles of attack of the arms of said propeller are set to work with best efficiency at a predetermined forward speed of the craft, and,
wherein said fluid transmission means includes pumps, 7.2 or 3 or 626, 627, which are variable pumps and which are working with the maximums of said forward speed of said aircraft, while their strokes and delivery quantities are reduced to shorter strokes and smaller quantities of deliveries of fluid, but set to deliver higher pressure in fluid, when said propellers are departed with their axes substantially away from the horizontal direction of the said axes of said propellers.

Or:

(10.) The air craft of 1,
wherein the length of the laterally from the body of the craft extending wing portions 24 to 27 are almost equal in length to the diameters of said propellers 14 to 17 and their projection area equals one third to one half of the cross-sectional area of the respective propeller, and,
wherein for hovering and vertical movement of said aircraft the wings and the axes of the propellers are inclined forwardly under an angle of 12.5 plus minus 5 percent in order to increase the lift of the craft by the summation of the propeller thrust components and the lift components of the wing portion to a substantially vertically directed lift which exceeds the thrust of the propellers.

Or; at least (2.) In an aircraft in combination; a novel arrangement, comprising: a body 31, at least one power plant 10, at least four propellers, 14 to 17, at least two pairs of wing-portions 24 to 27, a hydrostatic fluid transmission, comprising, a pump 7.2 to 3, arrangement and fluid motors 4 to 7 between said power plant and said propellers to drive said propellers by rotors of said motors with one propeller each fastened to at least one rotor of one of said motors, means 507, 29, 30 etc. to varify the angles of said wing-portions and propellers relatively to the ground, synchronization means i.e.; 7.2, 3, 34, 44 etc. in said hydrostatic transmission to synchronize the rotary velocities of said propellers 4 to 7 or 140, 150, 160, 170 etc. equal speed and a novel structure in a plurality of such novel structures;

wherein said novel structure includes at least three pipes; 34, 44, 49 or others;

wherein one of said three pipes i.e. 49 is located laterally of the other two, 34, 44, of said at least three pipes;

wherein said structure includes diagonal ribs 50 between said at least three pipes to prevent deformation and dislocation of said pipes relatively to each other;

wherein said pipes and said ribs form a rigid structure of a capability to carry a multi-directional load of at least two components of directions of load whereof one of said components is substantially normal to the other of said components of directions of load;

wherein said pipes with the exception of a probable slight inclination relatively to each other are substantially parallel to each other and are of diameters of a fraction of the distances of their axes from each other;

wherein the outer ends of at least two of said at least three pipes are connected to ports of one of said motors;

wherein said structure carries and holds on said outer ends of said pipes at least one motor of said motors;

wherein at least two of said pipes are utilized as hydrostatic fluid delivery and fluid return lines to lead in one of said pipes fluid from said pump arrangement, i.e. 7.23, to said motor, i.e. 4, 5, 6, 7 and in the other of said two pipes fluid away from said motor and at least indirectly back to said pump arrangement;

wherein holding means 59 are provided on said structure;

wherein said holding means are utilized to hold and carry at least one portion of said wing-portions; 24, 25, 26, 27 wherein said structure includes a pivotable bearing means; 29, wherein said bearing means 29 is pivotably borne in a bearing housing, 30, which is provided on said body; 31, wherein said pump arrangement delivers plural separate fluid pressure flows i.e.: 34, 35 of proportionate rates of flow equal in number to the number of said motors, i.e. 4 to 7 and equal to the number of said propellers; i.e.; 14 to 17;

wherein each of said delivery fluid lines passes one of said separate flows of proportionate rate of flow to one of said motors to assure by said proportionate rates of flows proportionate angular rotary velocities of the rotors of said motors and thereby of said propellers; and;

wherein the inner ends of at least two of said at least three pipes are movably connected to ports of a pump means of said pump arrangement in said transmission to lead fluid from said pump arrangement to said pipes and vice-versa;

whereby said structure provides in combination;
 a; the holding of said motor; i.e.: 4 to 7;
 b; the holding of said wing-portion; i.e.: 24 to 27;
 c; the temporary variance of the relative angle of said propeller and of said wing-portion relatively to the ground and to said body;
 d; the transfer of motor-driving pressure fluid of a rate of flow proportionate to the respective rate of flow of fluid in an other structure of said plurality of structures to and from said motor to drive said propeller with a rotary angular velocity proportionately relatively to the rotary angular velocity of an other of said propellers and whereby said structure also provides
 e; the carrying of said body 31 by said wing-portion i.e.: 24 to 27; and said propeller i.e.: 44 to 17; during operation of said aircraft in the air.

Or; in addition:

(3.) The aircraft of 2,
wherein two of said structures 34, 44, 49 and 35, 45, 49 are combined together on their inner portions of form a common structure with oppositionally directed outer portions,
wherein connecters which include at least three medial connection pipes 725 are provided on the inner portions of said structures to connect said structures rigidly;
wherein each of said inner portions of said structures is provided with one of said bearing means 29 and wherein said bearing means are pivotably borne in a pair of bearing housings 30 of said body.

(4.) The aircraft 3,
wherein said medial pipes 125 of said connecters are fastened to said pipes 34, 44, 49, 35, 45, 49, of said two of said structures in a small distance from the said inner ends of said pipes of said structures and said medial connection pipes of said connecters include laterally bent portions on the ends of said medial connecter pipes to permit open inner ends of said pipes of said structures for cleaning of the interiors of said pipes and for smooth connection of said pipes to at least partially movable fluid lines 61, 62, 72, 73, 81 82, 91, 92, 63, 71, 83 or 93 between said inner ends of said pipes of said structures and said pump means 7.2, 3, of said pump arrangement, while said medial connection pipes form between said bent portions on their ends medial connecter portions of substantially parallel axes and one of said medial connecter portions laterally to others of said medial connecter portions.

(5.) The aircraft of 3,
wherein at least two of said combined structures 34,35 etc. and 36,37 etc. are provided, one thereof on the front-portion and one thereof on the rear portion of said aircraft, 37,
whereby said aircraft obtains at least four propellers, 14 to 17 or additionally 140,150,160,170, and at least for wings 124 to 27 with each two thereof oppositionally directed and located relatively to the longitudinal medial vertical plane through the body of said aircraft.

(6.) The aircraft of 5,
wherein a common control means i.e.: 501 to 510 is provided and attached to said structures to incline the angles of said wings 24 to 27 and the axes of said propellers 14 to 17 in unison in proper relation to each other relatively to the ground and to said body 31.

(7.) The aircraft of 2,
wherein the axes of said propellers 14 to 17 are slightly inclined relatively to the angle of attack of said wings, 24 to 27.

(8.) The aircraft of 5,
wherein said propellers 14 to 17 or 14 to 17 and 140,150,160,170, have diameters in proper relation to the length of said wings 24 to 27 in order to create a lifting effect on said wings by the stream of air which is blown by said propellers over said wings.

When the common helicopter are investigated it is easily found that it is not easy to carry a craft on propellers in the air. The helicopter therefore require very big diameter and sophisticated rotor blades because otherwise, if they use small diameter propellers, the required power would become too high and the vehicle would become very uneconomic in operation with only a short flight capability.

The present invention now teaches that this problem can partially be overcome by the provision of the multiple propeller pairs with equal speeds of the propellers and with equal dime ions and directions of the propellers. The "Ftl" factor of the invention gives a very accurate picture of the influence of the efficiency of the transmission and of the number of the propellers which are applied.

That alone, however, can not provide an economic vertical take off vehicle with wings. Because the wings have an own weight. A vehicle of the invention must not carry only as much weight as a comparable helicopter, but in addition it must carry the wing portions which constitute a considerable portion of the entire weight of the craft. Ideal would be if the craft can carry the weight of the wings without adding weight to the comparable helicopter.

All features of the invention would be lost if unsuitable heavy or ineffient components would be used. It is, therefore, extremely critical to use the correct and efficient components. For example, the power plant(s) must run with a speed in excess of 2000 revolutions per minute and so must the pumps because otherwise the engines and pumps would be too heavy and the craft would not lift. The fluid used in the transmission must have in the delivery pipes in excess of 1500 psi pressure because otherwise the pump, pipes and motors would become much too heavy and the aircraft would not lift. Further, the pipes of the pipe structure must have a specific thickness of the walls and they must be of a specific diameter in order to realize a light weight structure with capability to lead the fluid and to carry and hold the wings.

If these rules are not obeyed the aircraft can not lift vertically off from the ground.

It is further suitable to make the wings able for assembly and disassembly on the pipe structure. The wings must be low weight wings and they shall not be used holding means in the bearings. Since the pipes and the wings may be of different material with different elongations at different heat, the fastening of the wings to the structure must be done as described in the specification. The details of the pipe structure are investigated in the following:

The equation (14) which led to FIG. 19 is the basic discovery of the invention because it exactly evaluates the situation including efficiencies in the transmissions for vertical take of a landing aircraft.

The actual structure of the aircraft off the invention is the result of the basic consideration which led to equations (13,14) and FIG. 19. The significance of this "Ftl" factor for the actual building of economic vertical take off aircraft will become apparent when an example of such aircraft will be calculated. This will now be done in the following.

For the start of the calculation the diameter of the propellers shall be defined, because the aircraft may have to be put into a small car's garage or it may be forced to fly in narrow spaces, to start or land from or on narrow gardens and the like. It will therefore be defined in this example, that the diameter of the propellers shall be 2.4 meters. These propellers are available by composite construction from the inventor for whom they are built, for example, by the Hoffmann propeller works. The next means is the power plant and it shall be able to supply abt. 267 horsepower.

Assuming these data applied to the common one rotor helicopter, the tail rotor would use a portion of the output of the power plant and the gears between the power plant and the main rotor as well as between the power plant and the tail rotor will have some losses which reduce the usable power further. Estimating 25 percent overall losses, the useable power supplied into the propeller will be $266.67 \times 0.75 = 200$ horsepower. At this power input the 2.4 meter diameter propeller will, according to equation (13) lift: $\sqrt[3]{2} \times 0.125 \times 4.52 \times 1500^2 \times \sim 633$ kg; with $4.52 = m^2 = 2.4^2 \pi/4$ and $1500 = 200$ HP$\times 75$ Kgm per HP.

In short, the helicopter will lift 633 kilogram$\times 0.79$ propeller efficiency$= 500.07$ kg.

Using now equation (13) for the building of an aircraft of the invention with 4 propellers of equal sizes and diameter, namely 2.4 meter diameter one obtains:

$$H = M \sqrt[3]{2\rho F \left(\frac{\eta N}{M}\right)^2} =$$

$$4 \sqrt[3]{2 \cdot 0.125 \cdot 4.52 \left(\frac{0.75 \cdot 20000}{4}\right)^2} =$$

-continued $1005.63 = \simeq 1006$ kg. $\times 0.79$ propellor efficiency $= 790$ kg.

Therein again 25 percent losses in the transmissions are assumed, which brings 0.75 percent efficiency of the transmissions. One immediately sees that about $790 - 500 = 290$ kilogram more lift are obtained by the propellers of the invention, than the common 1 rotor blade helicopter of equal power and size of propeller would have. The efficiency of 0.75 percent of the transmission is justified thereby that the inventors pumps and motors have obtained in tests in universities and corporations in Europe efficiencies of up to 94 percent. Thus, assuming 90 percent efficiency for the pump and 90 percent for the motor, provided that the pumps and motors of the present inventor are used, the pump plus motor would bring $0.9 \times 0.9 = 0.81$ percent efficiency and about 6 percent of the efficiency of the hydrostatic drive of the propellers would be lost in the pipes of the structure, in the flexible hoses between pump and pipes and at other small locations. Thereby the overall efficiency of the transmission with 75 percent is justified. Thus, the 290 kilogram additional lift by the propellers of the craft of the invention is actually obtained.

That alone, however, would not bring the desired benefit because in order to obtain this additional lift, additional weight of components which are added to the aircraft of the invention. Consequently to obtain an overall picture it is useful to calculate all the added weights which are added to the aircraft of the invention. These are the four wing portions, the pipe structure to carry the fluid and hold the wing portions, the motors and on them the additional three propellers. Safed in the aircraft of the invention are the tail rotor, the transmission between the power plant and the main rotor as well as the weight of the transmission between the power plant and the tail rotor, the tail rotor holder assembly and the like of the common helicopter. This actual weight is not known and shall be estimated to be about 100 kilogram. These 100 kilogramm are later to be subtracted from the added weight of the invention, because these weights of the common helicopter are spared by the present invention.

The weights which are added to the aircraft by the present invention, are as follows:

Each such propeller weighs 6 kilogram. Three propellers are added. Note that the helicopter already had one of the propellers. Therefore only three additional propellers are added, which gives $3 \times 6$ kilogram $= 18$ kilogramm added weight of propellers.

The wing portions may be of composite fiber reinforced plastics, (FRP), for example, Kevlar or carbon fiber, whereby the weight of each wing portion will be maximally 12 kilogram, bringing together $4 \times 12 = 48$ kilogram weight of added wing portions.

The weights of the pumps and motors are known from the inventor's catalogues to be maximally 10 kilogram per motor and maximally 24 kilogram of the pump. That gives 4 times $10 = 40$ plus $24 = 64$ kilogram weight for added pumps and motors. The flexible hoses between the pump's outlets and the pipe structures is about 9 kilogram. The so added weight until now is: $18 + 48 + 64 + 9 = 138$ kilogram.

The important portion of the aircraft whereon the stability and reliability of the drive of the propellers and the holding of the wing portions depends, is the main pipe structure. It must be calculated carefully. Calculating first the thickness of the walls of the pipes and assuming steel pipes (hydraulic flash pipes) for easy and comfortable welding and a desired inner diameter of 16 mm for flow of fluid with reasonable velocity in the pipes with not too high friction losses in the pipes (6 percent losses were assumed above) the first estimate is a wall thickness of 2 mm and the pressure useable in such pipes is calculated by equation (23):

$$\sigma = \left[ \frac{1.3\eta^2 + 0.7}{\eta^2 - 1} \right] P \quad (23)$$

or:

$$P = \sigma / \left[ \frac{1.3\eta^2 + 0.7}{\eta^2 - 1} \right]$$

(P = pressure)

with therein $\sigma$=inner stress in the pipe and "n"=D/d with D=outer and d=inner diameter of the respective pipe. Having used 20 mm outer diameter and 16 mm inner diameter of the pipe and permitting 20 kg/mm² inner stresses in the pipes (which permit maxiamally about 50 mm² stress), one obtains:

$$P = 20 / \left[ \frac{1.3 (20/16)^2 + 0.7}{(20/16)^2 - 1} \right] = 4.119 = \approx 4.12 \text{ kg/ww}^2$$

or, in other words and dimension, about 412 atmospheres or kg/cm² pressure are permissible in the pipe structure with outer diameter=20 mm of each pipe and a wall thickness of 2 mm.(Since only about 360 bar max will be used and since a great safety factor was used, this shows that even pipes with 18 mm outer diameter and 1.5 mm thickness of the walls of the pipes may be satisfactory. (2 and 1.5 mm wall thickness pipes permit an easy and comfortable welding).

It is still to be found whether such pipes which can carry the high pressure fluid can also carry the wings and the forces exerted by the propellers. For this the body 31 of the craft shall be 80 cm wide to permit space for two persons side by side. The motors must be placed at least 1.2 meters away from the outer side of the body because otherwise the tips of the propellers would run against the body. Thus, calculating from the medial vertical longitudinal imagined plane of the body of the craft the length of each pipe of the structure to the respective center of the motor will be at least 40 plus 120 centimeter, or at least 1.6 meters that would give 3.2 meters between the axes of the right and left motor. Giving an additional freedom of 0.1 meter one obtains 3.3 meter length for each pipe. Since the pipes are not fastened to the axes of the motors but to the holding plates of the motors, the actual distance between the axes of the right and left fluid motor to drive the right and left propellers will be about 3.5 meters, which shows that enough freedom remains to adjust for unforeseen requirements of additional space(s).

The weakest point at which the pipe structure would break under the forces of propellers and wing portions exerted onto the pipe structure is the central portion of the structure, there, where the structure goes through the mentioned imaginary medial face of the body of the aircraft. From there to the axis of the respective propeller will now be a distance of 1.6 to 1.75 meters. Assuming 1.7 meters one obtains the following torque of the propeller:

1006 Kg/4=251.5 Kg per propeller on an torque arm of 1.7 meters brings: 427.55 kilogram meter torque per propeller onto the pipe structure The distance of the axis of one pipe from the next shall be in vertical and horizontal direction in the cross section 10 centimeters to fit suitably by straight pipes to the ports of the motors. The front pipe is then under compression stress and the two rear pipes are under elongation stresses if the propeller tracts with the mentioned 251.5 kilograms. Simplifying to equal pipe cross sections to front and rear of the medial line around which the stresses in the structure appear, one obtains the following torque in the mentioned medial place in the mentioned imaginary plane: 251,5:0.05 meter=5030 kilogramm (with distance of the respective pipe from the medial, neutral line of stresses=one half of the mentioned 0.1 meter distance of the axes of two pipes of the structure.).

There must be at least three pipes in the structure, since vertical and horizontal torques appear, namely the torque exerted by the wing portion normal (perpendicular) to that of the respective propeller. Further the pipe structure requires diagonal ribs between the pipes because otherwise the pipe structure will not be rigid and not be able to stay stable. Assuming the ribs in weight and strength equal to two of the pipes one can calculate that five pipes per structure are used. The strength of the pipes is about 60 kg per squaremillimeter. The cross sectional area of the 20×16 mm diameter pipe is $(20^2 \times 16^2)\pi/4$=113.1 square millimeter Multiplied by 5 pipes gives 113.1×5=565.5 squaremillimeter. Dividing now the found 5030 kilogramms of load in the middle of the pipes of the structure by the available 565.5/2=282.75 mm², for 2.5 pipes in expansion stresses, one obtains: 5030/282.75=17.78 kilogram per squaremillimeter. That is less than one third of the maximal strength of the pipe and therefore permissible. One sees here again that even 18 mm outer diameter pipes with 1.5 mm thickness of the walls might be satisfactory. But now only the very safe side shall be considered. In short, the pipes of 20 mm outer and 16 mm inner diameter with their axes 100 mm vertical and horizontal apart from each other, are satisfactory to carry all loads which appear in the structure.

What is the weight of such a pipe structure if the structure is made of steel pipes for easy welding, good strength and low costs? The cross sectional area was above 565.5 square millimeter, equal to 5.655 square centimeter and the length was 3.3 meter=330 centimeter. Multiplying brings 1866 cubic centimeter or 1.866 cubic decimeter. The weight of steel per cubic decimeter being 7.8 kilogram one obtains 1.866×7.8=14.56 kilogram for one pipe structure between a left and a right propellerdriving fluid motor. Add 5.46 kilogram for the two bearing housings and bearing bodies, one obtains 20 kilogram per pipe structure, and, since the aircraft has 2 such structures, one has the added weight of 40 kilogram for the structure with the bearings of the pivotal bearing arrangement. This added to the already found 139 kg yields 179 kilogram added weight for the aircraft of the invention. That looks very hopeful since it can carry 290 kg more than the compared system of the common helicopter.

The helicopter would use an aircraft engine which would at the HP weight about at least 110 kilogram. Note that gas turbines will not be compared because they are too expensive for an inexpensive aircraft and further the only available in the suitable power range are the KHD accessory gasturbines of the European "Tornado" fighter plane and they will not be sold to nonmilitary persons. Thus, a gasturbine of suitable size is not available and twenty to thirty times too expensive for application in an inexpensive aircraft with vertical take off capability to private or personal use of the average citizen.

Figure 43:
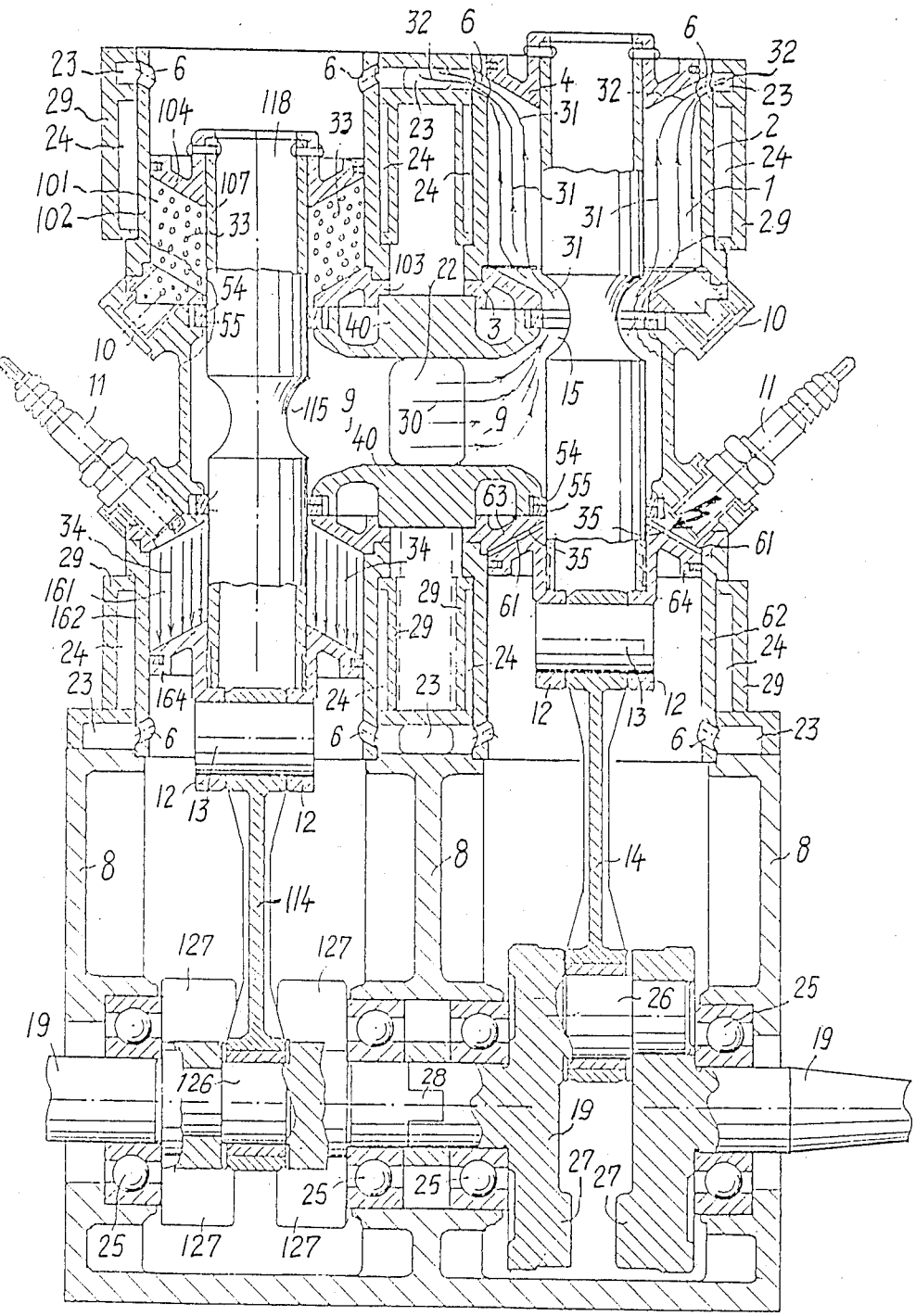
FIG. 43 is a sectional view through an engine of the invention.

In the aircraft of the present invention, the inventor's "ultra-power" engine of FIG. 43 may be applied. It gives maximally 140 horsepower at slightly more than 10,000 rpm and weighs 36 kilograms. Two of these engines have to be applied to get the required and calculated HP output. That gives $2 \times 36 = 72$ kilogram engine weight. Add 24 kilogram for the second four flow pump, gives $72 + 24 = 96$ kilogram weight. Since the engine of the common helicopter weigh 110 kilogram, a weight of 14 kilogram is saved. Since earlier already 100 kilogram were saved, the total saving now is $100 + 14 = 114$ kilogram. The added weight was 179 kilogram.

Comparing now the added and saved weights of the aircraft of the invention and of the equivalent of a common helicopter brings the following balance:

| Added weight of added components minus saved weight actually added weight | 179 Kg. 114 Kg. 65 Kg. | obtained added lift minus added weights benefit of lifting capacity | 290 Kg. 65 Kg. 225 Kg. |
|---|---|---|---|

This shows impressively how important the finding of the "Ftl" factor of the present invention is because it makes now possible to built inexpensive craft with the capabilities of helicopters but with the added ability to fly horizontally on wings. And, also very important, if the rules of the present invention are obeyed, such aircraft which has an added weight because it has to lift wings vertically upwards, which a helicopter does not have and needs nmot to lift them, the craft of the invention will lift net more than the equivalent helicopter with the single rotor of equal size and dimension.

This contradicts with the practical experience from the history that vertical take off aircraft with wings have either not been built or they required expensive gas turbines. It is now easy to assume that the reason for these historical failures lay in the use of either too heavy and too many parts as in the Olsen patent or the use of too heavy common aircraft engines with too slow revolutions resulting in too heavy gearing means or in the false conceptions, as for example, in the Haak patent of the prior art.

It is of interest in the new equation(s) (13,14) of this present invention that a doubling of the power gives 4 times in the square and that yields 1.5874 in the third root thereof. This shows that the arrangement of 4 propellers of equal size compared to one brings the same increase of lift as a doubling of the engine power would give. A reduction of the power used to one half of the power brings and 63 percent of lift or a reduction of only 37 percent of lift.

The helicopter may make up for this disadvantage by using a bigger diameter propeller. Since the area is $d^2\pi/4$ and since $\sqrt{4}$ is 2, the diameter of a single rotor helicopter would have to use a propeller (rotor) of 2 times bigger diameter, namely $2 \times 2.4 = 4.8$ meter diameter to obtain an equal lift.

Figure 13:
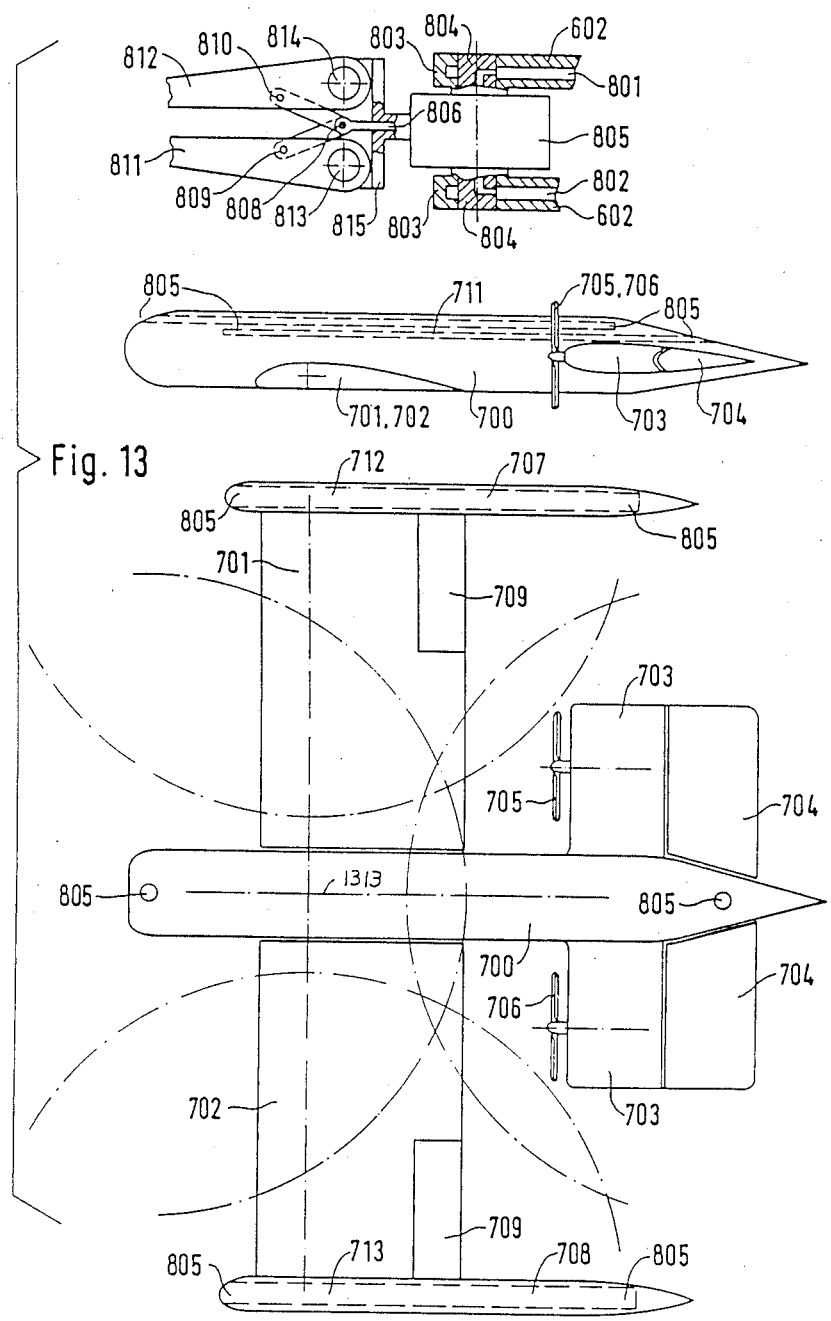
FIG. 13 shows another embodiment of an aircraft of the invention.

I am now nearing the discussion of the long-distance—or intercontinental vertically taking of craft of FIG. 13.

For the short-range flights of several hundred kilometers or a very few thousand kilometers, the craft of the system of FIGS. 2 and 3 are very suitable and almost ideal, because the travel time and costs to the airport can be spared. The times at red signals on roads can be spared and the destination can be reached faster and for less money than with nowadays conventional transportation means. For intercontinental flight, however, the propeller diameters of the craft of FIGS. 2 and 3 are too small to be able to carry the needed large amount of fuel vertically up. An intercontinental craft may have an amount of fuel which may be as heavy or even heavier than the other total weight of the intercontinental aircraft. The weight of fuel again depends also on the speed of the craft. The intercontinental craft should however not travel with a too small speed, because the travel times would become troublesome long at such long inercontinental distances. The weight of the fuel required is therefore a major difficulty for vertical take off craft for intercontinental or long- distance-travel.

As follows from the equations of this application, there are only three possibilities to increase the lifting capability and thereby to increase the ability to lift a large weight of fuel fuer long distance or intercontinental travel; namely:

The two possibilities which existed and can be found by equation (10) are, either to increase the value "F" by increasing the diameter of the propeller and to increase the power "N". Both possibilities are, however, limited. Greater "N" requires greater weight and fuel consumption. Propeller diameters can not be build unlimited in size. To these two possibilities J added the third possibility, namely to utilize a plurality of propellers driven by fluid streams of proportionate rate of flow. Thus, J introduced also in the equations, the greater number "M" of the propellers.

To utilize the first two possibilities leads not to an easy success for an intercontinental - or long distance vertical take off plane. The increase of power again increases weight. The added weight again requires more power and more fuel. To utilize vertical take of jets, as some military aircraft do, would mean to use up fuel for hundreds of miles of flight at the few minutes of vertical flight for take off and landing. A possibility however remains the utilization of the multiple propellers "M" of the respective equations of this application in combination with larger propeller-circle areas "F".

Accordingly, in the sample of a long-distance or heavy load craft of FIG. 13 of the invention, a plurality of large size propellers are utilized to carry the craft vertically up or to set it vertically down, but in horizontal flight to retract the larger propellers into the aircraft to reduce the resistance in flight and thereby safe fuel. The piloting of such craft with retractable propellers needs training and experience. The long-distance or heavy-load carriers of FIG. 13 are also not now fully build, because their costs exceed the financial resources of the inventor. They are, however, calculated in detail and designs can be delivered in case of need and payment. FIG. 13 brings at present time the highest possible lifting capacity for heavy weight, long-distance or intercontinental vertical take off and landing craft between the several concepts of this application.

FIG. 13 the aircraft body 700 has wings 701, 702 with ailerons 709 and substantially long-cigar-shaped streamlined hollow bodies 707,708 on the tips of the wings 701 and 702. The body 700 has two openings 805 which are the ports of two respective or of one combined hollow space(s) 805 which are preferredly located in the upper portion of the body 700 of the craft.

The upper part of FIG. 13 shows in principle a foldable propeller with blades 811,812 fastened on holder 815 of the shaft of fluid motor 805. The unit consisting of the fluid motor with the propeller will be cited by referential 805. The openings 805 in the body 700 of the craft are openings to spaces 711 for the reception of each one propeller-motor set 805. The hollow bodies 707,708 on the wingtips also contain spaces 712 and 713 for the reception of each one motor-propeller-unit 805. The said spaces 711 and 712 and 713 are therefore provided to be able to contain folded motor-propeller units 805 of a propeller radius of about the length of a wing of the craft or of about the length of about a half of the length of the body 700. Thereby an extremity of large propeller circle areas "F" is obtained combined with the plurality of "M" propellers, namely 4 lifting propellers which brings 1.58 times higher gross lift than a single propeller of equal size would do. At vertical take of the propellersets will be located with fluid motors 805 at the four places shown in FIG. 13, namely on the front tip and rear tip of body 700 and on the tips of the wings. The axes of the propellers will then be directed vertically. When the craft will have obtained enough forward speed to be able to fly on the wings, the propellers 805 may be pairwise become retracted into the respective spaces 711, 712, 713. The aircraft will thereafter continue to fly as a usual aircraft of my U.S. Pat. No. 8,823,898. The craft will then be carried on the substantially horizontally directed wings 701 and 702 and be driven by the at least one pair of propellers 705, 706 which are arranged symmetrically of the body 700 and which are driven by fluid motors which are driven by a respective number of separated flows of hydraulic fluid of equal rate of flow. The elevators 704 may be provided on the craft and so may be a side-rudder, not shown in the Figure. The propeller pair(s) 705, 706 may be applied on the wings 701, 702 on respective arms or on the end-wings 703 of the elevator-portion of the craft.

The craft of FIG. 13 can thus obtains an extremity of high lifting and carrying force for vertical take of and landing as well as obtaining a high speed and economic horizontal flight. When the weight carrying capacity is used to a considerable exten for carrying fuel, the craft will be able for long-distance flights or even for intercontinental flights.

How to subtract the propeller sets 805 into the spaces 711, 712, 713 of the craft, is shown in the upper part of FIG. 13. The arms 602 carry the motor 805. Fluid lines 801 and 802 are extended through the arms 602 and therefrom through swing-bodies 804 into and out of the fluid motor 805. The arms 602 have ends which form bearing housing portions 803 wherein the bearing body portions 804 of the motor 805 are pivotable or swingably borne. The fluid to and from the motor 805 is led through the fluid lines 801 and 802 respectively. The bearing sets 803-804 provide the possibility to swing the respective motor 805 with the propeller thereon from vertical into horizontal position and vice versa and into any desired angular position between them. The shaft of the fluid motor 805 carries a flange 815 with swing-nearing holding portions 813 and 814 whereon two (or more) propeller arms 811 and 812 are swingably borne.

A remote controlled axially movable member 806 which may be driven by a control flow of fluid may be moved in the shaft or rotor hub of the fluid motor 805 and thereby move another swing bearing 808 forward or backward from or to the motor 805. Swing arms may extend from swing bearing 808 to further wing bearing connections 809 and 810 on the propeller arms 811 and 812. Thus, when the control-member 806 is extended (moved outward) from the shaft of the fluid motor 805, the propeller arms 811 and 812 are swung into a radial position to act as propellers during their revolving. When the control member 806 however is retracted into the innermost position in the shaft of fluid motor 805, then the propeller arms are swung forward into a to each other substantially parallel positions as shown in the upper part of FIG. 13. In this "swung in" position the propeller-arms then are substantially within the same radical dimension relatively to the motor axis as the holding arms and the motor are and the whole unit can now be retracted into a respective space 711, 712, 713 of the aircraft. More details of an example of a retractable propeller are shown in FIG. 16. In FIG. 13 are only those means are described, which are not described in detail in FIG. 16. The description of details is kept to a minimum in FIG. 13, because more details will become known from the discussion of FIG. 16.

A very convenient retractable propeller is shown in FIG. 16. This motor-propeller unit can also be used in the craft of FIGS. 2 or 3. Accordingly a space 488 is located in a body 489 in the wing or in another portion of the aircraft. It is especially effective when the space 488 is provided in a wing or wingtail of the craft. Body 489 is configurated to receive in the space 488 therein a fluid motor 482-493 and to let the motor 482-493 move backward and forward in space 488. A drive mechanism 485 may be associated to the space 488 and be connected to the fluid motor 482-493. The drive mechanism may be a hydraulic piston in a hydraulic cylinder and receive fluid through control fluid lines 483, 484 to move the drive piston of it forward or backward in space 488 and thereby motor 482-493 forward or backward in space 488. Motor 482-493 drives and carries a foldable propeller with an least two foldable propeller-arms as those in the upper part of FIG. 13. In FIG. 16 the fluid motor and propeller are demonstrated in the two extreme positions. At inward location the fluid motor is shown by motor 482, at outward location the fluid motor is shown by fluidmotor 493. At the outward or forward location of motor 493 the propeller arms 496 and 497 are radially extended for operation as propellers as seen in FIG. 16. The radial extension of the propeller arms may be done as in FIG. 13, top part, or the propeller arms may even extend themselves-swing themselves-into the radial position by centrifugal force during high speed revolution. In the inner or backward position the fluid motor 482 is retracted into the deepest possible location inside of space 488. The arrangement of FIG. 16 is now my U.S. Pat. No. 4,136,845. This arrangement is not claimed by claims in the specification but shown for a better oversight of the practical possibilities of aircraft building.

The propeller arms 486, 487 are now forwardly folded, substantially parallel to each other, in order that they find enough place in the chamber 488 to be subtracted thereinto and to be kept therein. The folding of the propeller blades into the forward position for retraction into chamber 488 may be done by remote control as in the upper part of FIG. 13, nut is may also be done automatically. In the latter case, the rotary velocity of the shaft of the propeller motor may define the direction of the propeller arms. For example, a high rpm of the rotor of the fluid motor may swing the propeller arms into the radial-propeller-action position by centrifugal force, while a low rpm or non-revolving may swing the propeller-arms under a spring or like-action into the forwardly swung position. The automatic position control of the propeller arms by the rotary speed of the fluid motor(a) is especially convenient, because it can be easily handled by the pilot. A medial revolution speed of the fluid motor(s) may define a position between the extremes of position and thereby enable an intermediate range of propeller action. If smoothly arranged and controlled the retraction of the propeller and fluid motor as well as their extensions may be suitably handled and even be steplessly variable during the conversion process. When the propellers are of relatively small diameter, as those in the craft of FIG. 2 or especially of FIG. 3, the extension- and retraction-action of the fluid motors are propellers of FIGS. 13-top and FIG. 16 can be handled smoothly and without excessive disturbance of smoothness of flight or of flight-stability. In FIG. 16 the fluid lines 465, 466, 463 and 464 are the fluid lines to the fluid motor 482, 493. Flexible fluid line portions may exten from them to the ports of fluid motor 482, 493 in order to facilitate the forward and backward move of the motor with the propeller arms in the space or chamber 488. The fluid pipes 463 to 466 are forming the bone-structure or the fluid line structure of the respective wing portion. The outer cover(s) 481 of the wing which forms the airfoil-shape may be fastened on the fluid-pipe-structure 463 to 466. The motor-propeller-containment-chamber 589 may also be fastened to the fluid-pipe-structure 463 to 466 of the respective wing-portion.

FIG. 12 shows an aircraft seen from above, with two propellers with vertical axes in the wings. This is my eldest priority application of Dec. 5th, 1965 and now seen in my U.S. Pat. No. 3,320,898. This patent explains in detail, how separated flows of equal or proportionate rate can be produced and utilized to synchronize the counter rotating propellers of a propeller pair for equal angular rotary velocities and thereby to keep an airborne craft stable in the air or in flight. The mentioned patent may help to find the basic technology, which is utilized in the present invention.

In FIG. 12 the aircraft 1 has a power plant 13, which produces two flows of separated outlets with equal rate of flow through separated fluid lines 6 and 7 to motors 4 and 5, which carry propellers 2 and 3 in ducts and 10 in wing portions 11 and 12. The mentioned patent describes in detail, how the separated flows with equal rate of flow are created by means 13. The importance is, that this priority patent discloses, that the equal rate of flow in separated flows is utilized to drive the motors 4, 5 and thereby the propellers, 2, 3 which are borne by the shafts of the motors, with equal rotary velocity. That is the basic principle, which is also used throughout the present invention.

FIGS. 14 and 15 show another example of the fastening of a fluid motor and of a wing portion on the pivotable or even on an non-pivotable fluid-pipe-structure of the invention. When the structure is fixed, which means, non-pivotable, it carries the fluid motor(s), propeller(s) and the respective wing portion(s) of a substantially horizontally flying aircraft of my U.S. Pat. No. 3,823,898. The structure of FIGS. 14 and 15 as well as the fluid-pipe-structure of FIG. 3—without the pivot-bearing arrangement can therefore be applied also in not-vertically taking off aircraft of the fluid drive system of my U.S. Pat. No. 3,823,898 and similar aircraft. The fluid-pipe-structure, herein often simply called "structure" is, however, a novelty of this present invention, regardless, if that of FIG. 4 or that of FIGS. 14 and 15 is concerned. One specific feature of the structure of FIGS. 14 and 15 is, that the fluid pipes are entirely straight pipes without bends. They can therefore be very easily cleaned and they are very inexpensive in production. The fluid motor 461 has respectively a number of fastenings and/or of ports corresponding to the number of fluid pipes applied. In the sample of FIGS. 14 and 15 there are four fluid pipes 463 to 467 arranged on the corners of a rectangle or of a square. Respective ribs between the pipes may be set. Two of the fluid lines in these Figures are delivery fluid lines and the other two are return fluid lines. Half-profile ribs, namely upper profile ribs 467-A and bottom profile ribs 467-B are moved from above and from bottom respectively over the fluid-pipe structure. Medial connection ribs 467-D are then set over portions of the upper and bottom profile ribs 467-A and B and they are riveted, bolted or welded to them, in order to keep them together to hold the profile ribs on the structure. The outer cover sheet 468 is then moved over the plurality of profile-ribs 467-A-B, whereby the wing portion 460 becomes a complete and fastened wing-portion, borne by the structure and carrying the structure and the craft in horizontal flight. When the system of these figures is used in a vertically take-off capable craft, the propellers are carrying the wing portions and the craft at vertical hovering or flight. In the Inter-Thrust-Range of move the respective propeller(s) and wing portion(s) may then carry the craft together. FIG. 14 is a cross-sectional view through FIG. 15 along the line XIV—XIV. The profile rib portions 467-A and B may define the airfoil-cross-sectional size and configuration of the wing portion 460. They are preferred to have outcuts which fit precisely around the outer faces of the respective fluid lines of the fluid-pipe-structure. The fluid pipes may be fastened onto the fluid motor 461 by bolts and carry the motor thereby. The motor 461 carries a propeller 462 and drives the same. Thus, the complete holding and driving mechanism of the fluid motor, of the propeller and of the wing is of a most simple and not expensive structure consisting of straight pipe portions, plane rib-profile-plates and an outer wing-cover together with bolts and/or rivets.

FIG. 10 demonstrates further, that an upper body portion 460 may connect the holders 448 and 449 of the craft. The holders 448 and 449 form bores along equal axes on the left and right side of the body or body portion 460. As seen in the top portion of FIG. 10, the bearing bodies 427 are set in the interior bores of the holding portions 448 or 449 respectively. Structure pipes 441 and 444 extend through the bearing bodies 427. The bearing bodies 427 may be pivoted in holders 448 and/or 449 respectively if so desired. If the structure pipes 441 and/or 444 are fluid line pipes, the connectors or ports 544 or 644 may be set and ribs 958 may be provided or be strengtheners if so desired.

FIG. 17 shows together with FIG. 18 a modification of my aircraft and thereby another embodiment of the invention. It has a main pipe 1014 which is pivotably borne int he body of the craft. The medial portion of pipe or carrier 1014 is in the Figures provided with a wider portion 1004 which may be a surrounding pipe portion of a bigger diameter. The medial portion 1004 is pivotably borne in bearing housings 1005 and 2005 on the left and right wall of the body 1001 of the craft. As FIG. 17 shows, a drive means, like a cylinder 1024 with a piston 1023 is borne by member 1025 in the craft 1001. The other end of the drive means 1023-1024 is connected to a portion of the structure, for example to pipe 1015. Moving piston shaft 1023 in cylinder 1024 inwards or outwards will thereby define the pivotal movement of the main pipe 1014 with 1004 in bearings 1005, 2005 and thereby define and control the angle of the wing portions 1016, 2016 and/or of the motors 1002, 2002 and propellers 1003, 2003 of the aircraft. The rear ends of the wing portions may carry the wheels 1027 by holders 1026. When the wing portions, propellers and motors have about an angle relatively to the ground as shown in FIG. 22, the craft is very effective for short take off and landing. If the axes of the propellers are inclined relative to the wing portions to create a lift of the wing by the air which is blown by the propeller over the wing, the craft may even take off and land vertically. The wheels 1027, however, permit a rolling on the ground and may be of convenience, when space for short take off or landing is available. The at least three pipes or two pipes plus a strengthener, are shown by referentials 1014, 1015 and 1022. Parts 1015 and 1022 may swing through openings in body 1001 when the arrangement if pivoted. The pipes are provided with the ribs 753 as usual in the other Figures of the application. The holders 1017 are extensive provided in order to permit plural holding bores or threads 1018, 2018 for fastening the wing portions with plural fasteners onto the pipe structure. Pipes 1014 and 1015 extend through the body 1001 of the craft from one motor 1002 on the right side to another motor 2002 on the left side of the craft and they carry by holders 1017,2017 the wing portions 1016 and 2016. On the outer ends the pipes 1014 and 1015 have holding plates 1021 and 2021 with preferredly plate faces which are normal to the axes of the pipes 1014 of 1015. Thus, the pipes 1014 and 1015 form straight pipes with straight interior fluid lines along unbent axes. The pipes can thereby be cleaned from the ends without difficulties. In the middle of the pipes, the interior stoppers 1009 are inserted closely fitting into the interior of the pipes or at least into pipe 1014 or pipe 1015. Thereby the interior of pipe 1014 is as seen in FIG. 18, divided into two separate fluid lines, one to the right motor 1002 and one to the left motor 2002. Entrances or parts 1010 and 1011 are provided on a medical surrounder 1006 to pass separated flows of fluid separately and individually to the fluid motors 1002 and 2002. If the medial wider portion is a hollow pipe 1004, there should also be stoppers 1008 be provided in the middle of the medial portion 1004 to separate the ports 1010 and 1011 and the flows therefrom into the separate fluid lines of the right and left portions of fluid line pipe 1014. The fluid motors 1002, 2002 may be provided with bearing holders 1020, 2020 to hold bearings 1019, 2019 for long shafts of the motors, which carry and drive the propellers 1003 and 2003 2003 respectively.

By the embodiment of FIG. 18 a fluid pipe structure is obtained, which can be fully and effectively cleaned inside and which needs no bends. At the same time it holds the motors effectively. This structure is easy in manufacturing and reliable in operation.

FIG. 19 demonstrates an alternative portion of the fluid line structure. It is similar to the upper portion of FIG. 10. The straight pipes 1028 and 2028 are borne in the holders 1030 and 2030 of aircraft body 1001. In the middle of the pipes are inside the separators or stoppers 1031 provided. They are set fast in the pipes to prevent movement of the stoppers 1031 inside of the pipes. Ports 1032 and 1033 are set or welded onto pipe 1028 to lead separated flows individually into or out of the right and left fluid line portions of pipe 1028. Similarly the ports 1034 and 1035 are set or welded onto pipe 1029 to lead the flows of fluid individually into the respective fluid line portions. Thus, we have individual port 1032 to fluid line 3028, individual port 1033 to individual fluid line 4028, individual port 1034 to individual fluid line 3029 and individual port 1035 to individual fluid line 4029. Again, the arrangement of of FIG. 19 is obtained by simple straight pipes and the interior of the pipes can be effectively cleaned from remainders of weldings or dust.

Figure 20:
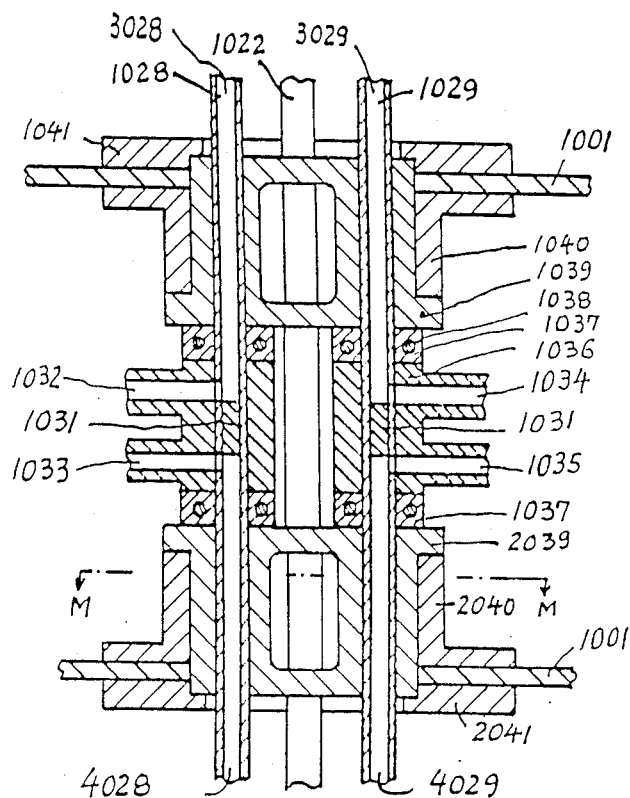
FIG. 20 illustrates an enlargement of a medial portion of a structure.
Figure 21:
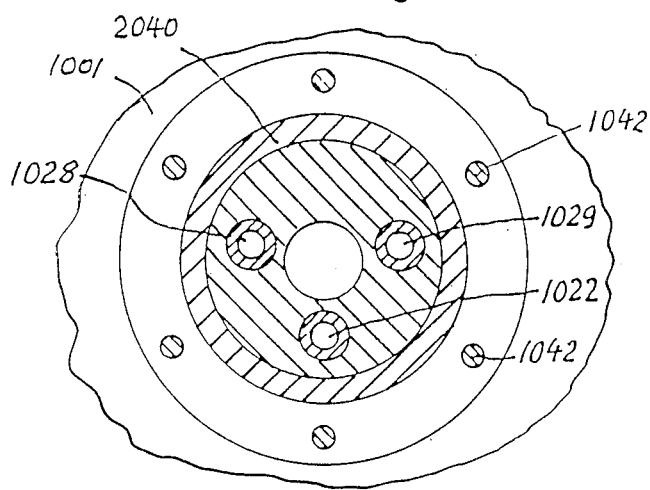

FIGS 20 and 21 show in a larger scale the medial portion of another embodiment of a pipe structure of the invention. The straight pipes 1028 and 1029 have again the interior divider, separator or stopper 1031 individually. The ports 1032 to 1035 are provided on a medial body 1036 and they serve equal purposes as in FIG. 19. The ports form again individual and separated ports for the individual and separated fluid lines 3028, 4028 and 3029, 4029 in in fluid line pipes 1028 and 1029. On the outside of pipes 1028 and 1029 laterally of the medial body 1036 the holders 1037 may be fastened by bolts or other fasteners 1038 to the pipes 1028 and 1029 respectively to prevent lateral movement of the medial body 1037 on the pipes 1028, 1029.

The pipes 1028, 1029 extend through a bearing body 1040 and another bearing body 2040. The third pipe 1022 may also extend through these bodies, as FIG. 21 indicates. FIGS. 20 and 21 belong together, because FIG. 21 is a section through FIG. 20 along the arrowed line M—M. The bearing housings 1040 and 2040 are set around bearing bodies 1039 and 2039 respectively to bear therein the bearing bodies 1039, 2039. The outer skins 1001 of the body of the aircraft may then be fastened to the bearing housing 1040, 2040 or additional holders 1041, 2041 may be set from the outside onto the body 1001 and be fastened through the body portions 1001 to the housings 1040, 2040 respectively by respective rivet or bolts 1042. See hereto FIG. 21. The arrangement of these Figures can spare welding on the medial portions of fluid line pipes 1028 and 1029 or 1022. This arrangement thereby prevents disturbance and dirtying of the interiors or the medial portions of the structure pipes 1018, 1029 and/or 1022. Again, the straight pipes with straight axes without bends can be cleaned effectively inside to obtain clean fluid line portions.

FIGS. 22 and 23 demonstrate in a larger scale, approximately in the 1:1 scale of a light aircraft, the outer end of a respective fluid line pipe 530 of a fluid line pipe structure of the invention. The holding plate 531 is welded onto the respective outer end of pipe 530 and forms the radially plane holding face 1530 on the end of the structure. Face 1530 is bolted onto a respective complementary plane face of the respective fluid motor to set the end of the interior 534 of the pipe onto the respective port of the fluid motor. The bores 533 are extended through the end plate 531 to set the bolts therethrough and into the respective threads of the fluid motor. The end plate 531 is strengthened by ribs 532 which are welded onto the plate 531 and onto the end portion of the pipe 530. The ribs 753 are also welded onto the pipe 530 as already known from others of the Figures. The strengthening holding plates 538 are welded between the pipe 530 and the ribs 753 of the structure. By these weldings the interior face of the wall of pipe 530 becomes welding particles 536 inside of the pipe, which dirten the interior 536 of pipe 530 and which would mix with the fluid which flows through the pipe. This dirt would then disturb the fluid motor(s) and the fluid pump(s), if the interior 534 of the pipe 530 would not be cleaned. These Figures demonstrate, how important it is to build straight pipe ends and straight pipes or pipes with maxially one bend in order to be able to clean the interiors 534 of the respective pipe(s) of the pipe structure of the invention.

FIG. 24 illustrates a pipe structure of the invention which is not welded but entirely glued. This embodiment of the pipe structure may be made by metal, plastic or fiber reinforced plastics. For example, this pipe structure of the invention, may be produced by carbon fibre. The fibers are wound around a bar which is slightly tapered to form on end of a slightly bigger diameter "D" and another end of a slightly smaller diameter "d". The fibers are then glued with the respective glue, for example, with epoxy resin. After drying of the fiber-glue 540 the inner bar is removed in the direction of the wider portion "D" whereby the hollow pipe(s) 540 and/or 541 appear(s). The ends of the pipe(s) may be thickened by further layers 542,543,544 or 545 of fiber and glue in order to obtain bigger ends for fastening of the pipe structure onto motors, holders, bodies, pumps and the like. Diagonal ribs 546 are then glued between pipes 540 and 541 to obtain the rigid structure of the invention. To hold these ribs very strongly, fiber layers 549 are glued over the rib and the respective portions of pipes 540 and 541 as shown by the directional lines of fibers 549. Strengthener plates 547 may be glued between the respective portions of the pipes and the respective rib. These may be additionally fastened and strengthened by fiber layers 539 in the direction of the lines 539. By the structure of this Figure and by the obeying of the production method, here described, a very strong and inside very clean pipe structure is obtained which effectively can be used as a fluid line pipe structure of the invention.

The pipes of the structures of the invention have been shown in the Figures as round pipes, but the pipes could also be of other cross sectional configuration, for example four cornered, six angularly six cornered or better, with rounded corners.

FIGS. 25 to 27 demonstrate the fastening of straight pipe structures in appositional directions to a medial block 550. Block 550 has the fluid lines and ports 551 to 554 which port into the interiors of the fluid lines 750, 751 respectively. The pipes have here again inner and outer end plates 1531 and 531 to be fastened therewith onto the medial block 550 and onto the respective fluid motor 1002 or 2002. The structure has the diagonal ribs or other ribs 555 of 558 which may also form the holders for holding thereon the respective wing position. FIG. 26 shows the holder 555 with bores 556 and 557 to set bolts through the bores 556 and 557 to fasten with these bolts the respective wing portion or propeller portion on the pipe structure 750 to 752. FIG. 27 shows the interiors 1750, 1751 of the pipes which form the ports of the ends of the pipes to be set onto the medial block 550 or onto the motor 1002 or 2002 respectively. The bores 559 in the plates 531 or 1531 are provided to set bolts therethrough for the fastening of the end plate of the respective pipe onto the respective motor 1002, 2002 or the respective medial block 550.

FIGS. 28 to 30 show a pipe structure in its natural configuration as used in wings or propellers of the invention. The Figure demonstrates, that the pipes are laterally distanced from each other with distances which exceed the diameters of the pipes. While in FIG. 21 the pipes are shown laterally widely distanced, this wide distance is shown only to see the details in the Figures clearly. But actually the pipes are closer together to find place in the wing or propeller. This is an about scale shown in FIGS. 28 to 30. The structure of my U.S. Pat. No. 4,405,103 is thereby merely for multipropeller helicopters of the invention, while the dimensioning of the structure of FIGS. 28 to 30 is merely for use inside of the wing or of the propeller of the respective craft. Ribs, plates and pipes are similar to those of FIG. 25 of U.S. Pat. No. 4,405,103 in function and they need to repetition of the description here. FIG. 30 shows the location of the pipes in the sectional view of the arrowed line H—H of FIG. 28, whereby it is also made clear, how the ribs 753 are provided between the three pipes of this structure embodiment of the invention.

Figure 31:
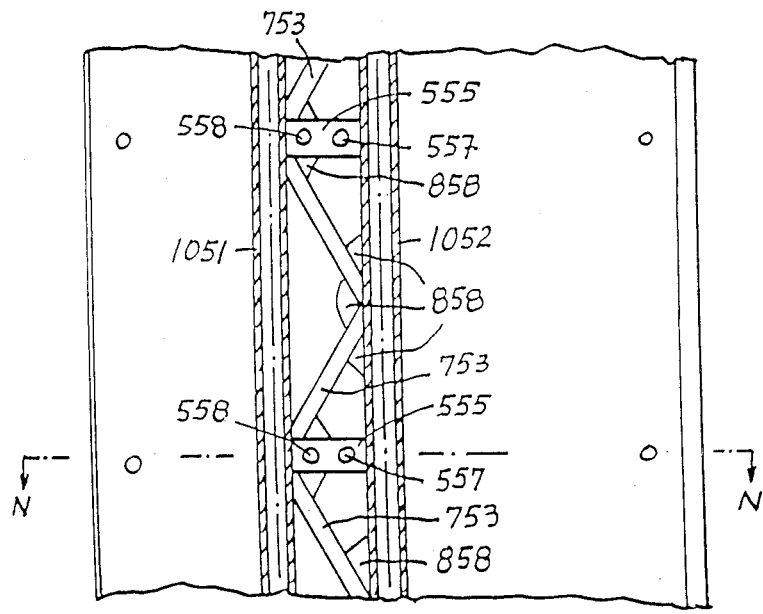
FIG. 31 illustrates another pipe structure in a wing.
Figure 32:
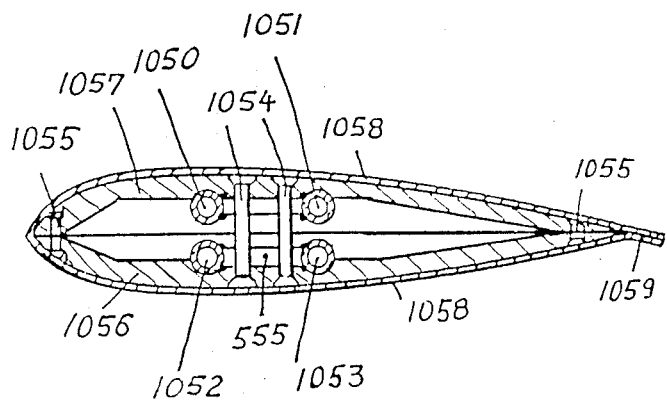
FIG. 32 is a sectional view through FIG. 31 along its arrowed line.

FIGS. 31 and 32 show another means of fastening a pipe structure of the invention to a propeller or to an aircraft wing or to a fluid borne craft wing. The pipe structure has plural pipes 1050 to 1054 or at least two thereof. Fastener plates or bodies 555 are fastened to the pipes. It is preferred to weld or glue them to the pipes. The fasteners 555 are provided with bores 557, 558. The propeller or wing is formed by an upper portion 1057 and a bottom portion 1056. These upper and bottom portions have configuration portions which are complementary either to the pipe(s) or to the fastener(s) 555. The bottom portion 1056 is led onto the bottom of the respective fastener(s) 555, while the upper portion 1057 is led on top of the fastener(s) 555. Rivets or bolts 1054 are then set through the bores 557, 558 of the fastener and through respective bores in the upper and bottom portions 1056 and 1057. The bolts or rivet 1054 are then closed or fastened, whereby the pipe structure is fastened to the wing or propeller portions 1056 and 1057. Additional rivets 1055 may fasten the upper and bottom portions 1056 and 1057 additionally. For further strengthening and for cleaning or smoothening of the outer face of the wing or propeller, it is preferred to lay an outer skin 1058 around the entire assembly and to rivet or glue it together at the rear end 1059 of the wing or propeller. Such outer skin may also be glued and may be a fiber sheet with respective plastics like epoxy resin and the like. It is preferred to make the outer skin 1058 by a single integral sheet. The upper and bottom portions 1056 and 1057 may also be casted. They may also be fiber reinforced plastics wood, metal or foam. The upper and bottom of the wing meet in plane 2056.

Figure 33:
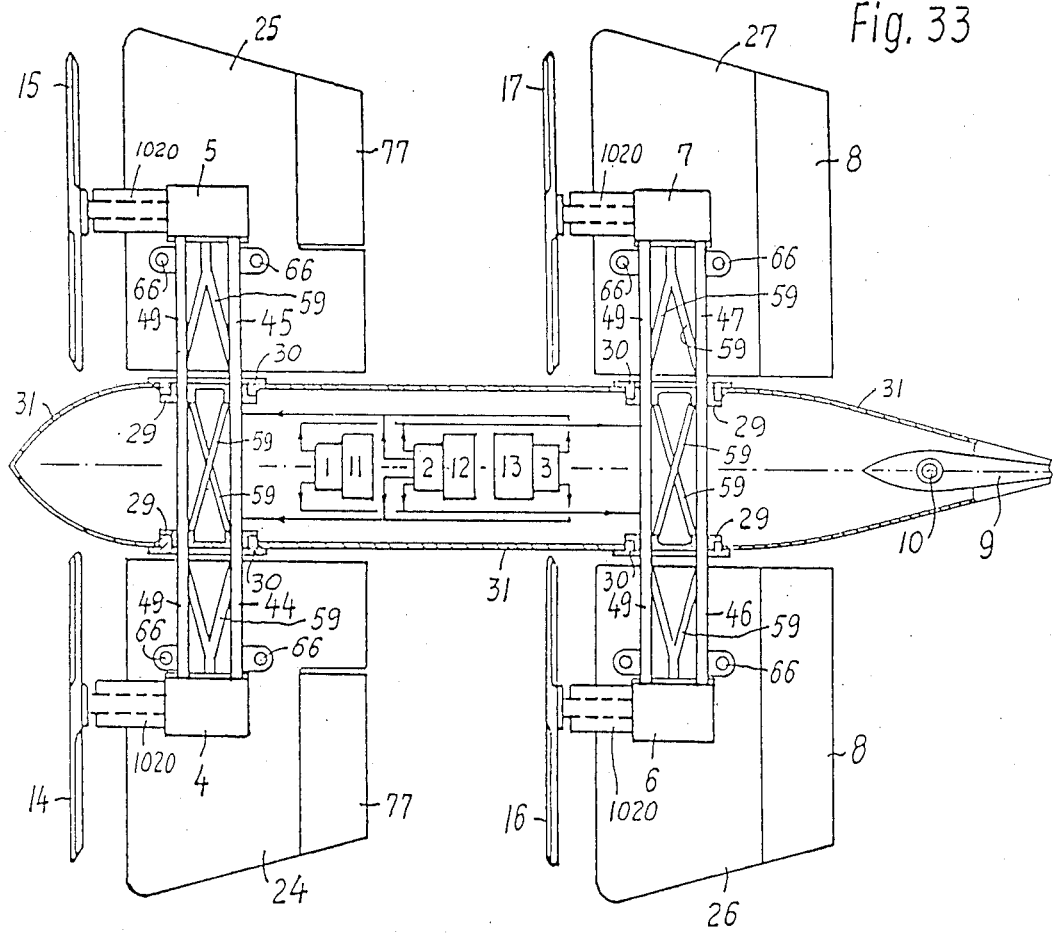
FIG. 33 shows a slight modification of FIG. 3.

FIG. 33 illustrates the same aircraft as is shown in FIG. 4, however, with slight modifications in order to show the purpose of the fluid pipe structure more clearly. FIGS. 34 to 42 show details or modifications of portions of FIG. 33.

FIG. 33 differs from FIG. 4 mainly therein that the medial portions of the fluid pipe structure has no bends. The fluid pipe structure of FIG. 33 goes straightly through the body 31 of the aircraft and has between the straight pipe portions 44 to 47 and 49 the diagonal ribs 59 not only in the lateral outer portions of the structure, outside of the body 31 but also in the medial portion inside of the body 31. FIG. 33 further shows the forwardly extended bearing housings 1020 of the fluid motors with therein providable bearings 1019 for the shafts which hold and drive the respective propellers.

All other matters and referential numbers are known from the discussion of FIG. 4 and will here not be repeated again since the purpose of every single referential number of FIG. 33 can be read at the description of FIG. 4 with its accessory FIGS. 5 to 9. The bearing housings 1020 are more in detail shown in FIGS. 42 and 19. Very important is the medial portion of the pipe structure and this is in a lager scale illustrated in FIG. 19. Note that in the straight through delivery fluid pipes medial stopper blocs 1031 are provided to prevent flow of fluid from one of the fluid lines into the other. The respective connection ports for the respective fluid lines are shown by 1032 to 1035 in FIG. 19. These are the ports whereto the outlets from the pump(s) are to be connected.

Figure 40:
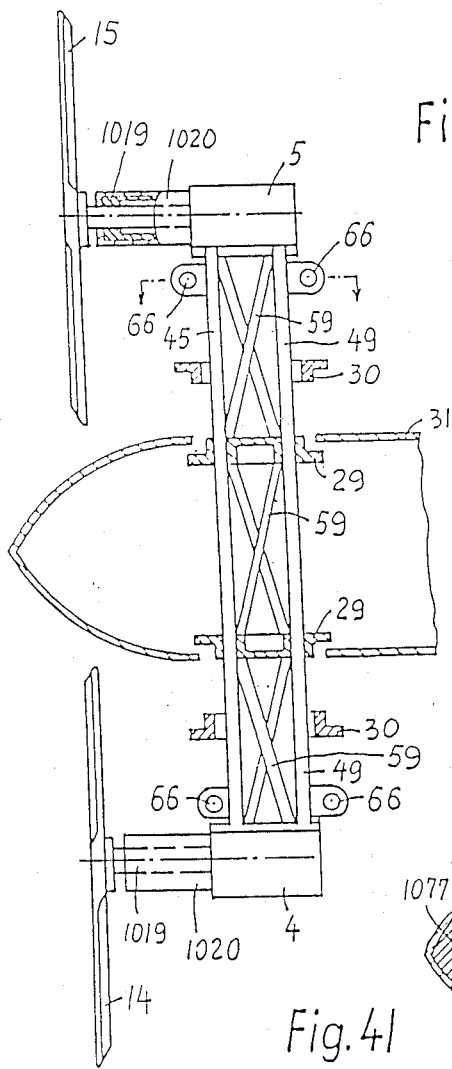
FIG. 40 shows a portion of FIG. 33 separately illustrated.
Figure 42:
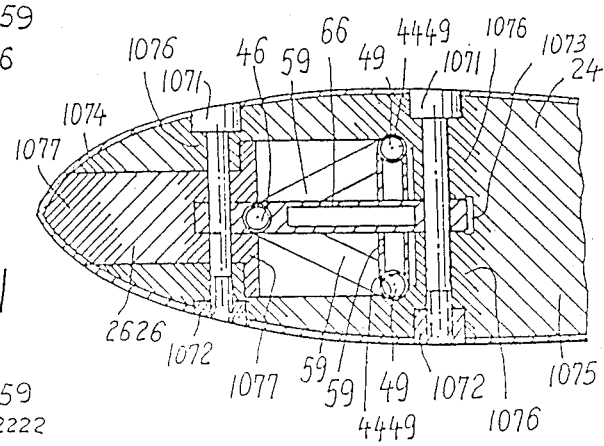
FIG. 42 shows a portion of a wing in sectional view.

FIG. 40 shows one of the two fluid pipe structures inserted into the body 31 of the aircraft but not yet fastened in the body. One sees that the bearing housings 30 are still remote from the body 31 but already set around the pipe structure because the motors 4 and 5 are already mounted to the structure in this Figure. The inner bearing sleeves 29 are already welded to the pipe structure. As the next step the bearings 30 are bolted onto the body 31 to surround and bear the respective bearing pivotal face of the inner bearing sleeves 29. Then, however, even if this next assembly step is done, the aircraft still has no wings. This is important, because the wings are not borne in the bearings 30 and the wings do not even meet these bearings and they also do not meet the body of the craft. This is more clearly explained at hand of FIG. 34.

In FIG. 34 both fluid pipe structures with the fluid motors and the propellers are mounted to the body 31 of the craft. The wings are, however, not yet mounted. For that purpose FIG. 37 is a sectional view along the arrowed line of FIG. 34 to show the details of the holder 66.

One sees that the holders 66 are either integral with the pipes 44.49 of the structure or that they are welded or glued thereto. The holders 66 then have at least one bore, mostly, however, two bores 66 and two bearing faces 2222 to bear thereon respective faces of the wing portion.

FIG. 39 which is a sectional view through FIG. 35 along the arrowed line in FIG. 35, shows the support faces 3333 of the respective wing portion. These support faces are laid onto the bearing faces 2222 of the holders 66 of the pipe structure. The bores 666 of the wing portion then align to the bores 66 of the holders of the pipe structure. Respective bolts or rivets can then be set into the bores 66 and 666 to fasten the respective wing portion 24,26 etc. onto the respective pipe structure of pipes 44 with 49, 45 with 49, 46 with 49 or 47 with 49.

FIG. 35 shows the pipe portion 24 in a longitudinal sectional view to illustrate the hollow places into which the pipe structure portion and the motor will be located when the wing is mounted onto the pipe structure. The wing is here hatched to show it simplified. A more detailed structure of the wing portion is given in FIG. 42 in sectional view in a larger scale which also shows the intensity of strength of the respective portions of the wing portion.

FIG. 36 shows the wing portion 26 partially seen from above and partially in section. FIG. 38 is a sectional view through FIG. 37 along the arrowed line of FIG. 37. These FIGS. 35 to 37 are provided to show the hollow space 1038 for the pipe structure portion, the hollow space 1081 for the respective motor 4 to 7, the dead hollow space 1080 and the hollow space 1082 or 444 for the bearing housing 1020 of the respective motor. Seen is in these Figures also that the dead hollow space 1080 which is provided to make it possible to lift the wing from the side of the craft over the respective pipe structure portion to fasten it on the wing portion, can be filled after the assembly by a filler 2626 which will also appear later in FIG. 42. Important is here, that the pipes 49 also form a bearing portion by their outer face portions and these are shown as extending from the faces 2222 in FIG. 37. These outer face portions of the pipes 49 are laid onto the support faces 4449 of the wing portion of FIG. 39. This style of arrangement is done because the pipe structure and the wing portion may be of different material with different heat expansions. Therefore, the wing portion is fastened with the smallest possible number of bolts or rivets to the pipe structure. Otherwise the wing portion is borne with its support faces 3333,4449 on the bearing faces 2222,49 of the pipe structure. Because these faces permit a relative movement between these faces in cases of unequal elongations or shortenings of portions of the pipe structure or of the respective wing portion 24 to 27.

Figure 41:
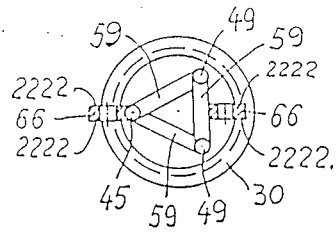
FIG. 41 is a section along the arrowed line of FIG. 40.

FIG. 40 shows the pipe structure in a slightly enlarged scale relative to FIG. 33. FIG. 41 is a sectional view through FIG. 40 along the arrowed line in FIG. 40 and it thereby illustrates an alternative configuration of the holder 66 relative to the holder 66 of FIG. 37. The holders 66 in FIG. 41 are rather thin and they are integral with the respective pipe or rib, or, they are welded onto them.

FIG. 32 shows a portion of the holding arrangement of a pipe structure of the invention with a wing portion of the invention in a larger scale than in the other Figures in order to make the details more better visible and in order to show a picture of the actual design of this specific embodiment. The holder 66 is here longitudinally extended fastened to or integral with pipe 46 and additionally supported by ribs 59 between pipes 49. For reduction of weight the holder is medially hollow. The wing portion, in this case 24, is fastened to the holder 66 of the pipe structure by bolts 1071 with nuts 1072. The filler portion 2626 of FIGS. 36,38 is inserted into the wing portion. The wing portion itself is in this Figure made of FPR, Fiber Reinforced Plastic, like Kevlar, Carbon Fiber and the like. It has week material filling portions (foam and the like) 1075 and fiber strengthened portions 1076 and 1077. The weaker filling portions are widely hatched, the fiber reinforced portions are narrowly hatched. Heat expansion permissibe spaces 1073 may be provided here and there to prevent any disturbance by different heat expansions of materials in whether of different temperatures. An outer layer 1074 may be glued over the entire wing portion after the completion of a part or of all of the assembly.

The cheapest pipe structure is that of steel pipes. A presently more expensive but lighter weight pipe structure is that of FRP, like Carbon Fiber, of FIG. 24.

The system of the invention, to hold wing portions on a pipe structure with holders and diagonal ribs is useable for certain water borne vehicle and for many types of aircraft. It is not limited to the aircraft of FIGS. 4, 33 or other aircraft of the present invention.

One of the major discoveries of the invention remains that it is very difficult to obtain a vertical take off aircraft which carries wings at the vertical ascent, if the presently known technologies are used. The gas turbines are still much too expensive, the aircraft engines are too heavy they revolve to slowly and the common pumps and motors of ground borne hydraulic machineries are too heavy and not efficient enough to get such an aircraft vertically lifted. It is therefore, required, according to this present invention to use the combination of the arrangements of the invention to reduce the weights, while at the same time increasing the finally available power at the propellers and to increase the efficiencies of the used power handling components of the aircraft of the invention in order to realize the aim of obtaining an effective and inexpensive, while simple, vertical take off aircraft for the budget of the average citizen.

It is, therefore, also in line with the present invention to use the pumps and motors of applicant's inventions and patents because they have been developed over thirty years intensive research and testing to obtain in smallest weight and size high speed and high pressure capabilities with good efficiencies and to combine in single motor housings the holding and bearing means to hold and drive propellers while at the same time providing the driving fluid motor. Equally important are the inventor's double and four flow pumps because only they can guarantee equal rates of flow in all four fluid lines at high pressure, high rotary revolutions and good efficiencies.

In line with the invention is also to use the most powerful, but inexpensive and economic power plant. A sample for such power plant is given by the inventor's "ULTRA POWER" engine which is illustrated in sectional view in FIG. 43.

FIG. 43 shows a power plant which is useable in the present invention. It has two cylinders with a double piston 4,64,104,164 reciprocating in a respective cylinder 2,62,102,162. The double pistons are connected by connecting rods 14,114 to a crank shaft 19. This engine is a one stroke engine. It has two power strokes at every single stroke. That means that it has four power strokes at every single revolution. A turbo charger supplies the air or gas through entrance 30, passes it over entrances 9 to the two cylinders, while a recesses 15 in the medial shaft between the double piston controls the flow of the fresh air or gas into the respective cylinder. After firing and expansion stroke the used gases flow out through outlet ports 6,66 etc. into the turbine of the turbo charger. At the same time the fresh air or gas flashes the old gases out of the respective cylinder. By this one-stroke system without valves, the engine is capable to provide at the short time of vertical take off or landing about 135 horsepower at an engine weight of less than 35 kilogram.

FIG. 44 shows my mechanically operated vertical take off and landing aircraft together with the details explaining FIGS. 45 to 49. The heretofore best aircraft of this type is that of the earlier mentioned OLSON U.S. Pat. No. 3,181,810. Since this is the only patent in the art, it defines the art to which the present invention belongs.

The present invention belongs, consequently, to:

Aircraft, which comprise, in combination, a body, at least one power plant, at least four propellers, at least two pairs of wing portions, a transmission between the power plant and the propellers with the transmission leading equal portions of power from the power plant to the propellers whereby the transmissions transfers at least four portions of equal power and equal rate of speed individually each one of the portions of power individually to one of the propellers to synchronize the rotary velocities of the four propellers to equal speeds and forces and means to pivot the axes of the propellers and of the wing portions from a vertical to a horizontal direction and vice versa.

While the mentioned OLSEN patent is a beautiful design and concept, it could work only with very powerful and expensive gas turbines because the many parts made the Olsen aircraft too heavy to lift off from the ground with common aircraft engines. The present invention now discovers, however, that such an aircraft can actually vertically take off and land if the means of the present invention are provided. Thus, the aircraft of the invention of FIGS. 44 to 49 uses at least one of the power plants, preferred one of the invention, or more than one such power plants. It transfers the power portions over two shafts 18,19 to vertical shafts 22, from them to wing shafts 33 to 36 and from there to the propeller driving shafts to drive propellers 14 to 17. Between the mentioned shafts are rectangular taper gears 20,21,23,32,37,38 provided. The body, the pipe structures and the wing portions are similar to those of FIGS. 4 and 33. The Figures show, however, that the pipe structure pipes in the interior of the body 31 are bent to distance the axes of the pipes farther from each other. This is required to make a 90 degrees pivotal movement of the wing portions from vertical to horizontal and vice versa possible. If this provision would not be applied the vertical shafts would prevent such pivotal movement or restrict it to less than 90 degrees. See the different distances of the axes of the pipes in FIGS. 45, 47 and 52. FIG. 45 shows the pipe sectional views of the wings in vertical position, while FIG. 46 shows them in horizontal position. See, that vertical shaft 22 is once close to pipe 61, but at the other Figure close to pipe 60. FIG. 47 shows the pipe structure in the wing portion with the shorter distance between the axes of the pipes. FIG. 49 shows the gearings on the vertical shaft 22, while the gearing inside of the wing is shown in FIG. 44 left portion. FIG. 48 shows the gear 12 between gears 45 and 13 to revolve shaft 19 in the opposed rotary direction relative to shaft 18. The power plants are shown by 1 and 2.

While the system is correct, as that of Olsen was, the detailed studies of the present invention brought to light, that the engine must run in excess of 6000 rpm at the vertical take off and the wings must be built in combination of the pipe structures of the present invention to become light and strong enough. Further, the revolving shafts of the transmission should be pipes with inside diameters of about 70 percent of the outside diameters of the pipes. That saves weight. The shafts of the Olsen patent are too heavy to lift the aircraft with inexpensive and economic power plants. The pipe structure of the invention must be used to reduce the weight of the wings while at the same time making them strong enough. And, further, according to the present invention, the pipe structure of the invention provides the holding of the bearing means in the gear housings 4 to 7 to bear the respective ends of the shafts in the wing portions. The pipe structure must have the diagonal ribs to obtain the required strength as already explained at FIGS. 4 and 33. Of interest is, that the taper gears weigh much more than the hydraulic pumps and motors of the other Figures of the invention. The mechanically geared aircraft of FIG. 44 is therefore considerably more heavy than that of the hydraulically geared craft of FIGS. 4 and 33. The reason is commonly not known, but the reason is a very important one. In mechanical gears there are line connections or line touches which transfer the power. But in the inventor's pumps and motors clear and extended faces transfer the power. Faces can bear and transfer greater forces than lines can do it. Consequently, a mechanically operated gear will commonly be heavier than a hydraulically operated transmission with the inventor's pumps and motors. The mechanically geared craft of FIG. 44 can make the heavyer weight good by obtaining a higher transmission efficiency for the "Ftl" factor of the invention. Such higher efficiency is, however, immediately lost, if the shafts and gears run in too much oil. Because they cause planshing there if they run in too much oil. The efficiencies of the ball or roller bearings and those of the gears reduce at the high speeds in the aircraft of the invention by 15 to 35 percent, if they run in oil instead of running in oil vapor. Since the heavy gears are unavoidable for the required power which is to be transmitted, the invention makes that good by using the pipes of the given diameters as shafts and by using the pipe structure with the thin walls of the pipes in combination with the diagonal ribs. Details of weights are given earlier. A 70% inner diameter of outer diamter pipe reduces the weight by about 50 percent compared to a full shaft but it maintains about 75 percent of torque transfer capability respective to a full shaft. Thereby the system of the invention saves about fifty percent weight of the shafts of the gears.

Regarding FIG. 44 it may be noted that the diagonal ribs between the pipes 59,60,61, are cited by referential 58. These ribs are diagonally directed relative to the pipes of the structurte but some of the ribs 58 may also be perpendicular to the axes of the pipes 59 to 61 of the pipe structure. The medial portion of the pipe structure, namely the portion inside of the body 31 of the aircraft, which has the wider distances of the axes of the pipes from each other, is cited by pre digits 11 as pipe structure portions 1159,1160 and 1161. Instead of providing 3 pipes, there may be four pipes per structure. An independent shaft 1180 and a second independent shaft 2080 may be extended through the hollow drive shaft 34 or 35, respectively, of the front wing portions to operate the ailerons 77 by respective connecters 1083 which can be borne on fingers 1082 which are radially distanced by the eccentricity 1084 from the axis of the respective independent shaft 1080 or 2080. More details thereof are found in the following Figures.

Figure 50:
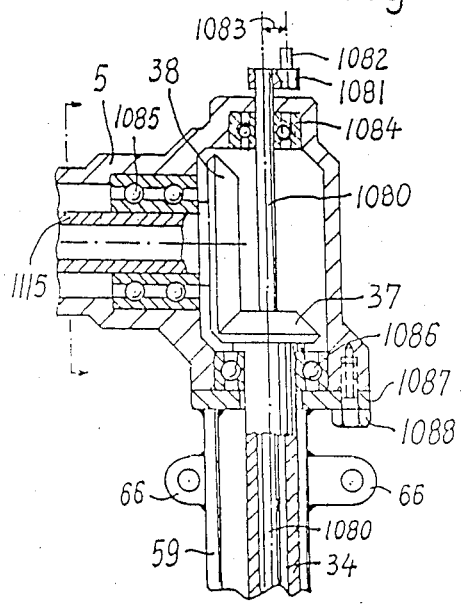

FIG. 50 shows a portion of FIG. 44. It explains in detail that the gear shafts must be borne in respective bearings and how the parts are assembled or located relative to each other. The shaft 34 is shown to be a pipe of an inner diameter corresponding substantiallly to about 70 percent of the outer diameter of the shaft. The outer end the shaft 34 is borne in bearing 1086 in bearing housing 5. The inner end the shaft 34 is borne in bearing 1089. Bearing 1089 is borne in the pipe structure or in the inner bearing sleeve 29. The bearing 1086 is borne in the pipe structure 59,60,61, in the base plate 1087, or in the respective gear housing 4,5,6 or 7. The holding members 66 for fastening thereon the respective wing portion 24 to 27 are also shown. Gear shaft 34 is partially shown in sectional view to make it visible that the independend shaft 1080 is located in shaft 34 while a respective independend shaft 2080 may be provided inside of gear shaft 35. The respective independend shaft is borne in bearings 1090 and 1084 whereof bearing 1090 is provided in a holding member 1091 of the inner pipe structure 1159,1160,1161, while the bearing 1084 is preferred to be borne in a portion of the gear housing 4,5,6 or 7. The respective independent shaft 1080 or 2080 extends out of housing 4,5,6,7 to hold there a member 1081 which carries the finger 1082 with the eccentric location 1083 for the bearing of the respective connecter to the respective aileron 77. On the inner ends the independend shafts 1081,2080 have respective taper gears 1092 or 1093 which mesh into a common taper gear 1094. Gear 1094 has a shaft provided with the controller 1095 for the control and operation of the ailerons 77. A turn of the controller 1095 will incline the ailerons in opposite direction, since gear 1094 revolves or pivots gears 1092 and 1093 in opposite rotary directions. In this Figure are further members shown which are already known from FIG. 44, for example, housing 5, gears 37,38,32 and 23. The propeller driving shaft 1115 is borne in bearing 1085, may be borne in a further front bearing as described in earlier Figures and carries on its rear end the gear 38. The pipes of the pipe structure outside of the body 31 of the aircraft are shown by 59,60,61 with ribs 58 therebetween and the pipes of the inner portion of the structure inside of housing 31 are shown by 1159,1160 and 1161. This Figure shows also, that the pipes may be inserted into the inner sleeve 29 and be welded thereto with the inner pipes on a greater radial distance from the axis of bearing sleeve 29 than the outer pipes. Similar arrangements as in FIG. 50 for the right front wing portion 25 are also provided for the other wing portions 24,26 and 27.

Figure 51:
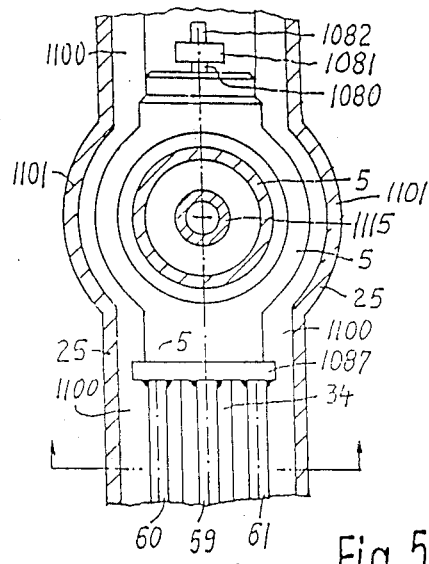

FIG. 51 is a sectional view through FIG. 50 along the arrowed line in FIG. 50. While in FIG. 50 the wing portion is not assembled, in FIG. 51 it is shown as assembled. Since the gear 38 must be of a diameter of about 200 nm or more to be able to transmit about 50 horsepower, it has a bigger diameter than the fluid motor of the Eickmann systems. Consequently, the bearing housings 4,5,6,7 have bigger diameters than the fluid motors 4,5,6,7 of the earlier Figures, like FIGS. 4 or 33. That results therein that the respective wing portion 25 gets a thick portion 1101 around the respective gear housing,f.e. 5. The Figure shows the respective strong outer layers of the wing portion as far as they show the thickended portion around the gear housing by 1101. The inner weeker layers are shown by 1100 and may be laid around the inner members or parts and may touch their outer faces to bear thereon. The configuration is shown additionally in FIG. 53.

Figure 53:
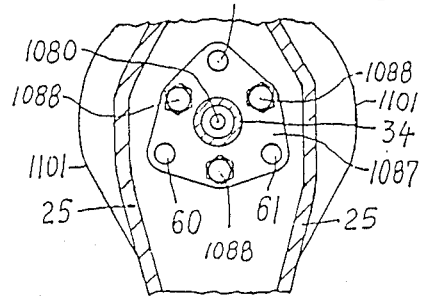

FIG. 53 is the sectional view through FIG. 51 along the arrowed line in FIG. 51. It is seen in this Figure how the thickened portion 1101 extends from the wing portion 25. The stronger outer layers of the wing portion are hatched in FIGS. 51 and 52. FIG. 53 illustrates also the configuration of the base plate 1087 of the pipe structure's outer end and one sees in FIGS. 53 and 50 the bolts 1088 with which the bearing housing 5,4,6 or 7 is fastened to the pipe structure. Seen is also that the base plate is not circular in order to save weight.

Figure 52:
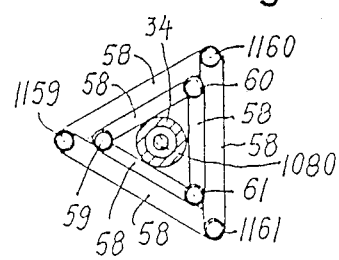

FIG. 52 shows the pipe structure portions in cross section combined in a single Figure taken along the arrowed lines AA and BB of FIG. 50 in order to show the different distances of the axes of the inner and outer pipe portions 59,60,61 and 1159,1160,1161 from each other. The ribs 58 are also shown in the Figure and so are the shafts 34 and 1080.

Figure 54:
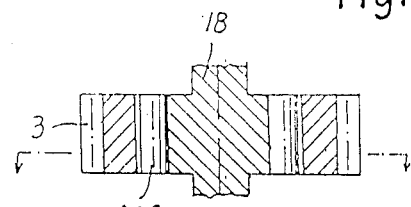
Figure 55:
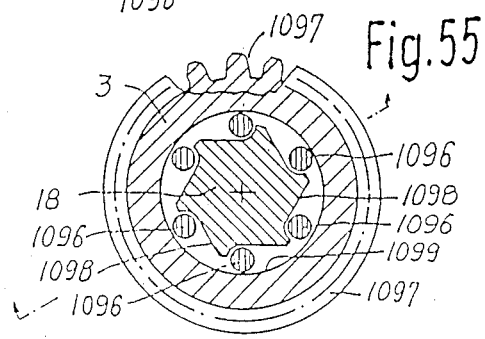

FIGS. 54 and 55 are cross sectional Figures along the arrowed line of the other of the Figures relative to each other. These Figures illustrate the requirement that a one way clutch and the other rotary direction free wheeling arrangement must be provided to at least one gear of each power plant of transmission portion if more than one power plant is (are) provided in the respective aircraft, for example, as shown by power plants 1 and 2 in FIG. 44. The arrangement of FIGS. 54 and 55 must be done, for example, to shaft 18 and to shaft 19 or to a respective other shaft of the respective gear portion which carries the power of one of the engines 1 or 2. The one way clutch, other direction free wheeling, arrangement of these Figures is required in order that one of the power plants can run faster than the other, for example, if one of the power plants is set to rest or fails to operate with equal power relative to the other power plant or power plants. Thus, between shaft 18 and gear 3 of these Figures the free wheeling and clutching members 1096 are provided. The gear 3 has an inner face 1099 which may be the inner face of a cylinder. Shaft 18 has a specifically configurated outer face with inclined face portions 1098. If the shaft 18 revolves clockwise in FIG. 55, the inclined face portions 1098 engage the members (rollers) 1096 and press them against the inner face 1099 of gear 3 to clutch thereon and drive gear 3 in unison with shaft 18. If the shaft 18 revolves anti clockwise or the gear 3 revolves clockwise with a higher rotary speed than shaft 18, the members 1096 are rolled into the wider clearance portions of the inclined face portions 1098 to desengage the members 1096 from the inner face 1099 of gear 3. Gear 3 is then free wheeling relative to shaft 18 or shaft 18 wheels free relative to gear 3. Gear 3 has the gear teeth 1097 as shown in a portion of FIG. 55.

More details of the preferred embodiments and of the objects of the invention may become apparent from the appended claims. The claims which are enclosed and follow hereafter, are therefore considered to be a portion of the description of the invention and of the preferred embodiments.

What is claimed is:

1. An aircraft, which comprises, in combination, a body, at least one power plant, at least four propellers, at least two pairs of wing portions, a transmission between said power plant and said propellers with said transmission leading equal portions of power from said power plant to said propellers, whereby said transmission transfers at least four portions of equal power and rate of speed individually each one to one of said propellers to synchronize the rotary velocities of said four propellers to equal speeds and forces, arrangements to pivot the axes of said propellers and of said wing portions from vertical to horizontal and vice versa in unison and improvement, wherein said improvement consists in the provision of a hydrostatic transmission, wherein said power plant comprises a fluid flow producing device for the supply of four continuously one-directional individual and separate flows of pressurized fluid of equal rate of flow and pressure out of four separate fluid flow delivery outlets, one individual and separate flow out of one outlet, respectively, wherein said propellers are driven by hydrostatic motors, each propeller individually and separate by one motor of said motors, and, wherein 1st, 2nd, 3rd and 4th fluid lines are provided between said fluid flow producing device and said motors, which pass 1st, 2nd, 3rd and 4th flows of said flows of fluid in said 1st fluid line from the 1st of said outlets to the first of said motors, in said 2nd fluid line from the 2nd of said outlets to the second of said motors, in said 3rd fluid line from the third of said outlets to the third of said motors and in said 4th fluid line the 4th of said flows from the fourth of said outlets to the fourth of said motors to revolve said motors with equal power and rotary angular velocities to maintain equal rotary angular speeds of said propellers to maintain at all times a stabile horizontal direction of said body of said aircraft during vertical, horizontal and inclined flight in the surrounding air, wherein said improvement provides at least two pipe structures which are pivotably borne in said body with each of said structures extending to the right and left side of said body to have on their axial ends a holding part, wherein each of said structures comprises at least three pipes which are substantially parallel to each other with at least one of said pipes located laterally of two others of said pipes, wherein diagonal ribs are provided between said pipes to form with said pipes a rigid pipe structure capable to carry loads in two to each other perpendicular directions, wherein one motor of said motors is fastened to said holding means on the respective end of said pipe structure with the entrance port of said motor porting into the interior of a fluid delivery pipe of said pipes while said fluid delivery pipe is distant from said port communicated by flexible connection means to one of said outlets of said fluid flow producing device, wherein said fluid delivery pipe of said structure passes at all times during flight of said aircraft high pressure fluid in one single flow direction to said motor to revolve the outgoing shaft of said motor while said shaft of said motor revolves one of said propellers at all times of flight of said aircraft in one rotary direction, wherein another of said pipes of said structure passes return fluid from said motor at least indirectly back to said fluid flow producing device while the third of said pipes of said structure serves to keep said structure rigid in one of said two to each other perpendicular directions, and, wherein said pipes of said structure are straight pipes without bends and said fluid delivery pipe is provided with an interior medial block inside of the bore of said pipe to separate the interiors of both portions axially endwards of said interior medial block and to seal them from each other, while communication ports are provided in the neighborhood of and axially endwards of said interior medial block in said delivery pipe for communication of said communication ports by individual fluid lines to individual ports of said outlets of said fluid flow producing means.

2. The aircraft of claim 1,
wherein said pipe structure is provided with holding means,
wherein said holding means include bores and holding faces,
wherein said wing portion is a separate individual portion,
wherein said wing portion is provided with complementary bores and with complementary support faces located suitably to meet said bores and holding faces of said pipe structure, and,
wherein said holding portion is thereby capable of being assembled and disassembled to said pipe structure by fasteners like bolts and rivets.

3. The aircraft of claim 1,
wherein said pipe structure is provided with holding means with said holding means including holding faces and holding bores, while said wing portion is a separate individual portion,
wherein said wing portion is provided relative to said holding faces and holding bores with complementary bores and support faces which are located suitably to meet said holding bores and said holding faces of said pipe structure, whereby said holding portion is thereby provided with a capability to become assembled and disassembled to said pipe structure by rivets and bolts which extend through said holding bores to clamp said holding faces and support faces together,
wherein said holding faces are provided on the top and bottom with a holding structure which is welded to said pipe structure,
wherein said wing portion is provided with a recess of suitable dimension to contain in said recess said holding structure, while said support faces border said recess in said wing portion, and,
wherein said holding faces and support faces form at least two pairs of face portions which are located distanced from each other in directions parallel and perpendicular to the axes of said pipe structure.

4. An aircraft, which comprises, in combination,
a body, at least one power plant, at least four propellers, at
least two pairs of wing portions, a transmission between said power plant and said propellers with said transmission leading equal portions of power from said power plant to said propellers, whereby said transmission transfers at least four portions of equal power and rate of speed individually each one to one of said propellers
to synchronize the rotary volocities of said four propellers to equal speeds and forces, arrangements to pivot the axes of said propellers and of said wing portions from vertical to horizontal and vice versa in unison and improvement,
wherein said improvement consists in the provision of a hydrostatic transmission,
wherein said power plant comprises a fluid flow producing device for the supply of four continuously one-directional individual and separate flows of pressurized fluid of equal rate of flow and pressure out of four separate fluid flow delivery outlets, one individual and separate flow out of one outlet, respectively,
wherein said propellers are driven by hydrostatic motors, each propeller individually and separate by one motor of said motors, and,
wherein 1st, 2nd, 3rd and 4th fluid lines are provided between said fluid flow producing device and said motors, which pass 1st, 2nd, 3rd and 4th flows of said flows of fluid
in said 1st fluid line from the 1st of said outlets to the first of said motors,
in said 2nd fluid line from the 2nd of said outlets to the second of said motors,
in said 3rd fluid line from the third of said outlets to the third of said motors and
in said 4th fluid line the 4th of said flows from the fourth of said outlets to the fourth of said motors
to revolve said motors with equal power and rotary angular velocities to maintain equal rotary angular speeds of said propellers to maintain at all times a stabile horizontal direction of said body of said aircraft during vertical, horizontal and inclined flight in the surrounding air,
wherein said improvement provides at least two pipe structures which are pivotably borne in said body with each of said structures extending to the right and left side of said body to have on their axial ends a holding part,
wherein each of said structures comprises at least three pipes which are substantially parallel to each other with at least one of said pipes located laterally of two others of said pipes,
wherein diagonal ribs are provided between said pipes to form with said pipes a rigid pipe structure capable to carry loads in two to each other perpendicular directions,
wherein one motor of said motors is fastened to said holding means on the respective end of said pipe structure with the entrance port of said motor porting into the interior of a fluid delivery pipe of said pipes while said fluid delivery pipe is distant from said port communicated by flexible connection means to one of said outlets of said fluid flow producing device,
wherein said fluid delivery pipe of said structure passes at all times during flight of said aircraft high pressure fluid in one single flow direction to said motor to revolve the outgoing shaft of said motor while said shaft of said motor revolves one of said propellers at all times of flight of said aircraft in one rotary direction,
wherein another of said pipes of said structure passes return fluid from said motor at least indirectly back to said fluid flow producing device while the third of said pipes of said structure serves to keep said structure rigid in one of said two to each other perpendicular directions, and,
wherein said pipe structure is provided with holding means,
wherein said holding means include bores and holding faces,
wherein said wing portion is a separate individual portion,
wherein said wing portion is provided with complementary bores and with complementary support faces located suitably to meet said bores and holding faces of said pipe structure, and,
wherein said holding portion is thereby capable of being assembled and disassembled to said pipe structure by fasteners like bolts and rivets.

* * * * *